US007792723B2

(12) United States Patent
Molloy

(10) Patent No.: US 7,792,723 B2
(45) Date of Patent: *Sep. 7, 2010

(54) SYNTHETIC CONTINUOUS DOUBLE AUCTIONS

(75) Inventor: Mark E Molloy, Otley, IA (US)

(73) Assignee: Liquid Markets Inc, Irvine, CA (US)

( * ) Notice: Subject to any disclaimer, the term of this patent is extended or adjusted under 35 U.S.C. 154(b) by 516 days.

This patent is subject to a terminal disclaimer.

(21) Appl. No.: 11/343,929

(22) Filed: Jan. 31, 2006

(65) Prior Publication Data
US 2006/0190388 A1  Aug. 24, 2006

Related U.S. Application Data

(60) Provisional application No. 60/650,791, filed on Feb. 7, 2005, provisional application No. 60/653,671, filed on Feb. 16, 2005, provisional application No. 60/668,393, filed on Apr. 4, 2005, provisional application No. 60/668,389, filed on Apr. 4, 2005.

(51) Int. Cl.
G06Q 40/00 (2006.01)
G06Q 30/00 (2006.01)

(52) U.S. Cl. .......................... 705/35; 705/26
(58) Field of Classification Search ................ 705/26, 705/37, 35, 36 R, 38
See application file for complete search history.

(56) References Cited

U.S. PATENT DOCUMENTS 5,689,652 A  11/1997 Lupien et al.
5,905,975 A  5/1999 Ausubel
6,021,398 A  2/2000 Ausubel (Continued)

FOREIGN PATENT DOCUMENTS

GB  2366885  3/2002

(Continued)

OTHER PUBLICATIONS

Bronfman, Corinne M. "The Informational Content of Frequently Changing Prices: Implications for the Structural Organization of a Securities Market" 1988, New York University, Graduate School of Business Administration ( 0868 ) vol. 4910A of Dissertations Abstracts International. p. 3109. 190 Pages.*

(Continued)

Primary Examiner—Kelly Campen
(74) Attorney, Agent, or Firm—John Bruckner PC

(57) ABSTRACT

An apparatus includes a computer network including at least one auction server, at least one seller client and at least one buyer client. The at least one auction server, the at least one seller client and the at least one buyer client are executing on a computer system a synthetic continuous double auction having contingent bidding on a plurality of heterogeneous item auctions. The synthetic continuous double auction item auctions. The synthetic continuous double auction includes a composite reverse auction, defined to include a bid set including a first contingent bid on a first of the plurality of heterogeneous item auctions and a second contingent bid on a second of the plurality of heterogeneous item auctions, is ended when i) the first contingent bid from the bid set is recognized as a winning bid and substantially simultaneously ii) the second contingent bid from the bid set is withdrawn as a remaining bid.

1 Claim, 15 Drawing Sheets

U.S. PATENT DOCUMENTS

| | | | |
|---|---|---|---|
| 6,026,383 | A | 2/2000 | Ausubel |
| 6,272,473 | B1 | 8/2001 | Sandholm |
| 6,598,026 | B1 * | 7/2003 | Ojha et al. .................... 705/26 |
| 2002/0082946 | A1 | 6/2002 | Morrison et al. |
| 2004/0006497 | A1 | 1/2004 | Nestor et al. |
| 2004/0215548 | A1 | 10/2004 | Chieu et al. |
| 2005/0273417 | A1 * | 12/2005 | Budish .................... 705/37 |
| 2005/0283424 | A1 | 12/2005 | Wong et al. |

FOREIGN PATENT DOCUMENTS

| | | |
|---|---|---|
| WO | WO 01/71453 | 9/2001 |
| WO | WO 02/097582 | 12/2002 |

OTHER PUBLICATIONS

Reiss et al. "Does risk sharing motivate interdealer trading? (includes appendices)" Oct. 1998 Journal of Finance , v53 , n5 , p. 1657(47).*

Beam, Caroline Mcholme "Auctioning and Bidding in Electronic Commerce: the Online Auction" 1999 University of California, Berkeley ( 0028 ) Chair: J. George Shanthikumar vol. 6005B of Dissertations Abstracts International. p. 2320 . 251 Pages.*

Lawrence M Ausubel, et al., "Demand Reduction and Inefficiency in Multi-Unit Auctions", University of Maryland, Mar. 1988.

Lawrence M Ausubel "An Efficient Ascending-Bid-Auction for Dissimilar Objects", University of Maryland, Jan. 1996.

Lawrence M Ausubel, "An Efficient Ascending-Bid-Auction for Multiple Objects", University of Maryland, Jan. 1996.

Lawrence M Ausubel, An Efficient Dynamic Auction for Heterogeneous Commodities, Jul. 2002.

Lawrence M Ausubel et al., "The Ascending Auction Paradox" University of Maryland, Jul. 1999.

Lawrence M Ausubel, "Auctioning Many Divisible Goods", Journal of the European Economic Association, Apr.-May 2004, pp. 480-493.

Lawrence M Ausubel, et al., "Auctioning Securities", University of Maryland, Mar. 1998.

Lawrence M Ausubel, et al., "Frontiers of Theoretical Economics", The Berkley Electronic Press, 2002.

Lawrence M Ausubel, "A Generalized Vickrey Auction", University of Maryland, Sep. 1999.

Lawrence M Ausubel ,"On Generalizing the English Auction", University of Maryland, Dec. 1997.

Lawrence M Ausubel, "Implications of Auction Theory for New Issues Markets", Brookings-Wharton Papers on Financial Services, 2002, pp. 313-343.

Lawrence M Ausubel, "Insider Trading in a Rational Expectations Economy", The American Economic Review, Dec. 1990, pp. 1022-1041.

Lawrence M Ausubel, "The Optimality of Being Efficient", University of Maryland, Jun. 1999.

Lawrence M Ausubel, et al, "Synergies in Wireless Telephony: Evidence from the Broadband PCS Auctions", Journal of Economics and Management Stategy, 6:3, 497-527, 1997.

Lawrence M Ausubel, et al. "Vickrey Auctions with Reserve Pricing", University of Maryland, Jun. 1997.

FFL-MTP, "Constitution, Fantasy Football League, Mt Pleasant", Aug. 2003.

John Morgan, "Combinatorial Auctions in the Information Age: An Experimental Study", University of California at Berkley, Jun. 2002.

Brian Roach, et al., Testing Bid Design Effects in Multiple-Bounded, Contingent-Valuation Questions, Land Economics, Februay 2002, 78 (1): pp. 121-131.

Mu Xiz, et al., "Solving the combinatorial double auction problem",European Journal of Operational Research, 2004.

* cited by examiner

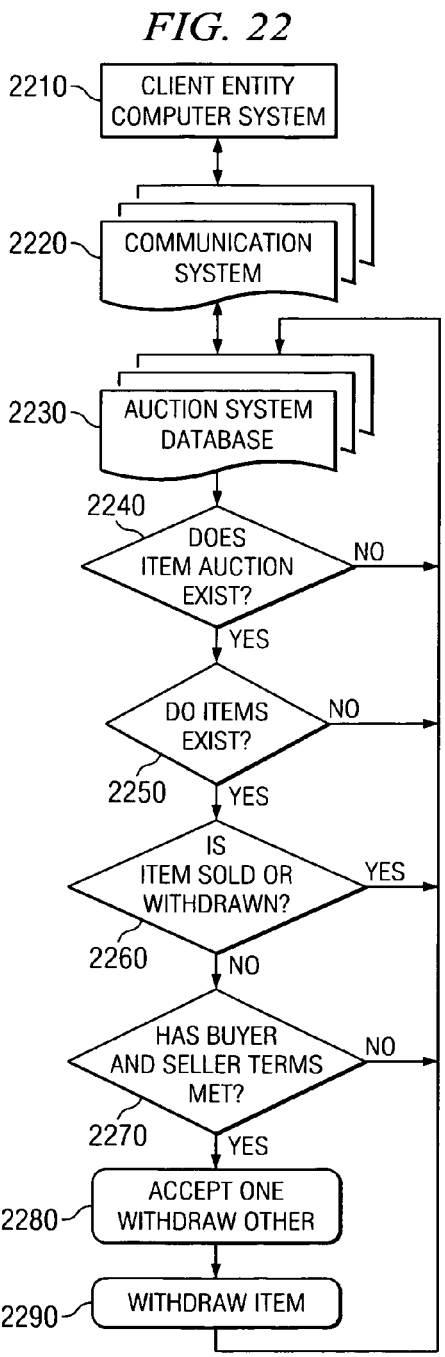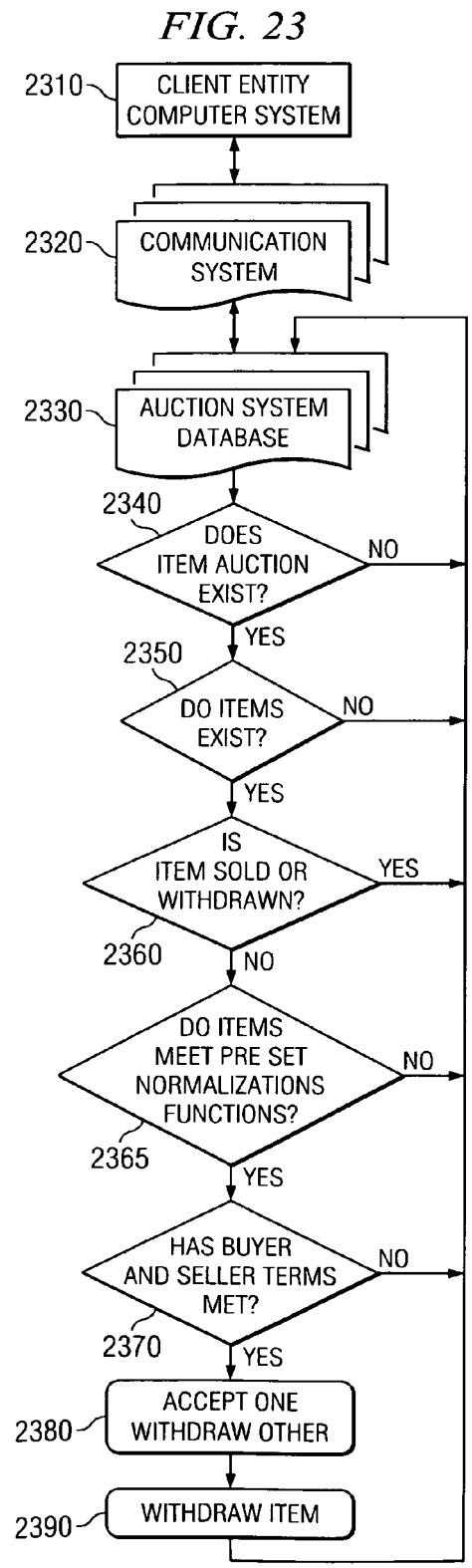

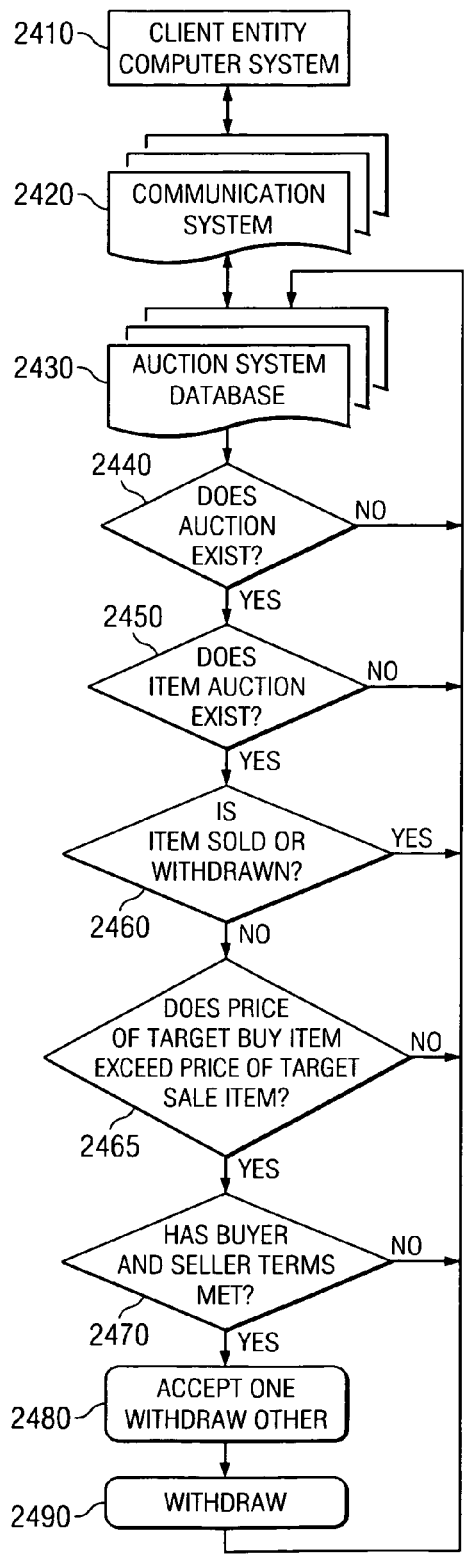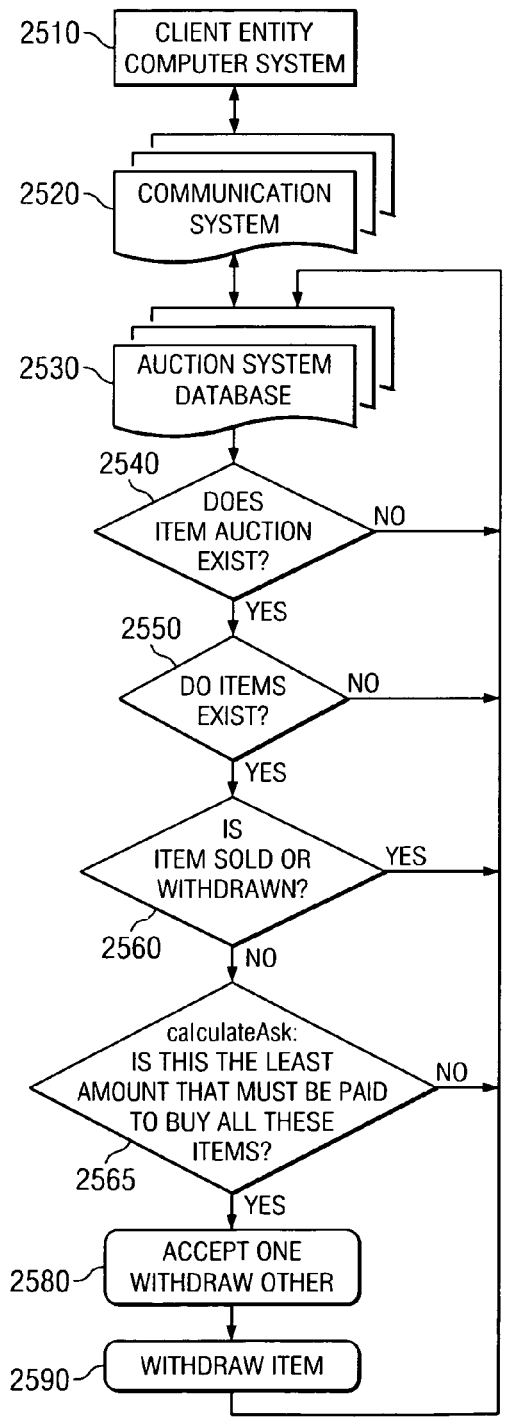

SYNTHETIC CONTINUOUS DOUBLE AUCTIONS

CROSS-REFERENCES TO RELATED APPLICATIONS

This application claims a benefit of priority under 35 U.S.C. 119(e) from provisional patent applications U.S. Ser. No. 60/650,791, filed Feb. 7, 2005; U.S. Ser. No. 60/653,671, filed Feb. 16, 2005; U.S. Ser. No. 60/668,393, filed Apr. 4, 2005; and U.S. Ser. No. 60/668,389, filed Apr. 4, 2005, the entire contents of all of which are hereby expressly incorporated herein by reference for all purposes.

BACKGROUND INFORMATION

1. Field of the Invention

Embodiments of the invention relate generally to the field of auctions. Embodiments of the invention relate to the field of electronic auctions. More particularly, embodiments of the invention relate to methods, systems and data structures for conducting synthetic continuous double auctions.

2. Discussion of the Related Art

Current online and computer-implemented auction systems are automated variants of traditional auction methods. Those traditional methods will be outlined here, followed by a description of the eBay and Amazon models.

A common goal of all auction methods is to help sellers and buyers agree upon a "fair" market price for items to be sold. There is a tension between two very strong human traits in the process of determining the price at which a person is willing to buy or sell something. First, the innate selfishness of every person causes them to want to buy for as low a price as possible, or sell for the highest price possible. Second, there is an extremely strong aversion to participating in a transaction that they see as being unfair to themselves. (In mature individuals, of course, recognition of the second attribute in others tempers expression of the first.) This second attribute—an unwillingness to be cheated—is so strong that individuals will consistently choose an outcome that is worse for themselves personally, but doesn't give someone else an unfair benefit, rather than an outcome that is objectively better for themselves, but where they feel the other person has cheated them or has unfairly benefited. Interestingly, this characteristic has been demonstrated experimentally in cultures all over the world, as well as in primates—even monkeys appear to have an inbuilt sense of fairness.

"English", Also Known as "Open Cry", Also Known as Ascending Auctions

In a traditional "open cry" auction a human auctioneer focuses attention on a single item at a time within an auction venue, inciting potential buyers to agree to ever-higher prices until no one is willing to go higher, at which point the item is sold to the last (highest) bidder. Typically the auctioneer speaks loudly with a distinctive verbal style, the "open cry", which can be quite difficult to understand at first, but is very efficient at conveying the progression of the bidding.

Key points of an open cry auction include: Items for sale are available for viewing and examination for some time prior to the start of the bidding process. All bidders focus on one item at a time, under direction of the auctioneer. All bidders can hear the progress of the bidding and they know what the competition is doing. Openness is the mechanism by which an open cry auction establishes the "fairness" of a price. From a buyer's perspective, the price must be at least somewhat fair, because others are bidding similar amounts.

Open cry auctions can be advantageous for the seller if a "bidding frenzy" is started, because it can cause the price to go higher than a calm evaluation would warrant. However, this can also lead to "buyer's remorse", also known as "winner's curse" afterwards, which is a disadvantage to the buyer. Conversely, if a buyer sees there is no competition, items can sometimes be purchased for less than their value in a wider market, which is then advantageous to the buyer over the seller. These respective circumstance-driven advantages for the seller or buyer actually speak against the fairness of traditional auctions, and can lead to significant disappointment and resentment for either party.

Open cry auctions can be termed forward auctions and have the following advantages over continuous double auctions (see below for discussion of continuous double auctions): Because forward auctions address the sale of individual items, a sequence of such auctions (using the term "auction" here to refer to the sale of a single item) is effective in selling a number of non-identical items. A forward auction does not rely upon a plurality of outstanding bids and asks to establish a current market price, because the forward auction treats each item individually.

Forward auctions suffer from the following disadvantages by comparison to continuous double auctions: The forward auction is inherently unfair to buyers, because it creates an artificial temporary monopoly in favor of the item being sold—the bidders are in competition with each other for the item being sold, but the seller has no competition. Buyers may be interested in alternative items, but they can only bid on the item currently being auctioned, and do not have knowledge of how bidding will progress on subsequent auctions of the other items that they consider to be alternatives. A continuous double auction, in contrast, puts all of the (identical) alternative items up for auction at the same time. Forward auctions require buyers to examine each item being auctioned individually. This greatly slows the progress of buying and selling.

Reverse Auctions

A reverse auction is a buyer-initiated auction in which a buyer invites bids from multiple sellers. The price decreases as sellers compete for the buyer's business, with the lowest bid considered the winner. Corporations may use a reverse auction as an alternative to the more traditional RFQ (request for quotation) or RFP (request for proposal) process. There are many procedural variations in reverse auctions. For example, the buyer may not be bound to accept the lowest bid, but may accept any bid, or might not be bound to accept any bids. A reverse auction is perhaps most notable because it forces sellers to compete against each other to win the business of a buyer. Theoretically, a reverse auction is symmetric to an ascending auction, and thus can have corresponding advantages/disadvantages for buyers/sellers.

Dutch Auctions

A "true" Dutch auction is characterized by its decreasing price mechanism. The auctioneer starts by announcing a relatively high price and repeatedly decreases the price until a "bid" is announced by one of the auction participants. The auction is then terminated and the bidder wins the auction. The Dutch auction got its name from the Dutch flower auction, where flowers are sold to traders. These auctions tend to go very quickly, because the first person to bid wins. Unfortunately, the term "Dutch Auction" also refers to a completely different kind of auction, the "uniform second price" auction (see below)

Sealed Bid Auctions

In a sealed-bid auction, bidders simultaneously submit bids to the auctioneer without knowledge of the amount bid by other participants. Usually, the highest bidder (or lowest bidder in a procurement, or reverse sealed-bid auction) is declared the winner. The winner pays either the highest amount bid (a "first price" auction) or an amount equal to the next highest bid (a "second price" auction—see below). A disadvantage to sealed-bid auctions is that the auction itself does not provide information to buyers to help them determine a fair price. Additionally a bidder (e.g., the buyer) often has no way of verifying if their bid was actually the highest.

Without a verification mechanism, the auctioneer or business can sell to any bidder it favors.

Uniform Second Price Auctions (Vickrey Auctions)

"Uniform second price" auctions, also known as Vickrey Auctions, also known as Dutch auctions, are used both in the financial world and for selling multiple items of the same type. In this type of auction, sealed bids are submitted simultaneously by all buyers. If there are N such items to be sold, the N highest-priced bidders win. However, the price they pay is the amount of the highest unsuccessful bid. Thus, if there is a single item, the price paid is the second-highest price. If there are multiple items, winners may have bid a variety of prices, but they all pay the same price, equal to the highest unsuccessful bid. (There appear to be minor variants of this, e.g. all pay the same price, which is the lowest price of any winning bid.)

Vickrey auctions can actually yield both higher prices and less buyer's remorse than open-cry auctions. There is less buyer's remorse because the highest bidder never pays the price he bid—he pays what he knows at least one other person was willing to pay. The actual price may be higher than an open cry auction, because bidders bid the maximum amount the item is worth to them, as opposed to shading their bids to hide their interest from other buyers. Like other sealed auctions, the disadvantage to Vickrey auctions is that the auction mechanism itself does not provide information to buyers to assist them in determining a fair price.

Continuous Double Auctions

Stocks and commodities are traded using continuous double auctions. In a continuous double auction (CDA) the bids and the asks may be submitted and sales transacted at any time during the trading period. Offers to sell at a specific price ("asks") are queued along with other asks at the same price. Market buy requests are matched to the first "ask" of the lowest-priced non-empty "ask" queue. Offers to buy at a specific price ("bids") are queued along with other bids at the same price. Market sell requests are matched to the first "bid" of the highest-priced non-empty "bid" queue.

Continuous double auctions (CDAs) are at least arguably the fairest form of auction. In a continuous double auction (CDA), all potential buyers of the commodity are competing against each other for purchases, and all sellers of that commodity are competing against each other for sales. In addition, information about bid and ask prices, as well as the prices of actual trades, is typically available to both buyers and sellers, to help them determine a fair price within current circumstances. Openness, symmetry, and fairly governed competition yield a highly fluid market.

Unfortunately, continuous double auctions can only be used for commodities (identical items or quantities of identical substances), and each such commodity needs to have its own, separate, continuous double auction. So, although sellers of all types of commodities are actually in competition with each other for the money to be spent by buyers, the auction mechanism does not directly support this. Continuous double auction technology is therefore not directly applicable to items that have variations between them, even if the variations are as simple as the degree of wear on used items such as books. This is because a buyer in a continuous double auction bids without examination of the individual items or substance quantities precisely because the items or substance quantities are effectively interchangeable.

eBay Auctions eBay ostensibly uses an electronic form of the traditional "open cry" auction, except that many such auctions are operating concurrently, and the bidding period for an item ranges from one to 10 days. Auctions "end" at a preset time, with the highest bid submitted before that moment "winning" the auction. eBay has an "automatic bidding" feature, whereby a user bids the maximum they are willing to pay, but the effective bid is only the minimum increment above the next-highest bid, and the bidder's maximum is not revealed.

In practice, only novices will place a bid more than a few seconds before an auction closes, because to do so just invites others to outbid them. This practice of last-moment bidding is called "sniping". There are numerous software agents and web sites to help users do this, although eBay does not support it directly.

The combination of sniping and automatic bidding means that eBay's auction mechanism is actually closer to a Vickrey auction. That is, the window within which bids are visible is so short as to be non-existent from the perspective of humans taking them into account in evaluating a fair price—hence bids are effectively sealed. Because of the automatic bidding mechanism, the winner gets the item at approximately the second-highest price bid—actually at the second-highest price plus the minimum bid increment. The 1 to 10-day period leading up to the final seconds within which bids are finally submitted functions in much the same way that the viewing period prior to a live auction functions—it is provided to allow prospective bidders to view the merchandise.

Despite eBay's success, many users find aspects of their approach very frustrating. In particular, buyers must wait for days for an auction to "close" in order to purchase an item. eBay does have a "buy now" feature, but it is only available until the first bid has been placed, and the price is non-negotiable. The practice of sniping has essentially eliminated some key benefits of "open cry" auctions. In particular, prospective buyers cannot rely on the bidding process to give them any idea of what the current market price should be.

Amazon' "Buy Used" Market

Amazon's "buy used" mechanism is more like the classified ad section of a newspaper than an auction. They just list all the outstanding fixed-price offers to sell a particular type of item, e.g. a particular book or DVD title. Offers are listed in price order, lowest first. Sellers specify condition of the item; all variations are mixed together in the same list.

Heretofore, the following auction needs have not been fully met: determining a fair market price, bidding on multiple items when less than that number of items is wanted, bidding on an item subject to sale of another item, bidding on an item subject to purchase of another item and protecting against shill bidding. What is needed is a solution that preferably simultaneously addresses all of these needs.

SUMMARY OF THE INVENTION

There is a need for the following embodiments of the invention. Of course, the invention is not limited to these embodiments.

According to an embodiment of the invention, a process comprises: participating in a synthetic continuous double auction having contingent bidding on a plurality of heterogeneous item auctions, wherein a composite reverse auction, defined by a bid set including a first contingent bid on a first of the plurality of heterogeneous item auctions and a second contingent bid on a second of the plurality of heterogeneous item auctions, is ended when i) the first contingent bid from the bid set is recognized as a winning bid and substantially simultaneously ii) the second contingent bid from the bid set is withdrawn as a remaining bid, and wherein the bid set is visible to at least one member selected from the group consisting of a) at least one first seller associated with the first of the plurality of heterogeneous item auctions, b) at least one second seller associated with the second of the plurality of heterogeneous item auctions, and c) buyers bidding on the first of the plurality of heterogeneous item auctions or the second of the plurality of heterogeneous item auctions.

According to another embodiment of the invention, a process comprises: participating in a normalized auction having contingent bidding on a plurality of heterogeneous item auctions, wherein contingent bidding includes price normalization as a function of at least one attribute, wherein a composite reverse auction, defined by a bid set including a first contingent bid on a first of the plurality of heterogeneous item auctions and a second contingent bid on a second of the plurality of heterogeneous item auctions, is ended when i) the first contingent bid from the bid set is recognized as a winning bid and substantially simultaneously ii) the second contingent bid from the bid set is withdrawn as a remaining bid.

According to another embodiment of the invention, a process comprises: participating in a compound buy-sell auction having contingent bidding on a plurality of heterogeneous items substantially simultaneously contingent on selling one or more other items in another auction, wherein a composite reverse auction, defined by a bid set including a first contingent bid on a first of the plurality of heterogeneous item auctions and a second contingent bid on a second of the plurality of heterogeneous item auctions, is ended when i) the first contingent bid from the bid set is recognized as a winning bid and substantially simultaneously ii) the second contingent bid from the bid set is withdrawn as a remaining bid.

According to another embodiment of the invention, a process comprises: participating in a compound buy-buy auction having contingent bidding on a plurality of heterogeneous items substantially simultaneously contingent on buying one or more other items in another auction, wherein a composite reverse auction, defined by a bid set including a first contingent bid on a first of the plurality of heterogeneous item auctions and a second contingent bid on a second of the plurality of heterogeneous item auctions, is ended when i) the first contingent bid from the bid set is recognized as a winning bid and substantially simultaneously ii) the second contingent bid from the bid set is withdrawn as a remaining bid.

These, and other, embodiments of the invention will be better appreciated and understood when considered in conjunction with the following description and the accompanying drawings. It should be understood, however, that the following description, while indicating various embodiments of the invention and numerous specific details thereof, is given for purposes of illustration and does not imply any limitation. Many substitutions, modifications, additions and/or rearrangements may be made within the scope of an embodiment of the invention without departing from the spirit thereof and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer concept of embodiments of the invention, the components combined with embodiment of the invention, and operation of systems provided with embodiments of the invention, will be apparent by referring to the exemplary, and therefore non limiting embodiments illustrated in the drawings, (wherein identical reference numerals, if they occur in more than one view designate the same elements) Embodiments of the invention may be better understood by reference to one or more of these drawings in combination with the following description presented herein. It should be noted that the features illustrated in the drawings are not necessarily drawn to scale.

FIG. 22 illustrates a flow diagram of a withdrawal contingency process that can be implemented by a computer program as part of a synthetic continuous double auction, representing an embodiment of the invention.

FIG. 23 illustrates a flow diagram of a normalization process that can be implemented by a computer program as part of a normalized continuous double auction, representing an embodiment of the invention.

FIG. 24 illustrates a flow diagram of a buy-sell process that can be implemented by a computer program as part of a compound buy-sell auction, representing an embodiment of the invention.

FIG. 25 illustrates a flow diagram of a buy-buy process that can be implemented by a computer program as part of a compound buy-buy auction, representing an embodiment of the invention.

DESCRIPTION OF PREFERRED EMBODIMENTS

Figure 1:
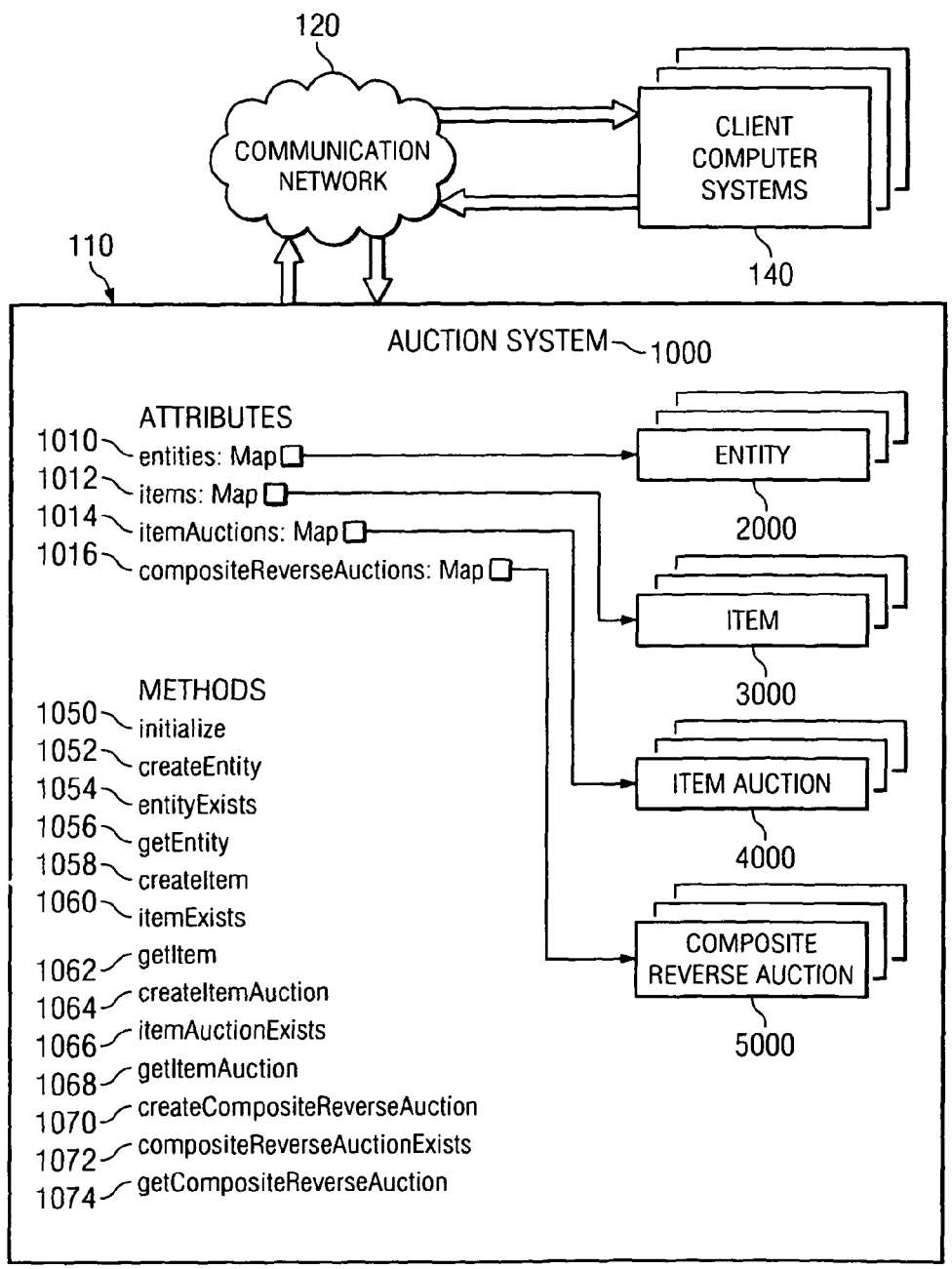
FIG. 1 illustrates a state diagram of an auction system that can be implemented by a computer program, representing an embodiment of the invention.

Embodiments of the invention and the various features and advantageous details thereof are explained more fully with reference to the nonlimiting embodiments that are illustrated in the accompanying drawings and detailed in the following descriptions. Descriptions of well known starting materials, processing techniques, components, and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The below-referenced U.S. patent(s) and U.S. patent application(s) disclose embodiments that are useful for the purposes for which they are intended. The entire contents of U.S. Pat. Nos. 5,689,652; 5,905,975; 6,021,398; 6,026,383; 6,272,473 are hereby expressly incorporated by reference herein for all purposes. The entire contents of U.S. Patent Application Publication No. 2002/0052828, Lawrence M. Ausubel, published May 2, 2002 are hereby expressly incorporated by reference herein for all purposes. The entire contents of Patent Cooperation Treaty Publication No. WO 02/097582, Lawrence M. Ausubel, published Dec. 5, 2002 (PCT/US02/16937) are hereby expressly incorporated by reference herein for all purposes. The instant application contains disclosure that is also contained in copending U.S. Ser. No. 11/343,928, filed Jan. 31, 2006; U.S. Ser. No. 11/344,598, filed Jan. 31, 2006; and U.S. Ser. No. 11/343,945, filed Jan. 31, 2006, the entire contents of all of which are hereby expressly incorporated by reference for all purposes.

The invention can include a computer implemented synthetic continuous double auction (SCDA) virtual market having a network of item auctions and composite reverse auctions. Within an SCDA (synthetic continuous double auction), all buyers compete with each other for the items being sold by all sellers, and all sellers compete with each other for the business of all buyers. In various embodiments, SCDAs (synthetic continuous double auctions) continue indefinitely, without regard to the completion of individual item auctions within them. In still other embodiments, an SCDA may span whatever variety of products and services buyers consider to be alternatives in satisfying their purchasing needs.

A synthetic continuous double auction (SCDA) effectively combines the sale of all types of items into a single, giant, continuous double auction. All buyers are thus substantially simultaneously in competition with each other for all the goods and services for sale, and all sellers are substantially simultaneously in competition with each other for all the money that buyers have to spend. This may sound confusing, but in fact the presentation and mechanism from the perspective of buyers and sellers is very simple, because only the subset of the competition that is directly relevant to an individual buyer or seller is presented to them. To illustrate, let us start with eBay's model, and modify it.

Imagine that you want to buy an 80 mm refracting telescope. eBay matches the term "telescope" to 2034 auctions, 1059 of which are actually either telescopes or binoculars, 685 of which are actually telescopes, etc; you eventually refine your search enough to find that eight of them are 80 mm refracting telescopes. The auctions end between 7 hours from now and 5 days, 21 hours from now. Any of these 8 telescopes would suit you, but you can only bid on one of them at a time, unless you actually want more than one. Why? Because eBay is modeling traditional open-cry auctions on the one hand, and on the other hand they simply forbid it, for reasons mostly having to do with "shill bidding"—a way for sellers to generate the false impression that others are bidding for an item, in an attempt to pressure genuine buyers to increase their bids. At any rate, it is pointless to bid prior to the auction's close (because it would only incite others to outbid you); so you wait to snipe the auctions one at a time (either manually or with the help of sniping software), possibly for the next several weeks, until you get one at a price you are willing to pay, or you give up.

Note that in practice, the auctions for the items you are interested in are serial and disconnected. Thus, the eBay model has failed to reflect a critical aspect of the real world, which is that the auctions are connected by your interest in them. You would probably like it, in fact, if the owners of these 8 telescopes would engage in a reverse auction for your benefit, competing against each other to sell you a telescope at the lowest price. Even if they were willing to do this, of course, the telescopes are probably not all exactly the same. They may be in different conditions, from different manufacturers, having different accessories, etc. For that matter, you might settle for a good pair of binoculars, at a lower price. Thus, although any one of them might suit you, you are unlikely to be willing to pay the same price for each of them, so a traditional reverse auction wouldn't work, even if the sellers would cooperate.

From the sellers' perspective, this disconnected serial auction mechanism is also disadvantageous, for many of the following reasons:

A seller is effectively prohibited from competing until it is their "turn"—they are starved for potential buyers.

Buyers are tentative with their bids, because they have poor information about how bidding has gone, and will go, on past and future auctions of similar items. This is bad for sellers because the uncertainty will cause buyers to shade their bids low.

A seller has no way to express their willingness to compete against other sellers.

He also has no direct mechanism for viewing their competition with other sellers.

Furthermore a seller has no way to view the competition between buyers with regard to the set of goods each of these buyers is interested in, and therefore, which buyers are competing between each other.

For both buyers and sellers, one of the primary functions of an auction is not fulfilled. This function is to provide good information to both buyers and sellers to enable them to decide upon a fair price. It is not fulfilled because the final bidding for only one auction happens one at a time. A buyer does not know what the buying competition will be for subsequent items. If there are two items he is interested in he can't bid on the first with knowledge of what will happen on the second. Note that this happens to people all the time at live auctions: "I would have bid more on the red couch if I had known that bidding on the walnut table was going to go so high." Or conversely, "I wouldn't have bid so high to get that red couch if I had known how cheap the walnut table was going to sell."

History information for similar items is completely unavailable on Amazon, and difficult to dig out and assemble on eBay. This could be rectified on either site, of course. Yet, recent history is a very convincing indicator of what "fair" market value should be, and thus an important expeditor of transaction completion.

Various embodiments of SCDAs (synthetic continuous double auctions) can resolve these issues as follows:

In an SCDA (synthetic continuous double auction), individual auctions may not end at a predetermined time. They can end when a sale is made, or the seller withdraws the item. Note: Both buyers and sellers may make use of automatic/advanced features that let them do things automatically that they could do manually if they were online and paying attention. So, for example, the seller may choose to end the auction at a specific time, or end the auction by automatically accepting a bid based on other criterion, such as price, as well as ending it manually.

A prospective buyer may bid concurrently on as many different items as he wishes and at different prices if the items have different values in the subjective opinion of the bidder. He may do so with the stipulation that he only wants one of the items or as many as he wants. This forms a "bid set". A bid set is "satisfied" when the specified number of actually-desired items has been purchased. A bid set may also be satisfied by other criterion, e.g. available funds in the buyer's account or the buyer's credit limit won't cover any more purchases.

A bidder may also "win" an auction by acceding to the asking price of the seller; this is equivalent to placing a bid for that amount, or raising an existing bid to that amount, and is handled the same way.

A bidder "wins" an auction when the seller of an item he is bidding upon accepts the offered bid. Upon this acceptance (or other means of "satisfying" the bid set, as described above), the other bids in the bid set are automatically withdrawn as part of the same transaction; and the bid set is suspended or permanently terminated, depending on how it was set up. For example, a bid set may suspend itself when account funds are low, and be automatically reactivated upon receipt of more funds. A bid set that is suspended or terminated is termed "satisfied".

The set of items in a bid set are presented as a virtual CDA (continuous double auction). That is, the buyer sees the auctions side by side, and can see the virtual competition between the respective sellers that this has created. By specifying that he would buy any of the items in the set, the bidder has turned them into a commodity, as follows:

Consider first the case where the bidder would pay the same amount for each item. To this bidder, they are all equally valuable, hence they may be considered interchangeable, and therefore they may be treated as a commodity, being and presented as a CDA.

If instead, the bidder specifies different prices for different items in the set, then all items except the highest-priced one effectively represent the item+$X, where $X is how much less than the highest-price item has been bid. That is, if you would take either telescope A for $100, or telescope B for $95, then telescope B plus the $5 you would keep if you purchased B is equivalent, from your perspective only, to telescope A.

From the seller's perspective there may be several current bidders, one or more of whom would be willing to pay the amount that is currently the top bid. Call the top bidder for auction A bidder A-1. If seller A looks only at his own auction, he does not see his position in the larger competition which bid sets have created. Say that bidder A-1 also has bids in auctions B, C, and D. In this case; the sellers in auctions A B, C, and D are in a virtual reverse auction, competing against each other for A-1's business. By presenting these side-by-side to seller A, this very real competition becomes evident, because at any time, seller B, C, or D may accept bidder A-1's offer on their respective auctions, and bid A-1 will disappear from auction A, at which point seller-A has lost the sale to a competitor.

Because of the fact that bids can disappear, a bid that has been bettered by a higher bid remains visible and valid. If the higher bid disappears because for example the buyer bought a different item in his bid set all other bids in the set are withdrawn and the older bid may again become the highest outstanding bid. Auctions where a person's top price has been outbid thus remain of interest.

For the same reasons, bids at prices at or below the top bid may be placed and they may actually win the auction!

The components and mechanisms for implementing various illustrative embodiments of an auction system as a synthetic continuous double auction are described in detail within this section. Underlying mechanisms such as transactions and the Internet are not described in detail as they are well-understood by those of ordinary skill in the art of computer science.

FIG. 1: Auction System with Communication Network and Client Computer Systems

FIG. 1 shows an auction system 1000 running on a computer system 110, coupled via a communication network 120 to a plurality of client computer systems 140, in accordance with various embodiments. Communication network 120 will typically be the Internet. However, in alternate embodiments, the invention may be practiced with other private and/or public communication networks. Typically, each system 110/140 includes one or more processors, memory, non-volatile mass storage, one or more input/output devices (such as keyboard, cursor control, network interface, and so forth). There may in the future be other devices which may become available and may augment these systems. Any one of a number of servers available from a number of vendors may be used as computer system 110. Any one of a number of desktop, notebook, tablet, and handheld computers, including special purpose devices, such as mobile phones, which are available from a number of vendors, may be used as client computer system 140.

The purpose of communication network 120 is to accept requests to and deliver responses from auction system 1000 and its component objects. Use of such communication networks 120 and client computer systems 140 to present these requests and responses is well understood within the field of computer programming and will not be described further.

For the illustrated embodiments, auction system 1000 is implemented in an entity-relationship manner, with the entities having attributes and methods. In alternate embodiments, auction system 1000 may be implemented in other manners. In various embodiments, auction system 1000 may have the following attributes:

Attribute 1010 entities is a map establishing a 1-to-1 correspondence between names of entities 2000 within auction system 1000 and the entities 2000 having those names.

Attribute 1012 items is a map establishing a 1-to-1 correspondence between names of items 3000 known within auction system 1000 and the items 3000 having those names.

Attribute 1014 itemAuctions is a map establishing a 1-to-1 correspondence between names of items 3000 known within auction system 1000 and the items 3000 having those names.

Attribute 1016 compositeReverseAuctions is a map establishing a 1-to-1 correspondence between names of composite reverse auctions 5000 within auction system 1000 and the composite reverse auctions 5000 having those names.

In various embodiments of the invention, auction system 1000 may have the following methods.

Method 1050 initialize. This method prepares auction system 1000 for initial operation, including creating an empty map 1010 entities, an empty map 1012 items, an empty map 1014 itemAuctions, and an empty map 1016 compositeReverseAuctions.

Method 1052 createEntity. This method associates type and description information for an external entity with an identifier used to refer to that entity within the auction system 1000. In the context of auction system 1000, an entity is a person, or a corporation, government, or similar organization, capable of owning items 3000 that may be bought or sold using auction system 1000.

Method 1054 entityExists. This method checks whether an entity 2000 identified by an identifier received as a parameter to the method is known to auction system 1000, i.e. is contained within the map 1010 entities.

Method 1056 getEntity. This method uses a parameter identifier to look up an entity 2000 within map 1010 entities, and to return a reference to the associated programming object of type entity if the mapping exists.

Method 1058 createItem. This method associates type and description information for an external item with an identifier used to refer to that item within the auction system 1000. In the context of auction system 1000, an item is a product or service subject to being bought or sold within auction system 1000 by an entity 2000.

Method 1060 itemExists. This method checks whether an item 3000 identified by an identifier received as a parameter to the method is known to auction system 1000. i.e. is contained within the map 1012 items.

Method 1062 getItem. This method uses an identifying parameter to look up an item 3000 within map 1012 items, and to return a reference to the associated programming object of type item if the mapping exists.

Method 1064 createItemAuction. This method creates a programming object representing an item auction 4000, and uniquely associates it with an identifier received as a parameter to the method, that is, enters it into map 1014 itemAuctions.

Method 1066 itemAuctionExists. This method checks whether an item auction 4000 identified by an identifier received as a parameter to the method is known to auction system 1000, i.e. is contained within the map 1014 itemAuctions.

Method 1068 getItemAuction. This method uses an identifying parameter to look up an item auction 4000 within map 1014 itemAuctions, and to return a reference to the associated programming object of type item auction if the mapping exists.

Method 1070 createCompositeReverseAuction. This method creates a programming object representing a composite reverse auction 5000, and uniquely associates it with an identifier received as a parameter to the method, that is, enters it into map 1016 compositeReverseAuctions.

Method 1072 compositeReverseAuctionExists. This method checks whether a composite reverse auction 5000 identified by an identifier received as a parameter to the method is known to auction system 1000. i.e. is contained within the map 1016 compositeReverseAuctions.

Method 1074 getCompositeReverseAuction. This method uses an identifying parameter to look up a composite auction 5000 within map 1016 compositeReverseAuctions, and to return a reference to the associated programming object of type composite reverse auction if the mapping exists.

The programming objects entity 2000 may represent external entities and the monetary resources and items that those entities have made known to auction system 1000. The programming objects may include the ability to transfer funds, or to send communication to initiate and confirm transfer of funds, and to transfer ownership of items, or to send communication to initiate and confirm transfer of ownership.

The programming objects item 3000 may represent external products and services such as those that may be bought and sold through auction system 1000. These programming objects may include features such as identifying the entity that currently owns them.

The programming objects item auction 4000 are described below.

The programming objects composite reverse auction 5000 are described below.

In alternate embodiments, auction system 1000 may have more or less attributes and/or methods.

FIG. 2: Bid

For the illustrative embodiments, a Bid is a programmatic object identifying the auction that is being bid upon, and thereby the item being bid on, the amount of the bid, the entity placing the bid, the BidSet containing the bid, and the time the bid will expire.

In various embodiments, a Bid may have at least the following attributes:

7010 bidAmount. This expresses the monetary quantity of the bid.

7012 auction. This refers to the programmatic object representing the item auction 4000 on which the bid was placed.

7014 buyer. This refers to the Entity 2000 who placed the bid.

7016 bidSet. This refers to the BidSet 8000 containing the bid.

7018 expiration. This is the time at which the bid will expire. Note that when this point in time is reached, the Bid 7000 object will invoke its own method 7056 withdraw, if the bid has not yet been accepted.

A Bid has at least the following methods:

7050 initialize. This method takes as parameters the bidAmount, auction reference, buyer reference, and bidSet reference which are then assigned as the corresponding attributes of the object.

7052 accept. This method is called when the bid is accepted by the seller, i.e. the seller has agreed to sell the item at the price represented by the bid. The primary function of this method is to call the bidAccepted method of attribute 7016 bidSet, so that the other bids in that BidSet may be withdrawn from their respective target auctions.

7054 auctionClosed. This method is called when the auction is no longer available, either because it was withdrawn by the seller or because someone else won the auction. The primary responsibility of this method is to call the auctionClosed method of attribute 7016 bidSet, so that the bid may be removed from the bidSet.

7056 withdraw. This method is called to withdraw a bid from an auction. It functions by calling method 4060 withdrawBid of the programming object 7012 auction.

7058 showPeers. This method invokes the showPeers method of 7016 bidSet, so that the competition created by that bidSet can be seen.

In various embodiments, a bid may have more or less attributes and/or methods.

FIG. 3: Bid Set

In various embodiments, a bidSet is a programming object representing a set of bids owned by the same Entity 2000, and related by a satisfaction function which causes all remaining bids in the BidSet to be withdrawn when the satisfaction function is satisfied. Typically, the satisfaction function says that only one bid may be accepted, hence the items being bid upon by the owning Entity are exclusive alternatives. i.e. the buyer only wants one of them.

In various embodiments, a BidSet 8000 may have the following attributes:

Attribute 8010 name. This is a string uniquely identifying the BidSet within the auction system 1000.

Attribute 8012 owner. This is a reference to the Entity 2000 owning the BidSet 8000, i.e. the Entity 2000 who has placed the bids contained within the BidSet 8000.

Attribute 8014 bids. This is a set of bids currently contained by the BidSet 8000.

In various embodiments, a BidSet 8000 may have the following methods:

Method 8050 initialize. This method accepts a name string and owner object reference as parameters and assigns the 8010 name attribute, 8012 owner attribute, and creates an empty set for the 8014 bids attribute.

Method 8052 insertBid. This method accepts a reference to a programmatic object of type Bid 7000 and adds the reference to the set attribute 8014 bids.

Method 8054 bidAccepted. This method is called when a bid within the set attribute 8014 bids has been accepted, i.e. a sale has been executed on the terms of that bid. The method accepts as a parameter a reference to the bid 7000 that was accepted. The method executes by then calling the method 7056 withdraw for every bid within the set attribute 8014 except for the bid that was accepted.

Method 8056 auctionClosed. This method is called when an auction has closed, either because the item was sold or because it was withdrawn, and at least one bid 7000 tracked within set attribute 8014 was a bid on that auction. The method accepts as a parameter the identity of said bid 7000, and removes that bid from set attribute 8014.

Method 8058 getSmallestGapBid. For each Bid within the BidSet 8000, this method calculates the difference between the current asking price of the target auction and the bid price of the bid. This is the gap amount for a bid. The method compares the gap amounts of all the bids within the BidSet, and returns the Bid having the smallest gap amount. If the BidSet is empty, null is returned.

Method 8060 showPeers. This method shows the competition between sellers that the BidSet has created. It presents the target auctions of the contained bids as a list sorted by their bid gaps, so that the auction where the buyer's bid and the seller's ask are closest is presented first. The identity of each auction is part of the information presented in the list, so that it may in turn be used to view the bidder-to-bidder competition for that item.

In various embodiments, a BidSet may have more or less attributes and/or methods.

Figure 4:
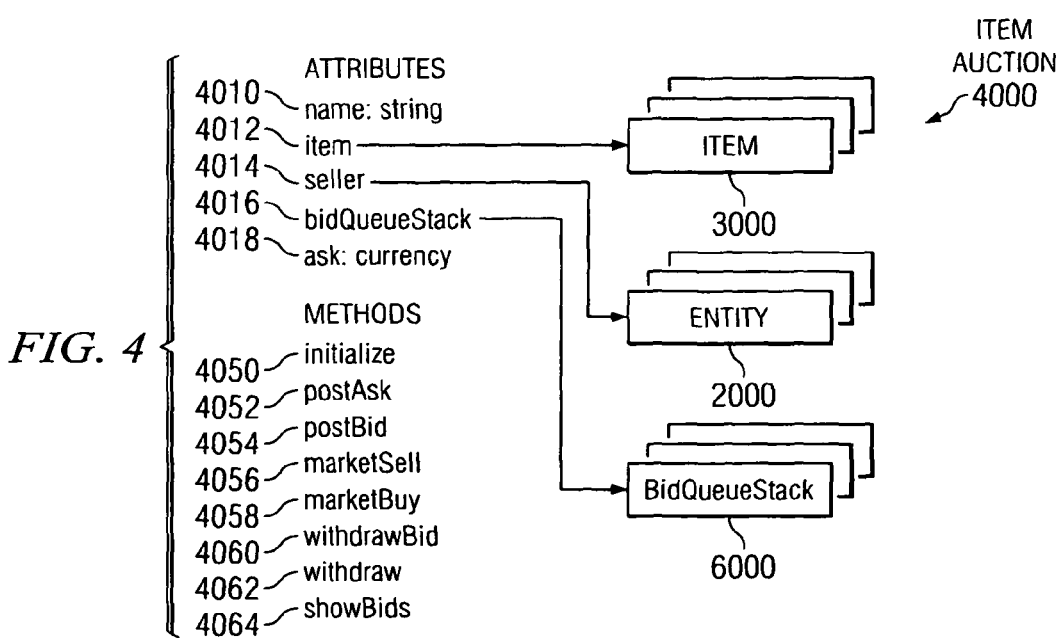
FIG. 4 illustrates a state diagram of an item auction in the auction system of FIGS. 1, 12 and 18, representing an embodiment of the invention.

FIG. 4: Item Auction

In various embodiments, an item auction 4000 is a programmatic object representing the auction of a particular item. It may have the following attributes:

Attribute 4010 name. This identifying string allows the item auction 4000 to be located by method 1068 getItemAuction, as shown in FIG. 1

Attribute 4012 item. This is a reference to a programmatic object of type item 3000 representing the item being sold through this auction.

Attribute 4014 seller. This is a reference to a programmatic object of type entity 2000 representing the entity currently owning the item 3000 being sold through this auction.

Attribute 4016 bidQueueStack. This is a reference to a programmatic object of type BidQueueStack 6000, representing the various bids received on the auction. Programmatic objects BidQueueStack 6000 are described separately below.

Attribute 4018 ask. This attribute represents the price that the seller of the item is currently asking.

In various embodiments, item auction 4000 may have the following methods:

Method 4050 initialize. This method takes as parameters an identifying string name, a reference to a programmatic object item, a reference to a programmatic object seller, and an amount representing the initial asking price for the item. The method assigns these parameters to the attributes 4010 name, 4012 item, 4014 seller, and 4018 ask, respectively. It also creates an initialized but otherwise empty programmatic object of type BidQueueStack, a reference to which is assigned to attribute 4016 bidQueueStack.

Figure 2:
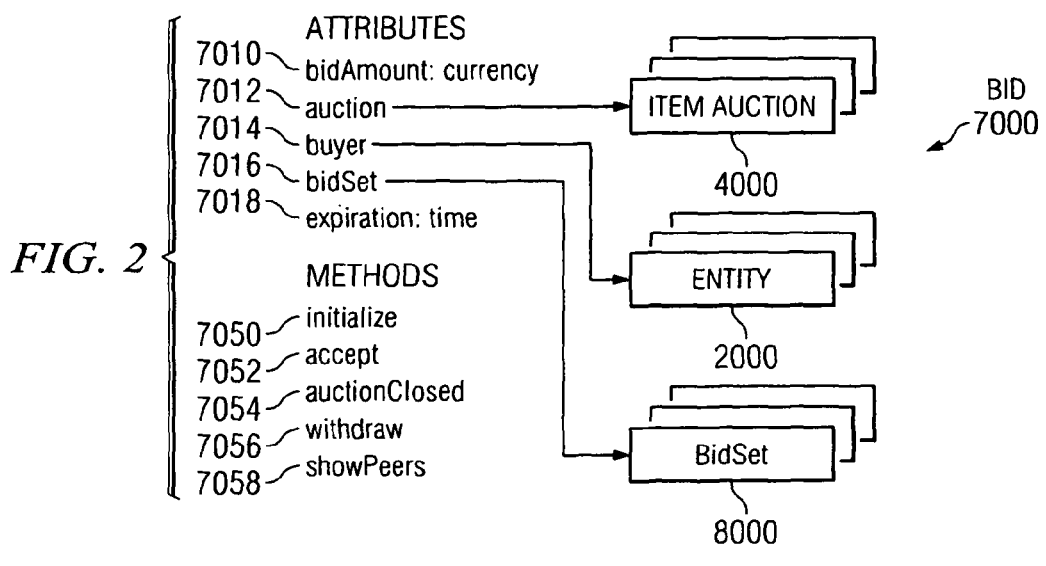
FIG. 2 illustrates a state diagram of bidding in the auction system of FIG. 1, representing an embodiment of the invention.

Method 4052 postAsk. This method accepts as a parameter a currency amount, which is assigned to attribute 4018 ask. The method 6052 getTopBid, as shown in FIG. 5B, of attribute 4016 bidQueueStack is called to retrieve the current top bid, which is then compared to the value of 4018 ask. If the attribute 7010 bidAmount, as shown in FIG. 2, of the current top bid is greater than or equal to the newly established value of attribute 4018 ask, said bid is accepted by calling its method 7052 accept, which is also shown in FIG. 2. A sale is thus executed for the amount specified by 4018 ask, or more if the bid was for more. That is, either funds are directly transferred, or communication is initiated to cause transfer of funds in said amount from the buyer identified by said bid to the external entity represented by attribute 4014 seller, and ownership of the external item represented by attribute 4012 item is either directly transferred, or communication is initiated to cause transfer of that ownership to the buyer identified by said bid.

Method 4054 postBid. This method accepts as a parameter a programmatic object of type Bid 7000, shown in FIG. 2, identifying an entity placing the bid and an amount of the bid. If the bid amount is greater than or equal to the amount represented by attribute 4018 ask, a sale is executed between seller 4014 and the buyer identified by the bid for the amount identified by attribute 4018 ask. This sale execution is accomplished by calling the method 7052, also shown in FIG. 2, of said Bid 7000 object. Otherwise, the bid is passed to the method 6050 shown in FIG. 5B, postBid of attribute 4016 bidQueueStack.

Method 4056 marketSell. This method indicates that seller 4014 wishes to sell to the highest current bidder. The method executes by first calling method 6052, FIG. 5A, getTopBid of attribute 4016 bidQueueStack. A non empty result means that at least one bid has been received for the item being sold which is the highest bid by default. If a non-empty result is received, then the sale of item is executed between seller 4014 and the buyer identified by the bid for the amount identified by attribute 4018 ask. This execution is performed by calling the method 7052 accept of said Bid 7000 shown in FIG. 2.

Method 4058 marketBuy. This method accepts as a parameter a reference to a programmatic object entity 2000 who wants to buy the item 3000 identified by attribute 4012 item, here referred to as the buyer, and causes execution of the sale of item 4012 from seller 4014 to said buyer at the price specified by attribute 4018 ask. This is done by creating a Bid 7000 object, shown in FIG. 2, for the current asking price, then executing the method 7052 accept of said Bid 7000.

Method 4060 withdrawBid. This method accepts the identity of a Bid 7000 as a parameter, and invokes method 6054 withdrawBid shown in FIG. 5B, of attribute 4016 bidQueueStack to withdraw that bid.

Method 4062 withdraw. This method is invoked to withdraw the item from sale. It in turn invokes the method 6056 withdrawAuction, shown in FIG. 5B, the attribute 4016 bidQueueStack.

Method 4064 showBids. This method presents the current set of bids on the auction. Bids are presented in a list so that the highest-to-lowest price structure is evident, and when multiple bids are present at the same price, they are presented such that their post-time is evident. In other words, the same structure preserved within the BidQueueStack is evidenced by the order of list returned. The identity of each bid is available, so that the BidSet of which the bid is a member may be retrieved by calling its showPeers method.

In various embodiments, item auction 4000 may have more or less attributes and/or methods.

Figure 5A:
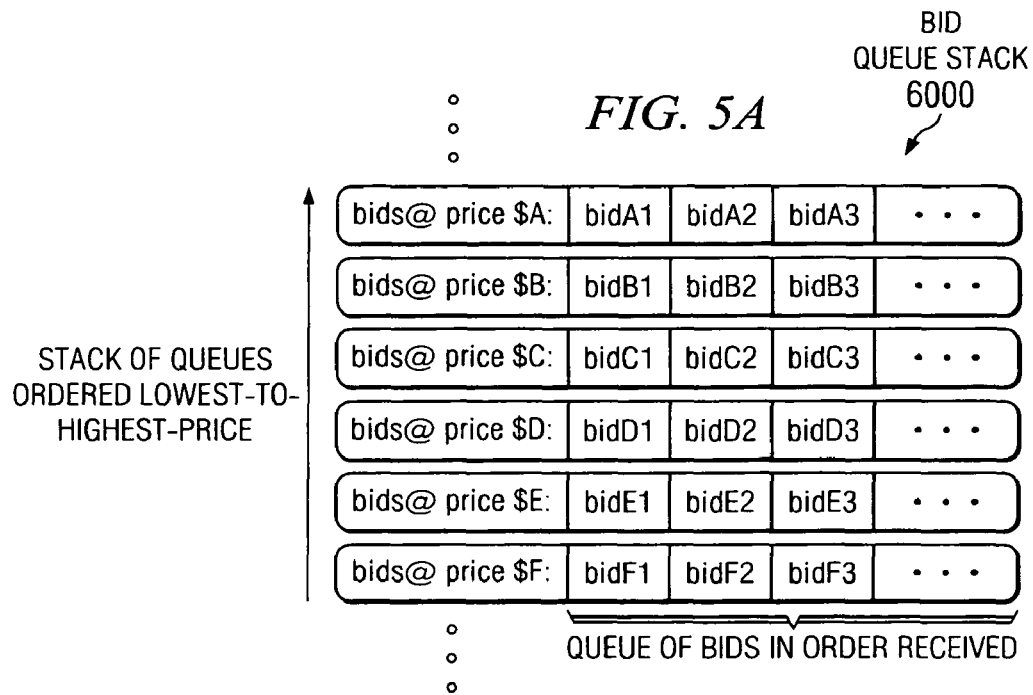
FIG. 5A illustrates a state diagram of a bid queue stack in the auction system of FIGS. 1, 12 and 18, representing an embodiment of the invention.
Figure 5B:
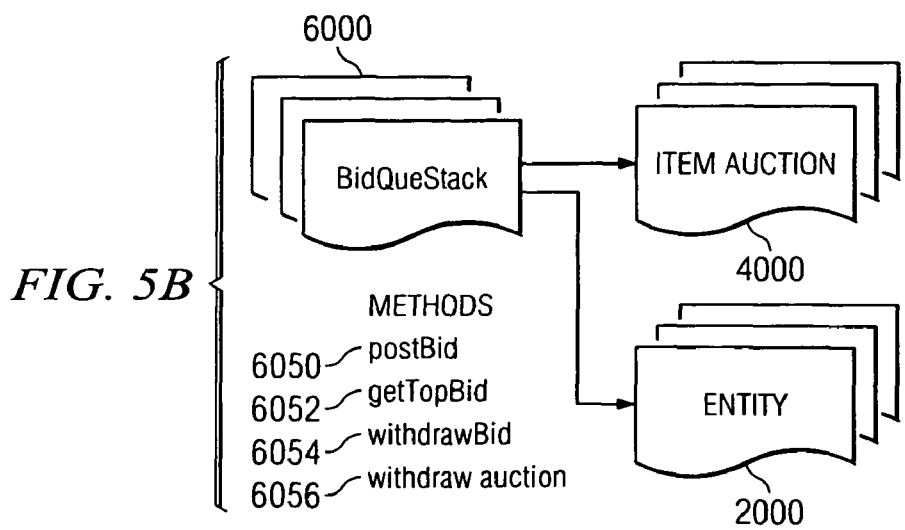
FIG. 5B illustrates additional details of the bid queue stack of FIG. 5A, representing an embodiment of the invention.

FIG. 5A: BidQueueStack

In various embodiments, a BidQueueStack 6000 is a programmatic object representing the set of bids that have been received for the item being sold through an item auction 4000, shown in FIG. 4, and which have not expired or been withdrawn. Each bid identifies an entity 2000 placing the bid, a currency amount the bidder is willing to pay, and an expiration time for the bid. The bids are organized in two dimensions. First, each bid is placed into a queue containing only other bids at the same price. Bids are ordered within each such queue by the time the bid was received. Second, the queues are arranged into a stack according to the price of the bids contained within each queue, with the queue containing the highest-priced bids at the top.

FIG. 5B

In various embodiments, programmatic objects BidQueueStack 6000, shown in FIG. 5A may support the following methods shown in FIG. 5B:

Method 6050 postBid. This method accepts a bid as a parameter, and places it at the end of the queue containing other bids at that price point, creating the queue if it doesn't exist.

Method 6052 getTopBid. This method returns the first bid from the top-most non-empty queue in the stack, if there is one; otherwise it returns null.

Method 6054 withdrawBid. This method accepts the identity of a bid as a parameter, and removes it from the queue of the BidQueueStack programming object containing it, if any.

Method 6056 withdrawAuction. This method invokes the method 7054 auctionClosed for each bid within the BidQueueStack.

In alternate embodiments, BidQueueStack 6000 may support more or less methods.

Figure 6:
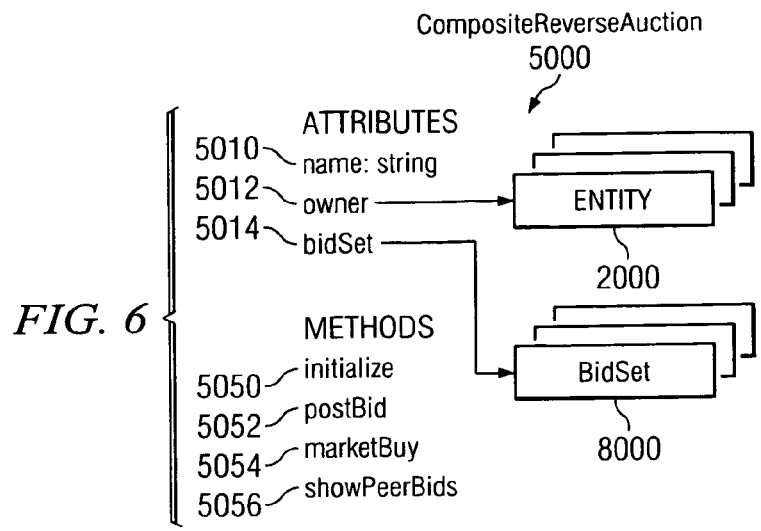
FIG. 6 illustrates a state diagram of a composite reverse auction in the auction system of FIGS. 1, 12 and 18, representing an embodiment of the invention.

FIG. 6: Composite Reverse Auction

In various embodiments, a composite reverse auction 5000 is a programmatic object defining the attributes and methods of objects used to represent composite reverse auctions.

A composite reverse auction consists primarily of a set of bids, a BidSet 8000, on different item auctions, and methods that cause the object to function as a reverse auction, as follows.

Each of the item auctions on which bids are placed allows bids to expire or to be withdrawn. When one bid from the BidSet 8000 of a composite reverse auction 5000 is accepted, the others are automatically withdrawn. This puts the item auctions on which the bids are placed into competition with each other.

In various embodiments, programmatic objects composite reverse auction 5000 may have the following attributes:

Attribute 5010 name. This attribute gives a convenient way of identifying a particular composite reverse auction 5000 object.

Attribute 5012 owner. This is a reference to the Entity 2000 object representing the entity placing bids through this composite reverse auction 5000 object.

Attribute 5014 bidSet. This is a reference to the BidSet 8000 object holding the bids being placed through this composite reverse auction 5000 object.

In various embodiments, programmatic objects composite reverse auction 5000 support at least the following methods:

Method 5050 initialize. This method accepts as parameters a string to become the name, and a reference to the Entity 2000 object to become the owner. It also creates an empty BidSet 8000 for the attribute 5014 bidSet.

Method 5052 postBid. This method accepts as a parameter a Bid 7000 object such as shown in FIG. 2. It also adds said bid to bidSet 5014. It Invokes the method 4054 postBid, noted on FIG. 4, of the item auction identified by said bid. Note that this invocation may result in the execution of a sale.

Method 5054 marketBuy. This means that the owner would like to buy the item with the current asking price closest to the bid on that item in the composite reverse auction's BidSet. Because the buyer has placed bids at different prices on each item in the BidSet, these different prices have normalized the buyer's interest in the items, i.e. any item being bid upon is equally acceptable to the buyer at the price bid.

This method accepts as a parameter a currency amount expressing a limit on the marketBuy operation. The limit is an expression of the maximum amount over the current bid the buyer is willing to pay. The reason that the limit is necessary is that the conditions of the auctions in the composite reverse auction's BidSet may change between the moment that the buyer views them and decides to buy at market, and the moment that his marketBuy request is received by the auction system. For example, the auction that has the smallest bid/ask gap might have sold to another bidder, so that auction is therefore unavailable. The auction in the composite reverse auction with the next-smallest bid/ask gap might be substantially larger. If no limit was imposed and that auction bought from instead, the buyer might pay more than he was expecting.

The reason that the limit is expressed as an amount over the current bid, rather than as a total amount, is that bids on different items in the bid set may be for different amounts. Therefore a single total would not be effective, whereas a differential can be applied to each bid to determine the actual maximum.

Figure 3:
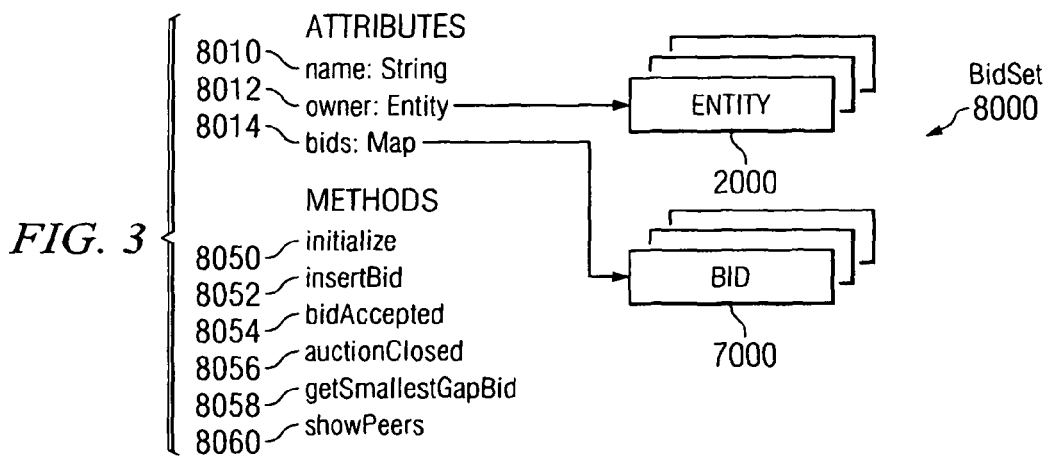
FIG. 3 illustrates a state diagram of a bid set in the auction system of FIGS. 1 and 18, representing an embodiment of the invention.

This method invokes method 8058 getSmallestGapBid on its BidSet, as shown in FIG. 3. If the gap amount of said bid is greater than the limit received as a parameter, an error is returned. Otherwise, a new bid that meets the asking price of the target auction of said smallest gap Bid is created and placed on said target auction, resulting in said new bid being accepted, and a sale therefore executing.

Method 5056 showPeerBids. This method shows the competition between sellers that the composite reverse auction has created. It presents the target auctions as a list sorted by their bid gaps, so that the auction where this buyer's bid and the seller's ask is closest is presented first. The identity of each auction is part of the information presented in the list, so that it may in turn be used to view the bidder-to-bidder competition for that item.

In various embodiments, programmatic objects composite reverse auction 5000 may have more or less attributes and/or methods.

Figure 7:
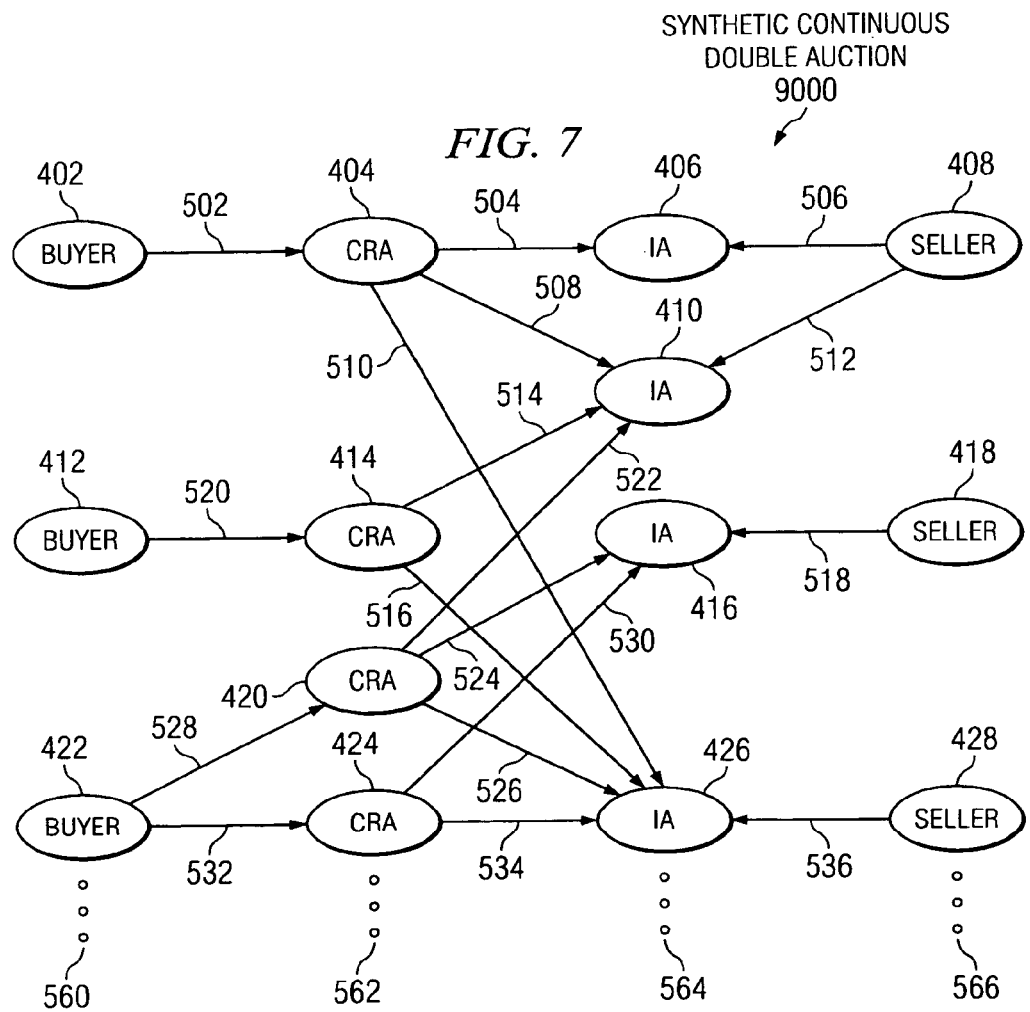
FIG. 7 illustrates a state diagram of a synthetic continuous double auction (SCDA) in the auction system of FIG. 1, representing an embodiment of the invention.

FIG. 7: Synthetic Continuous Double Auction

In various embodiments, a synthetic continuous double auction 9000 (SCDA) is a network of item auctions also known as forward auctions, and composite reverse auctions that establish competition between the buyers owning the composite reverse auctions for the items being sold through the item auctions, and competition between the sellers owning the item auctions for the business of those buyers. It is this two-way competition that makes it a double auction.

Because the network comprising the SCDA (synthetic continuous double auction) is reduced, but not eliminated, each time a sale is executed, or an item or bid is withdrawn, an SCDA is continuous. That is, from the perspective of the various buyers, when one item they are bidding on disappears because it has been sold or withdrawn, the other items they are bidding upon or may bid upon remain, hence the SCDA continues. Likewise, withdrawal of a bid from an item auction, either because the buyer purchased a competing item, or because the bid expired or was withdrawn manually, does not affect the other bids that have been placed on that item auction. They remain valid, and more bids may be received as well, so that the item auction continues.

A SCDA (synthetic continuous double auction) is referred to as synthetic because it results from the combination of multiple item auctions and composite reverse auctions, connected together by the actions of bidders.

To be more exact, an auction system 1000 combining a plurality of elements of type entity 2000, item 3000, item auction 4000, and composite reverse auction 5000, will contain a plurality of synthetic continuous double auctions (SC-DAs), where an SCDA is the transitive closure of item auctions and composite reverse auctions connected by arcs representing bids.

FIG. 7 shows an exemplary configuration of a synthetic continuous double auction. Elements are as follows:

Three instances of Entity 2000 are shown in the role of buyers, labeled "Buyer". These are buyer 402, buyer 412, and buyer 422.

Three instances of Entity 2000 are shown in the role of sellers, labeled "Seller". These are seller 408, seller 418, and seller 428.

Four instances of ItemAuction 4000 are shown, labeled IA 406, IA 410, IA 416, and IA 426.

Four instances of CompositeReverseAuction 5000 are shown, labeled CRA 404, CRA 414, CRA 420, and CRA 424.

Arc 506 and arc 512 indicate that Seller 408 has two instances of ItemAuction 5400, here labeled IA 406 and IA 410.

Arc 518 indicates that Seller 418 has a single ItemAuction 5400, here labeled IA 416.

Arc 536 indicates that Seller 428 has a single ItemAuction 5400, here labeled IA 426.

Arc 502 indicates that buyer 402 has a single instance of CompositeReverseAuction 5000, here labeled CRA 404, in its map attribute 2018 auctions.

Arcs 504, 508, and 510 indicate that CRA 404 has bids placed on three instances of ItemAuction 5400, labeled IA 406, IA 410, and IA 426 respectively.

Arc 520 indicates that buyer 412 has a single instance of CompositeReverseAuction 5000, here labeled CRA 414, in its map attribute 2018 auctions.

Arcs 514 and 516 indicate that CRA 414 has bids placed on two instances of ItemAuction 5400, labeled IA 410 and IA 426 respectively.

Arcs 528 and 532 indicate that buyer 422 has two instances of CompositeReverseAuction 5000, here labeled CRA 420 and CRA 424.

Arcs 528 and 532 indicate that buyer 422 has two instances of CompositeReverseAuction 5000, here labeled CRA 420 and CRA 424.

Arcs 522, 524, and 526 indicate that CRA 420 has bids placed on three instances of ItemAuction 4000, labeled IA 410, IA 416, and IA 426 respectively.

Arcs 530 and 534 indicate that CRA 424 has bids placed on two instances of ItemAuction 4000, labeled IA 416 and IA 426 respectively.

Ellipsis 560 indicates that there may be additional instances of Entity 2000 acting in the role of buyer, not shown.

Ellipsis 562 indicates that there may be additional instances of CompositeReverseAuction 5000, not shown.

Ellipsis 564 indicates that there may be additional instances of ItemAuction 4000, not shown.

Ellipsis 566 indicates that there may be additional instances of Entity 2000 acting in the role of seller, not shown.

Referring to FIG. 22, a flow chart of a portion of a synthetic continuous double auction is depicted. A client entity computer system 2210 is coupled to a communication system 2220, and process tasks, queries, etc. can be passed between the client entity computer system 2210 and the communication system 2220. The communication system 2220 is coupled to an auction system database 2230, and process tasks, queries, etc. can be passed between the communication system 2220 and the auction system database 2230.

Still referring to FIG. 22, this synthetic continuous double auction has contingent bidding on a plurality of heterogeneous item auctions. A composite reverse auction resident at the auction system database 2230 is defined by a bid set including a first contingent bid on a first of the plurality of heterogeneous item auctions and a second contingent bid on a second of the plurality of heterogeneous item auctions. The bid set originates at the client entity computer system 2210 and is sent to the auction system database 2230 via the communication system 2220. The bid set and composite reverse auction defined thereby cause the process to advance to block 2240. The bid set includes one or more contingent bids. If an item auction corresponding to one (or more) of the contingent bids in the bid set exists, then the process advances to block 2250. If an item corresponding to one (or more) of the contingent bids in the bid set exists, then the process advances to block 2260. If the item associated with the existing item auction has not been withdrawn, then process advances to block 2270. If the terms of the buyer meet the terms of the seller, then process advances to block 2280. The composite reverse auction is ended when i) the first contingent bid from the bid set is accepted as a winning bid and substantially simultaneously ii) the second contingent bid from the bid set is withdrawn as a remaining bid at block 2280. The process then advances to block 2290 where the transacted item is withdrawn. It is important to note that the bid set is visible to a) at least one first seller associated with the first of the plurality of heterogeneous item auctions, b) at least one second seller associated with the second of the plurality of heterogeneous item auctions, and c) buyers bidding on the first of the plurality of heterogeneous item auctions or the second of the plurality of heterogeneous item auctions.

How SCDAs Trump Shill Bidding with Sunshine and Competition

Shill bidding has always taken place in the context of forward auctions, where buyers must focus on a single item at a time, and make their decisions very quickly. The premise of shill bidding is that the buyer can be fooled into thinking that a "fair" market price is higher than his current bid, because other people (the shills, whom the honest buyer doesn't recognize as such) are willing to bid more than he is. This premise, advantageously for the buyer(s), falls apart within the context of SCDAs (synthetic continuous double auctions), as described below.

First, everything has competition, even "one of a kind" items like art. Most items will have much more direct competition, such as other sellers offering exactly the same thing. Consider the telescope example—if I am interested in 10 telescopes and am bidding on all of them, I will not be drawn into a bidding war on one of them. Rather, I will say "That telescope must have a feature of special interest to this other buyer that isn't meaningful to me—he can have it!".".

Second, SCDAs (synthetic continuous double auctions) give buyers time to consider their bids, and the resources to make meaningful comparisons between items. Time and the means for performing calm evaluation should work very effectively against shill efforts to entice panic bids.

Third, the openness of SCDAs (synthetic continuous double auctions) extends to letting bidders see what their competition is bidding on. If I am bidding on 10 telescopes, and someone else is willing to bid on only one of them, then I can see that. I may generously assume that that telescope holds a particular fascination for the high bidder, and again say "let him have it". Or, I may suspect that this anomalous bidding is disingenuous, and ignore it, placing my bid only for the price I am willing to pay and that is fair in my judgment. (It is important to remember that bids in SCDAs (synthetic continuous double auctions) don't have to be higher than previous bids.) If the seller is foolish enough to place similarly high bids on items sold by other sellers in order to mask his efforts, he will find himself the owner of those items!

EXAMPLES

Specific embodiments of the invention will now be further described by the following, nonlimiting examples which will serve to illustrate in some detail many of the various features. The following examples are included to facilitate an understanding of ways in which an embodiment of the invention may be practiced. It should be appreciated that the examples which follow represent embodiments discovered to function well in the practice of the invention, and thus can be considered to constitute preferred mode(s) for the practice of the embodiments of the invention. However, it should be noted that many changes can be made in the exemplary embodiments which are disclosed while still obtaining like or similar result without departing from the spirit and scope of an embodiment of the invention. Accordingly, the examples should not be construed as limiting the scope of the invention.

Example 1

Synthetic continuous double auctions (SCDAs) provide many attributes of CDAs (continuous double auctions) to the auctioning of non-identical items, and indeed allow any subset of the items available for auction, similar or not, to compete against each other for the business of buyers that are interested in them, at the same time that buyers are competing between each other to buy the items. However, the items for sale using SCDA (synthetic continuous double auction) technology are generally considered individually, so that a buyer may evaluate the suitability of each and what price they are willing to pay. This is necessary and appropriate when the items in competition for the business of buyers are not of essentially the same type, e.g. if a particular buyer is considering buying either a lamp or a painting, or even if the buyer is considering paintings from two different artists. However, individual consideration of items is counterproductive to the efficiency and volume of sales produced by an auction system in the many cases where the buyer is considering items that are of the same general type, varying by predictable parameters such as color, degree of wear, or presence or absence of a particular optional feature. For domains such as used books, DVDs, or automobiles, where there may be hundreds, thousands, or even millions of such items, requiring individual consideration of items is a severe disadvantage.

A normalized continuous double auction (NCDA) is a computer-implemented auction system that allows similar but non-identical items to be auctioned together. By application of normalization functions that can be customized to the perspective of individual buyers and sellers, an NCDA puts all sellers of the similar items in simultaneous competition with each other for the business of buyers, and puts all potential buyers of the similar items in simultaneous competition for the items being sold.

A normalized continuous double auction (NCDA) is a computer-implemented auction system that allows similar but non-identical items to be auctioned together. By application of normalization functions that are customizable to the perspective of individual buyers and sellers, an NCDA puts all sellers of the similar items in simultaneous competition with each other for the business of buyers, and puts all potential buyers of the similar items in simultaneous competition for the items being sold.

Offers to sell that are equivalent from the perspective of a buyer's normalization function are serviced in a first-come-first-served order, just as identical offers to sell identical items are handled in first-come-first-served order in a traditional CDA. Offers to buy that are equivalent from the perspective of a seller's item being sold are serviced in first-come-first-served order, just as identical offers to buy identical items are serviced in a first-come-first-served order within a traditional CDA. An NCDA may not be terminated due to the completion of individual transactions to buy or sell within the NCDA; hence it is continuous like a traditional CDA. An important benefit of an NCDA is that it allows buyers to place bids on the non-identical items being sold through the NCDA without considering them individually, just as buyers may place bids on the identical items being sold through a CDA without individually considering those identical items, thus greatly improving the efficiency, and thereby the resulting volume of, the buying and selling process.

The components and mechanisms for implementing various illustrative embodiments of an auction system using normalized continuous double auctions are described in detail within this section. Underlying mechanisms such as transactions and the Internet that are well-understood by those of ordinary skill in the art of computer science are not described in detail.

Figure 8:
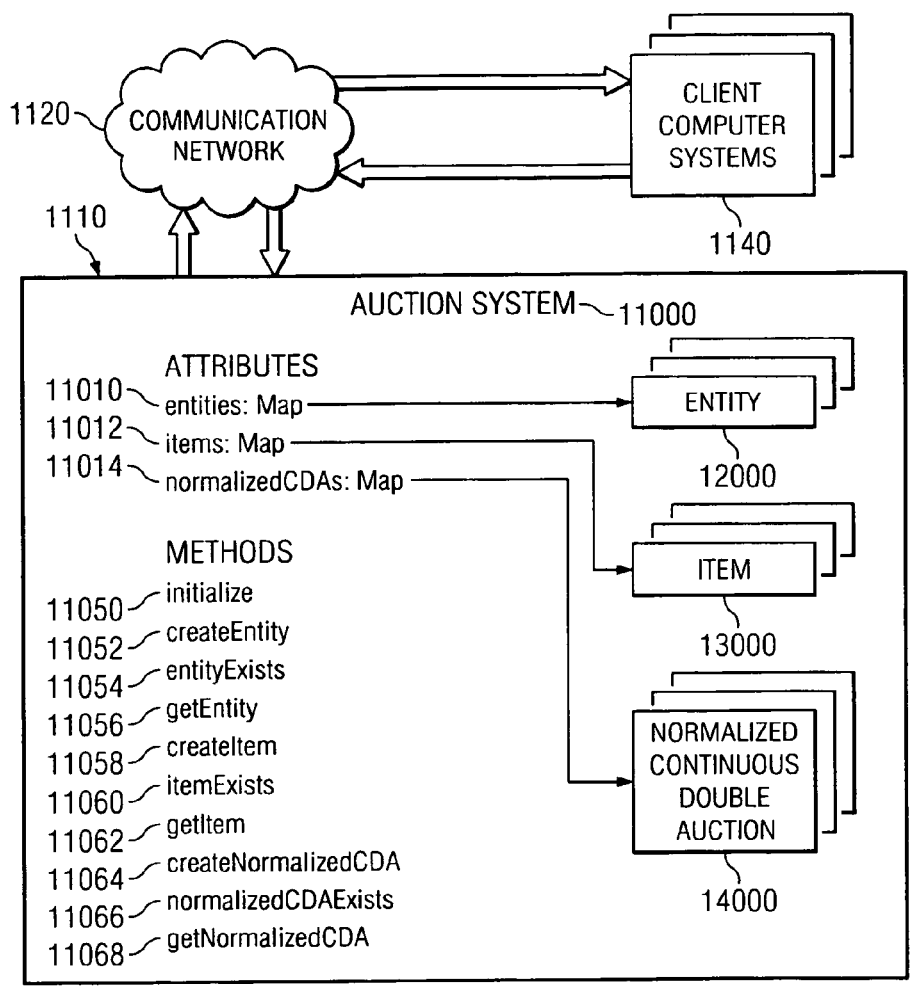
FIG. 8 illustrates a state diagram of an auction system that can be implemented by a computer program, representing an embodiment of the invention.

FIG. 8: Auction System with Communication Network and Client Computer Systems FIG. 8 shows an auction system 11000 running on a computer system 1110 coupled via a communication network 1120 to a plurality of client computer systems 1140. Communication network 1120 will typically be the Internet. However, in alternate embodiments, the invention may be utilized with other private and/or public communication networks. Typically, each system 1110/1140 includes one or more processors, memory, non-volatile mass storage, one or more input/output devices (such as keyboard, cursor control, network interface, and so forth). Any one of a number of servers available from a number of vendors may be used as computer system 1110. Any one of a number of desktop, notebook, tablet, and handheld computers (including special purpose devices, such as mobile phones) available from a number of vendors may be used as client computer system 1140.

The purpose of communication network 1120 is to accept requests to and deliver responses from auction system 11000 and its component objects. Use of such communication networks 1120 and client computer systems 140 to present these requests and responses is well understood within the field of computer programming and will not be described further.

For the illustrated embodiments, auction system 11000 implements a normalized continuous double auction (NCDA) that allows similar but non-identical items to be auctioned together. By application of normalization functions that are customizable to the perspective of individual buyers and sellers, an NCDA puts all sellers of the similar items in simultaneous competition with each other for the business of buyers, and puts all potential buyers of the similar items in simultaneous competition for the items being sold.

Offers to sell that are equivalent from the perspective of a buyer's normalization function are serviced in a first-come-first-served order, just as identical offers to sell identical items are handled in first-come-first-served order in a traditional CDA. Offers to buy that are equivalent from the perspective of a seller's normalization function are serviced in first-come-first-served order, just as identical offers to buy identical items are serviced in a first-come-first-served order within a traditional CDA. An NCDA (normalized continuous double auction) may not be terminated due to the completion of individual transactions to buy or sell within the NCDA; hence it is continuous like a traditional CDA. An important benefit of an NCDA is that it allows buyers to place bids on the non-identical items being sold through the NCDA without considering them individually, just as buyers may place bids on the identical items being sold through a CDA without individually considering those identical items, thus greatly improving the efficiency, and thereby increasing the resulting volume of, the buying and selling process.

Continuous double auctions (CDAs) are a fair and well-understood approach to trading commodities. But, as explained previously, they can be only be used if the items being traded are effectively identical. Thus, many types of items that may intuitively be viewed as commodity-like, such as used DVDs, are not suitable for trading using CDAs, because the variations between instances render them non-identical; a buyer would not be equally satisfied with any instance of a particular movie title on DVD for the same price. (Some are in better or worse condition, in a preferred or non-preferred format, or have or do not have bonus material, for example.)

Variations between instances of items in such categories may be singular or multiple, and simple or complex. For example, coins of a particular denomination, wear, and mint location are rated on a scale of 1 to 70. However, this scale is non-linear with regard to price. For example, a heavily worn coin (one in "good" condition under the grading system used until a few decades ago), would bear a rating of 4. In that condition an 1890 Morgan silver dollar is worth about its weight in silver, roughly $11. The same coin in a "mint state" of 64 sells for $150. A slightly more lustrous 65 is so rare it goes for $2,500 or more.

Still, the condition of a coin (for the same type, year, and mint location) is its single dimension of variation, with all "4" 1962-D Washington quarters, for example, considered interchangeable. Instances of the same year, make, and model of an automobile, on the other hand, vary by many attributes (exterior & interior color, cloth/leather seats, chrome or steel wheels, etc.), as well as by the condition of multiple parts and subsystems, such as the tires, engine, electrical system, exterior, interior, and windows, as well as by the vehicle's overall mileage. Other than when they are brand new, it might be difficult to find any two vehicles that would be considered truly identical.

An alternative (and complimentary) mechanism—normalization functions—may be used to allow items of types that consumers may perceive to be commodities to be presented together in an auction that appears almost identical to a traditional CDA. That is, a bid within a bid set as used in SCDAs (synthetic continuous double auctions) may actually be a bid upon either a traditional CDA or a NCDA, as well as upon an individual item auction. The particular benefit of normalization functions and the resulting "normalized continuous double auctions", or NCDAs, is that they allow buyers to bid on all items that are posted within each NCDA without having to consider each item individually. For domains such as DVDs or automobiles, where there may easily be hundreds, thousands, or millions of items within each NCDA, this will enormously enhance the efficiency of buying and selling items within the category, thus greatly increasing the volume of such sales.

A normalization function is a mechanism for characterizing the variation of items within a type, and providing a technique for bidders to express the amount they are willing to bid for items based upon this characterization, rather than having to price each item in the category individually. More precisely, a normalization maps from an {actual-price, actual-condition} pair to a normalized price.

An actualization function performs the opposite mapping. It maps from a {normal-price, actual-condition} pair to an actual price.

An exclusion function answers "yes" or "no" to the question "should an item of this condition be excluded from consideration for buying or display?" For example, a particular buyer might not want any coin rated less than 50.

Sellers characterize their items according to the guidelines associated with the NCDA. Buyers select or customize a {normalization function, actualization function, exclusion function, normal condition} tuple, then place a single bid, linked to said tuple.

Normalization, actualization, and exclusion functions are particular to the types of items to which they apply. In practice, individual bidders are not expected to define the functions defining an NCDA, or even understand their internal mechanics. Rather, such functions will typically be defined by domain experts, and presented in a tabular form with examples to show their effect. This is not to say that all bidders in an NCDA will use exactly the same function. Functions will be constructed to let bidders adjust certain parameters to fit their individual tastes, Such adjustment will be particularly important in that they will allow bidders to exclude items with or without certain characteristics, or to exclude items not within certain sub-ranges with regard to certain values.

Consider collectible coins as an example. Within the numismatic community, coins tend to be valued according to how rare they are. For each type and date of coin, this may be different. For example, coins that were used as common currency will have a wide spectrum of available conditions, with mint condition examples being the rarest, and sometimes non-existent. Other types of coins may have been issued only in proof sets, specifically intended for collectors and never really used as currency. All examples of some ancient coins may come from the same cache, and be essentially identical.

For a given type of coin, however, the appropriate sub-categories and relative rarity of each will be approximately known, even if no universal agreement exists. A given year of U.S. "Indian Head" penny, for example, would probably fit the common-currency profile described above, and a normalization function might be expressed in a table such as the following:

TABLE I

| exclude y/n | condition | premium % | example |
|---|---|---|---|
| n | [Proof] 70 | +500% | $50.00 |
| n | [Mint] 65 | +300% | $30.00 |
| n | [Mint] 64 | +200% | $20.00 |
| n | ... | ... | ... |
| n | [Excellent] 50 | 0% | $10.00 |
| n | [Very good] 40 | −30% | $7.00 |
| n | ... | ... | ... |
| n | [Very good] 30 | −60% | $4.00 |
| n | ... | ... | ... |
| n | [Very good] 20 | −80% | $2.00 |
| n | ... | ... | ... |
| y | [Very good] 10 | −90% | n/a |
| y | ... | ... | ... |
| y | [Good] 4 | −95% | n/a |

In this table, the values in the "exclude y/n" and "premium %" columns could be changed by each bidder. The "example" column would update automatically to match these changes. As shown, the table indicates that the bidder would be willing to buy a penny rated 20 or better, but will pay twice as much for a "mint 64" coin as for an "excellent 50" coin, which is only 30% as much for a "very good 40" coin as for an "excellent 50" coin, etc. (Rows with ellipsis (" . . . ") indicate regions of the table that have been left out for brevity of this presentation.)

The table row shown as underlined and bold is the "normal" variation for the above table. Every normalization function identifies a particular variation to be normal, for reasons that will be explained below.

NCDAs from the Buyer's Perspective

Like an ordinary CDA, there may be at least three actions available to buyers within a NCDA:
View the market.
Place a market buy order.
Place a good-until cancelled buy order.

How Buyers View NCDAs

There are three groups of elements to view in an NCDA: outstanding sell orders, outstanding buy orders, and transaction history.

For a buyer, the NCDA is presented as a virtual CDA with the above three groups of elements, adjusted to accommodate the normalization function that the buyer is using.

How Buyers View Outstanding Sell Orders

The outstanding sell orders are presented by first applying the buyer's exclusion function to all currently available items in the category to see if any are excluded. The non-excluded items are then subjected to the buyer's normalization function to determine the corresponding asking price from that seller for an item in 'normal' condition. So, for example, if there were 100 pennies of a particular type, mint origin, and strike year up for auction currently, the list of all 100, with their grade characteristics, would be sent to the buyer's computer, which would then apply the buyer's exclusion function to exclude any that were in an unacceptable condition. The actual-price, and actual-condition for the remainder of the for-sale items would be put through the buyer's normalization function to yield a normalized price for each. For example, what that seller would theoretically be asking for an item in "normal" condition. If multiple items have the same price for their theoretical "normal", then the items are ordered within that price by the time their ask was posted earliest first.

The result of this presentation process is a CDA tailored to the expressed preferences of a particular buyer. Using the normalization function above, for example, no coins in "good 4" condition would be shown, because they are not of interest. Note also that the elements at each price point may be of different grades. It is their normalized asking price that is the same, not their actual condition or actual asking price. As a refinement of this presentation, the buyer could view the actual composition of each queue, examining the listing for each individual coin within the queue if so desired.

How Buyers View Transaction History

Transaction history is presented to the buyer through a similar filtering mechanism. That is, items they would exclude from interest are not shown at all; and price normalization based upon the characteristics of the item actually sold is applied, yielding a comparative selling price.

Each item in the NCDA's transaction history thus has the actual selling price, the normalized bid price from which the actual price was derived, and the normalization function itself.

If the normalization function shown in the table above was used, for example, a penny in "excellent 50" condition that sold for $10 would be shown as having been sold for $10. However, a penny sold in "very good 20" condition for $2 to a buyer using that same normalization function would have a "comparative" price of $10 as well, because the "normalized" price that was bid to yield the actual bid of $2 was $10.

The result is that the past sales of all grades of penny can be shown on a single graph. As an enhancement to this presentation, a viewer may "drill down" to look at the detail of any particular sale, at which point the actual price, condition, etc are presented as well.

How Buyers View Outstanding Buy Orders

Effectively presenting the set of outstanding buy orders is important to buyers because it lets them see their competition. However, because of the fact that these outstanding buy orders are not for a fixed price, but rather consist of a {normalization function, actualization function, exclusion function, normal condition definition, normal condition price} tuple, they cannot be compared directly. (A simplified version of this scheme would require that all buyers use the same normal condition definition and normal condition price—under those circumstances, the outstanding bids could all be compared directly, because they would be for the same 'normal' item. However, allowing buyers to have different "normal" definitions is helpful because no single definition would necessarily be acceptable to all buyers. For example, one buyer might want only proof 70 coins; hence the excellent 50 coin that is used as the 'normal' in the example above would be unacceptable to them.)

To view and compare outstanding bids from the perspective of a prospective buyer, the prospective buyer needs to select a (normalization function, actualization function, normal condition definition) tuple; if the buyer has placed a bid, then the tuple associated with his bid may be used. Each bid is then tested to see if it's normal condition would be excluded by the exclusion function of the viewing buyer; if is excluded it is skipped. The 'normal' definition of the bid is then passed as the 'actual condition' parameter to the normalization function of the viewing buyer to yield a bid price corresponding to the viewing buyer's 'normal' definition. (Note that if the "normal" definition associated with the bid to be compared and the viewing buyer's "normal" definition are the same, this is an identity transformation—no change.) The resulting set of bid prices calculated for the viewing buyer's "normal" definition are then sorted according to price first, and then by time received within groups at the same price.

The result is that a prospective buyer can view the outstanding demand within the market, filtered and adjusted to reflect his own preferences.

Market Buy Orders

A market buy is performed by applying the buyer's normalization function to all outstanding sell offers (asks), and executing a buy on the item having the lowest normalized price. If there is more than one item at that same lowest normalized price, the item with the earliest post time is selected. (First come, first served—just like a regular CDA.)

A limit may be expressed for a market buy, e.g. "not more than $20", where again the $20 is expressed in normalized terms. The reason for having a limit on a market buy is that the set of items available may change in the time between a buyer viewing the NCDA and the time their order is executed. So, the buyer looks at the NCDA presented as described above, then places his buy order based on the expectation that he will be buying the lowest normalized-priced item that he saw. However, that item and all others with the same normalized price may disappear before his order is actually executed; in this case if no item within the normalized-price constraint expressed by the limit remains, the market-buy order simply fails, with explanation, leaving the buyer to reconsider whether he still wants to issue a new buy request based upon the changed market conditions.

Good-Until-Cancelled Buy Orders

Good-until-cancelled buy orders are handled by first evaluating whether the normalization function and price specified combine to meet the asking price of any existing item, just like a market buy order. Those that do not are simply kept in a table, where each such order consists of its normalization function, its normalized bid amount, plus the time that the order was received.

Note that there is no single set of effective bid prices represented by these outstanding bids. Instead, there is a set of bid prices corresponding to each permutation of variations within the item type. Since some variations could be represented by real numbers or unbound integers, this corresponds to an infinite number of sets of bid prices. In practice this isn't a problem, however, since an effective set of bid prices can be quickly computed for any particular instance of the item type, and what sellers sell are such particular instances.

NCDAs from the Seller's Perspective

Like traditional CDAs, NCDAs are symmetric with regard to buyers and sellers. Hence there may be at least three actions available to sellers:

View the NCDA.
Place a market sell order.
Place a good-until cancelled sell order at a particular price.

How Sellers View NCDAs

As with a buyer, there are three groups of elements to view in an NCDA: outstanding sell orders, outstanding buy orders, and transaction history.

For a seller, the NCDA may also be presented as a virtual CDA with the above three groups of elements, except that their rendering for comparison purposes is done differently than for a buyer. This is because, whereas a buyer has a normalization function which expresses his value bias, a seller has an actual item with particular characteristics. The seller's interest is thus in seeing the market from the perspective of selling that particular item. This is accomplished as follows.

How Sellers View Outstanding Buy Orders

A potential seller is interested in how outstanding buy orders relate to the item he wants to sell. So, the normalization function associated with each outstanding bid is applied to the condition of the seller's actual item, yielding the price that bidder would actually pay for it. These prices are grouped into same-price queues ordered by post time for presentation.

How Sellers View Transaction History

A transaction history view is prepared for a seller in a manner very similar to that used for buyers, except that the actual buyer's normalization function is used to determine what price they would have paid for the item if it had the characteristics of the item being sold by this seller.

For example, say that this seller has a penny in "very good 40" condition, and the transaction in question was for a penny in "very good 30" condition sold for $4, using the normalization function shown in tabular format above. This means the buyer actually bid $10 for a penny in "excellent 50" condition, which is the "normal" case for this function. Using the same function, then that buyer would have paid $7 for a "very good 40" penny, which is what the current seller has. So, that prior transaction is rendered at a comparison price of $7, even though the actual "very good 30" penny sold for only $4.

Using this approach, the seller can see what buyers involved in past transactions would have paid for the item the seller is now contemplating selling. (Note: If any buyer's normalization function would have excluded the current seller's item, that transaction may be excluded from the comparison.)

How Sellers View Outstanding Sell Orders

It is also important for prospective sellers to be able to view their competition. This is done by using a normalization function and a "normal" condition that is the condition of the item the viewing seller is selling.

Market Sell Orders

When a seller places a market sell order, it is evaluated against all of the outstanding bids, and the highest outstanding bid is accepted. Again, this evaluation applies the normalization function associated with each outstanding bid to the specific attributes of the item being sold to determine an actual bid price. If there are multiple outstanding bids at this same highest actual bid price, the one with the earliest post time is selected. Like market buy orders, market sell orders may specify a limit, although for a market sell the limit is the minimum actual bid price to be accepted, not the maximum.

Good-Until-Cancelled Sell Orders

When a good-until-cancelled sell order is placed, it is first evaluated against outstanding bids. If this does not result in execution of a sale, the order (an "ask") is simply kept in the table that is used to prepare CDA views and against which market buy orders are executed.

Referring to FIG. 8 again, auction system 11000 is implemented in an entity-relationship manner, with the entities having attributes and methods. In alternate embodiments, auction system In various embodiments, auction system 11000 may have the following attributes:

Attribute 11010 entities is a map establishing a 1-to-1 correspondence between names of entities 12000 within auction system 11000 and the entities 12000 having those names.

Attribute 11012 items is a map establishing a 1-to-1 correspondence between names of items 13000 known within auction system 11000 and the items 13000 having those names.

Attribute 11014 normalizedCDAs is a map establishing a 1-to-1 correspondence between names of normalized continuous double auctions 14000 known within auction system 11000 and the normalized continuous double auctions 14000 having those names.

In various embodiments, auction system 11000 may have the following methods.

Method 11050 initialize. This method prepares auction system 11000 for initial operation, including creating an empty map 11010 entities, an empty map 11012 items, and an empty map 11014 normalizedCDAs.

Method 11052 createEntity. This method associates type and description information for an external entity with an identifier used to refer to that entity within the auction system 11000. In the context of auction system 11000, an entity is a person, or a corporation, government, or similar organization, capable of owning items 13000 that may be bought or sold using auction system 11000.

Method 11054 entityExists. This method checks whether an entity 12000 identified by an identifier received as a parameter to the method is known to auction system 11000, i.e. is contained within the map 11010 entities.

Method 11056 getEntity. This method uses a parameter identifier to look up an entity 12000 within map 11010 entities, and a return a reference to the associated programming object of type entity if the mapping exists.

Method 11058 createItem. This method associates type and description information for an external item with an identifier used to refer to that item within the auction system 11000. In the context of auction system 11000, an item is a product or service subject to being bought or sold within auction system 11000 by an entity, 12000.

Method 11060 itemExists. This method checks whether an item 13000 identified by an identifier received as a parameter to the method is known to auction system 11000, i.e. is contained within the map 11012 items.

Method 11062 getItem. This method uses an identifying parameter to look up an item 13000 within map 11012 items, and to return a reference to the associated programming object of type item if the mapping exists.

Method 11064 createNormalizedCDA. This method creates a programming object representing a normalized continuous double auction 14000, and uniquely associates it with an identifier received as a parameter to the method, that is, enters it into map 11014 normalizedCDAs.

Method 11066 normalizedCDAExists. This method checks whether a normalized continuous double auction 14000 identified by an identifier received as a parameter to the method is known to auction system 11000, i.e. is contained within the map 11014 normalizedCDAs.

Method 11068 getNormalizedCDA. This method uses an identifying parameter to look up a normalized continuous double auction 14000 within map 11014 normalizedCDAs, and to return a reference to the associated programming object of type normalized continuous double auction 14000 if the mapping exists.

The programming objects entity 12000 may represent external entities and the monetary resources and items that those entities have made known to auction system 11000. The programming objects may include the ability to transfer funds, or to send communication to initiate and confirm transfer of funds, and to transfer ownership of items, or to send communication to initiate and confirm transfer of ownership.

The programming objects item 13000 may represent external products and services such as may be bought and sold through auction system 11000. These programming objects may include abilities such as identifying the entity that currently owns them. The description of each item includes the factors required as input to normalization functions for items of its type in order for the normalization functions to calculate values based upon the description and function. For example, a coin's type would include its national origin, denomination, year, strike date, and mint location. Its description would include its condition rating 1-70.

The programming objects normalized continuous double auctions 14000 are described below.

In alternate embodiments, auction system 11000 may have more or less attributes and/or methods.

Name-Value Lists for Defining Condition

An item's condition is described by a list of {name, value} pairs, where name is an attribute of items of the type being sold through the auction, and value describes a possible value of that attribute. A value may itself be a list of {name, value} pairs, i.e. the list may contain nested lists. Examples:

{{color, blue}; {size, large}}

{coin-condition, 50}

{interior, {{seat-material, leather}; {carpet-color, grey}}}

Normalization Functions

A normalization function takes an actual price and an actual condition as input, and produces a normalized price as its result. This is used, for example, for producing comparable asking prices for items in different conditions with different asking prices. Example transformations:

{actual-price=$7.00; actual-condition="very good 40"}→normal-price=$10.00.

{actual-price=$30.00; actual-condition="mint 65"}→normal-price=$10.00.

Actualization Functions

An actualization function is the inverse of a normalization function. It takes a normalized price and an actual condition as input, and produces an actual price as its result. This is used, for example, for determining the actual price that a bidder will pay for an actual item, based upon a bid expressed using the actualization function and a normal price. Example transformations:

{normal-price=$10.00; actual-condition="very good 40"}→actual-price=$7.00.

{normal-price=$10.00; actual-condition="mint 65"}→actual-price=$30.00.

Exclusion-Functions

An exclusion function takes the name-value list describing the condition of an item and returns the value true if the condition is excluded, false otherwise. Example transformations:

{coin-condition="good 4"}→true (i.e. exclude the item)

{coin-condition="very good 40"}→false (i.e. do not exclude the item)

FIG. 9: Ask 16000

For the illustrative embodiments, an ask 16000 is a programmatic object identifying the normalized continuous double auction 14000 that the ask 16000 is being placed on (and thereby the type of item being offered for sale), the amount being asked, the entity placing the ask, the normalization function associated with the ask, and the time the ask will expire In various embodiments, an ask 6000 may have the following attributes:

16008 condition. This is a list of name-value pairs that describe the condition of the item which, if this ask is accepted, will be sold to the buyer.

16010 askAmount. This expresses the monetary quantity being asked for in exchange for an item of the type being sold through the normalized continuous double auction 4000 on which the ask is placed.

16012 auction. This refers to the programmatic object representing the normalized continuous double auction 14000 on which the ask is placed.

16014 seller. This refers to the Entity 12000 that placed the ask.

16016 function. This refers to the normalization function 18000 associated with the ask.

16018 expiration. This is the time at which the ask will expire. Note that when this point in time is reached, the ask 16000 object will invoke its own method 16054 withdraw, if the ask has not yet been accepted.

16020 timeReceived. This is the time at which the ask was posted to the auction.

A bid may have the following methods:

16050 initialize. This method takes as parameters the condition, askAmount, auction reference, seller reference, function identification, and expiration time that are then assigned as the corresponding attributes of the object.

16052 accept. This method is called when the ask is accepted by a buyer, i.e. a buyer has agreed to buy the item at the price asked. This method causes or initiates the exchange of funds for ownership comprising a sale.

16054 withdraw. This method is called to withdraw an ask from an auction. It functions by calling method 14062 withdrawAsk of the programming object 16012 auction.

In various embodiments, an ask may have more or less attributes and/or methods.

FIG. 10: Bid 17000

For the illustrative embodiments, a bid 17000 is a programmatic object identifying the auction that is being bid upon (and thereby the item being bid on), the amount of the bid, the entity placing the bid, the normalization function associated with the bid, and the time the bid will expire.

In various embodiments, a bid 17000 may have the following attributes:

17010 normalBidAmount. This expresses the monetary quantity of the bid for an item in "normal" condition.

17012 auction. This refers to the programmatic object representing the normalized continuous double auction 14000 on which the bid was placed.

17014 buyer. This refers to the Entity 12000 that placed the bid.

17016 normalizationFunctionhis refers to the normalization function 18000 associated with the bid.

17018 actualizationFunction. Used for determining the actual price that a bidder will pay for an actual item the Bid 17000 object will invoke its own method 07054 withdraw, if the bid has not yet been accepted.

A bid may have the following methods:

17050 initialize. This method takes as parameters the bidAmount, auction reference, buyer reference, function identification, and expiration time that are then assigned as the corresponding attributes of the object.

17052 accept. This method is called when the bid is accepted by the seller, i.e. the seller has agreed to sell the item at the price calculated from the bid, the seller's item, and the bid's normalization function. This method causes or initiates the exchange of funds for ownership comprising a sale.

17054 withdraw. This method is called to withdraw a bid from an auction. It functions by calling method 14060 withdrawBid of the programming object 17012 auction.

In various embodiments, a bid may have more or less attributes and/or methods.

Figure 11:
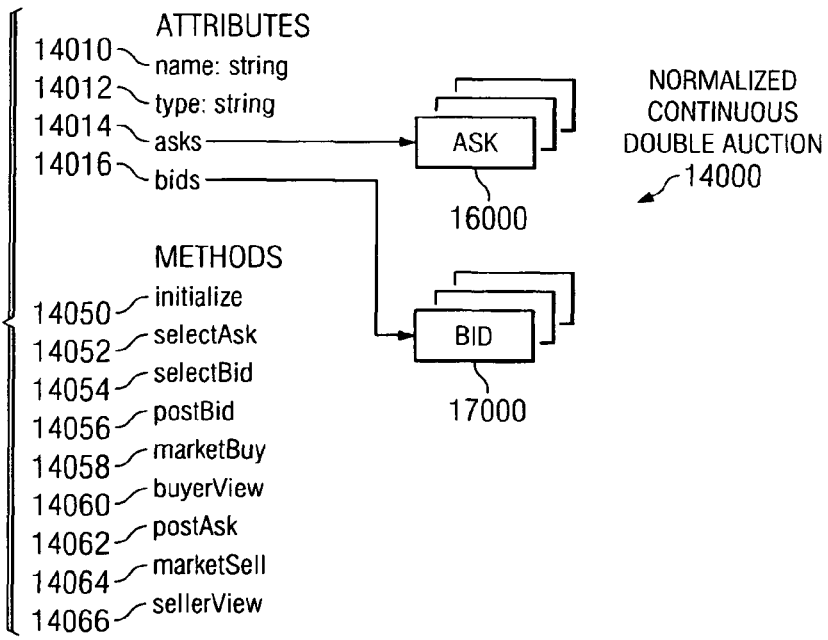
FIG. 11 illustrates a state diagram of a normalized continuous double auction in the auction system of FIG. 8, representing an embodiment of the invention.

FIG. 11: Normalized Continuous Double Auction 4000

In various embodiments, a normalized continuous double auction 14000 is a programmatic object defining the attributes and methods of objects used to represent normalized continuous double auctions.

A normalized continuous double auction 14000 may have the following attributes:

14010 name. This identifies the auction.

14012 type. This identifies the type of item being sold through the auction.

14014 asks. This is the list of asks (i.e. offers to sell an item of the type being sold through this auction at a particular price) that have been submitted, and which have not expired, nor been accepted.

14016 bids. This is the list of bids (i.e. offers to buy an item of the type being sold through this auction at a price computed using an associated normalization function and normal price) that have been submitted, and which have not expired, nor been accepted.

A normalized continuous double auction 14000 may have the following methods:

14050 initialize. Accepts as parameters a string to become the auction's 14010 name, and a string to become the auction's 14012 type. Creates an empty list 14014 asks, and an empty list 4016 bids.

14052 selectAsk. This method takes as parameters a normalization function and a list of asks 16000, shown in FIG. 9. It computes a normalized ask price for each ask 16000 in said list by applying said normalization function 18000 to the condition 16008 of said ask 16000. It then sorts the resulting {normalized ask price, ask} pairs, ordered first by the normalized ask price, and second (for the case where there are multiple asks with the same normalized ask price) by the attribute timeReceived 16020 of the corresponding ask 16000. The first element of this sorted list is then returned (the ask with lowest computed normalized price, at the earliest timeReceived in the event there are multiple asks with that same lowest computed normalized price).

Figure 10:
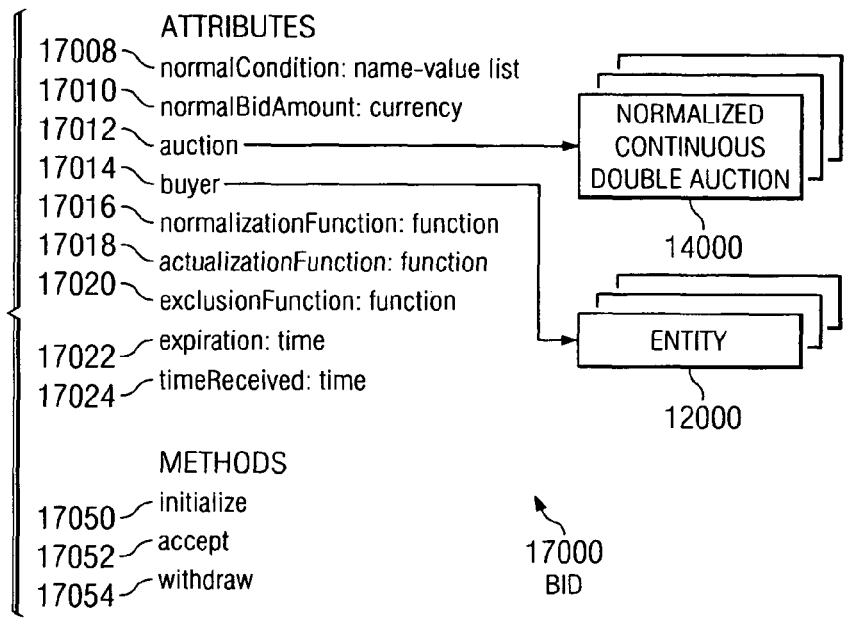
FIG. 10 illustrates a state diagram of a Bid (offer to buy at a specific normalized price) in the auction system of FIG. 8, representing an embodiment of the invention.

14054 selectBid. This method takes as parameters a list of name-value pairs describing the condition of an item of the type 14012 being sold through the normalized continuous double auction 14000, and a list of bids 17000. For each element of said list of bids, the method applies the actualizationFunction 17018, shown in FIG. 10, of the bid to said condition to calculate an actual bid price. The bids are sorted into a list of {actual bid price, bid} pairs, ordered first by the actual bid price in high-to-low order, and second (for the case where there are multiple actual bid prices that are the same) by the attribute timeReceived 17024 of each bid 17000. The first element of this sorted list is then returned (highest actual bid price, earliest timeReceived).

14056 postBid. Accepts as parameters a normal price amount, an entity 12000 object, a normalization function, an actualization function, and an expiration time. Invokes method 14052 selectAsk using said normalization function and list 14014 asks. If an ask 16000 is returned, the normalized price associated with that ask is compared with said normal price amount; if the price of the ask is equal to or less than said normal price amount, a sale is executed at the actual price askAmount 16010 of the said returned ask1 6000. (Note: the comparison is based on normalized pricing, the sale is based upon the actual ask price.) Otherwise, a bid 17000 object is created using said normal price amount as 17010 bidAmount, said entity identity as the attribute 17014 buyer, said normalization function as the attribute 17016 normalization function, said actualization function as the attribute 17018 actualization function, and said expiration time as the attribute 17022 expiration, and the current time as the attribute 7024 timeReceived of the bid 17000 created. The bid 17000 object created is added to the list attribute 14016 bids.

14058 marketBuy. Accepts as a parameter a limit price amount to use as the maximum normalized price amount that will be paid for an item in normal condition, and a normalization function. Invokes method 14052 selectAsk using said normalization function, and list 14014 asks. If the result is null, an error is returned indicating that no outstanding asks are available to meet via a marketBuy operation. If the result is non-null, and the returned normalized price associated with the returned ask is equal to or less than said limit normalized price amount, a sale is executed at the actual price amount associated with the selected ask, otherwise an error is returned indicating that no outstanding asks are available to meet via a marketBuy operation within the specified limit normalized amount.

14060 buyerView. Accepts as a parameters the buyer's normalization function, actualization function, exclusion function, and normal-definition. Prepares and presents three lists: normalized outstanding sell orders (asks), normalized outstanding buy orders (bids), and normalized transaction history, as follows:

Normalized outstanding sell orders (asks) are prepared as follows:

For each element of list 14014 asks:

The buyer's exclusionFunction 17020 is used to test whether the item should be excluded based upon its condition. If so, discard this ask from consideration and continue with the next list item.

The buyer's normalization function is applied to the {condition, askAmount} of the ask, producing a normalized price, which is paired with the ask to form a {normalized-price, ask} pair.

The set of {normalized-price, ask} pairs is sorted from lowest to highest normalized-price, and if there are multiple pairs having the same normalized-price, those items are sorted by the attribute 16020 timeReceived of the ask.

Normalized outstanding buy orders (bids) are prepared as follows:

For each element of list 14016 bids:

If the viewing buyer's exclusion function would exclude the 'normal' definition with regard to which the bid was placed, this bid is excluded from consideration.

Otherwise, the normalBidAmount 17010 and normalCondition 17008 of the bid is passed to the normalization function of the viewing buyer (acting as parameters actual price and actual condition), to yield a {normal-price, bid} pair. (Note: if the normal-condition associated with the bid happens to be the same as the normal-condition of the viewing buyer, then the normal-price of the bid is unchanged.)

The list of {normal-price, bid} pairs is sorted first by price (highest to lowest), then by timeReceived within same-price groups; the list is presented to the viewing buyer in this order.

Transaction history is prepared as follows. First, items in the transaction history are subjected to the buyer's exclusion function to exclude any that would not be of interest to the buyer. The buyer's normalization function is then applied to remaining items to produce a corresponding price for a 'normal' item for each. These prices are then presented to the buyer in transaction order. (Note: the prices thus presented may be different than the prices actually paid, as they are "normalized".)

14062 postAsk. Accepts as parameters a name-value list describing the condition of an item of the type 14012 to be sold, an asking price for that item, an entity 12000 object (the item's seller), a normalization function, and an expiration time. Invokes method 14054 selectBid, passing said condition, and the list 14016 bids. If the result of 14054 selectBid is non-null, and the actual bid price is equal to or greater than said asking price, then a sale is executed at said actual bid price. Otherwise, a new programmatic object of type ask 16000 is created using said name-value list for attribute 16008 condition shown in FIG. 10, said asking price for attribute 16010 askAmount, a reference to the normalized continuous double auction performing this operation for attribute 16012 auction, shown in FIG. 9, the entity 12000 object who is selling the item as attribute 16014 seller, shown in FIG. 9, said normalization function as the value of attribute 16016 function, and said expiration time for attribute 16018 expiration, shown in FIG. 9.

14064 marketSell. Accepts as parameters a name-value list describing the condition of an item of the type 24012 to be sold, and a limit price amount to use as the minimum price amount that will be accepted in exchange for the item of the type 14012 to be sold. Invokes method 14054 selectBid, passing the list of name-value pairs describing the condition of said item, and the list 14016 bids. If null is returned, an error is given explaining that no bids are available to accept via a marketSell operation. Otherwise, if the actual bid price of the element returned is equal to or greater than said minimum price amount, a sale is executed at the said actual bid price; if not, then an error is returned indicating that no outstanding bids are available to meet via a marketSell operation at or above the specified limit amount.

14066 sellerView. Accepts as a parameter the seller's normalization function, actualization function, and name-value list specifying condition of seller's item. From the seller's perspective the "normal" condition is the actual condition of the seller's item, hence that is the 'normal' condition used for transformation and comparison. Prepares and presents three lists: normalized outstanding sell orders (asks), normalized outstanding buy orders (bids), and normalized transaction history, as follows:

Normalized outstanding sell orders (asks) are prepared as follows:

For each element of list 14014 asks:

The seller's normalization function is applied to the {actual-price-asked, actual-item-condition} of the ask, producing a normalized price (where the "normal" condition is the condition of the viewing seller's item). The result is paired with the ask to form a {normal-price, ask} pair.

Figure 9:
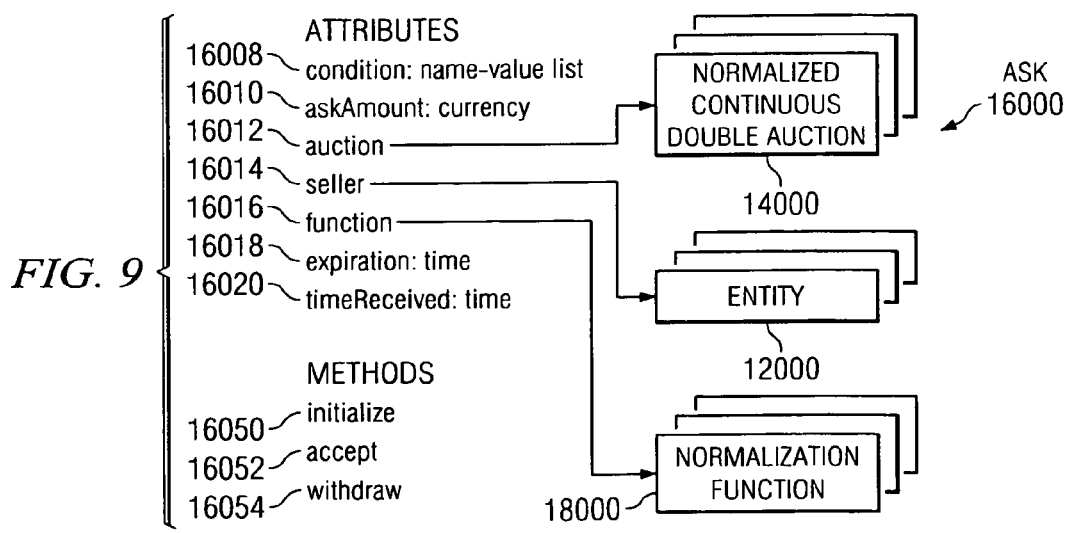
FIG. 9 illustrates a state diagram of an Ask (offer to sell at a specific price) in the auction system of FIG. 8, representing an embodiment of the invention.

The set of {normal-price, ask} pairs is sorted from lowest to highest price, and if there are multiple pairs having the same normalized-price, those items are sorted by the attribute 16020 timeReceived, shown in FIG. 9, of the ask.

Normalized outstanding buy orders (bids) are prepared as follows:

For each element of list 14016 bids, the buyer's normalization function is applied to the condition of the seller's actual item, yielding the price the buyer would actually pay for this item; these prices are presented in descending order, with bids yielding the same actual price sorted by timeReceived.

Transaction history is prepared as follows. Each transaction has stored with it the {normalization-function, normal-condition, normal-bid} that the buyer used. The normalization function is used to evaluate what that buyer would have paid for the item in the actual condition of this seller's item; those calculated prices are then presented in historical (time) order.

Referring to FIG. 23, a flow chart of a portion of a normalized continuous double auction is depicted. A client entity computer system 2310 is coupled to a communication system 2320, and process tasks, queries, etc. can be passed between the client entity computer system 2310 and the communication system 2320. The communication system 2320 is coupled to an auction system database 2330, and process tasks, queries, etc. can be passed between the communication system 2320 and the auction system database 2330.

Still referring to FIG. 23, this normalized continuous double auction has contingent bidding on a plurality of heterogeneous item auctions. A composite reverse auction resident at the auction system database 2330 is defined by a bid set including a first contingent bid on a first of the plurality of heterogeneous item auctions and a second contingent bid on a second of the plurality of heterogeneous item auctions. The bid set originates at the client entity computer system 2310 and is sent to the auction system database 2330 via the communication system 2320. The bid set and composite reverse auction defined thereby cause the process to advance to block 2340. The bid set includes one or more contingent bids. If an item auction corresponding to one (or more) of the contingent bids in the bid set exists, then the process advances to block 2350. If an item corresponding to one (or more) of the contingent bids in the bid set exists, then the process advances to block 2360. If the item associated with the existing item auction has not been withdrawn, the process advances to block 2365. If an item corresponding to one (or more) of the contingent bids in the bid set meets one (or more) parameters of one (or more) normalization functions set by the buyer associated with the bid set and/or the sell associated with the item, then the process advances to block 2370. If the terms of the buyer meet the terms of the seller, the process advances to block 2380. The composite reverse auction is ended when i) the first contingent bid from the bid set is accepted as a winning bid and substantially simultaneously ii) the second contingent bid from the bid set is withdrawn as a remaining bid at block 2380. The process then advances to block 2390 where the transacted item is withdrawn. Again, it is important to note that the bid set is visible to a) at least one first seller associated with the first of the plurality of heterogeneous item auctions, b) at least one second seller associated with the second of the plurality of heterogeneous item auctions, and c) buyers bidding on the first of the plurality of heterogeneous item auctions or the second of the plurality of heterogeneous item auctions.

Example 2

Entities that buy or sell items through online auction mechanisms frequently have one remaining problem. This problem is that the same entity is essentially replacing one item with another, e.g. "trading in" item A for item B. In such situations, there can be significant difficulties with performing either action before the other. For example, if item A is sold prior to buying item B, then neither item A or item B is available to use for some period The entity has a gap in ownership where no version of the relevant item is available. Conversely, if item B is purchased before item A is sold, then the funds from selling item A are not available for buying item B, and in fact the true amount to be yielded from selling item A cannot be accurately determined until it is actually sold, leaving the possibility of an unanticipated deficit, as well as the potential for other problems having to do with managing the ownership of two items at once.

Embodiments of the invention facilitate computer implemented compound buy-sell auction, combining the functions of an item auction and a composite reverse auction. In various embodiments, the combinations are performed within a synthetic continuous double auction (SCDA). An SCDA is a virtual market having a network of forward auctions, composite reverse auctions, and compound buy-sell auctions. Within an SCDA (synthetic continuous double auction), all buyers compete with each other for the items being sold by all sellers, and all sellers compete with each other for the business of all buyers. The compound buy-sell auction lets the same entity sell an item through the mechanism of an item auction, and buy an item through the mechanism of a composite reverse auction, performing both actions within the same computer-implemented transaction.

Embodiments of the invention are adapted to facilitate online compound buy-sell auction (CBSA) that gives an entity the ability to sell one item (the "sale target item") and buy another (the "buy target item") at the same time. In these embodiments, a CBSA may have one or more of the following characteristics:

The sale of the sale target item and the purchase of the buy target item are completed in a single transaction, so that either both actions are completed successfully, or neither is performed at all.

A CBSA effectively combines the functions of an item auction with the functions of a composite reverse auction in a manner such that the CBSA interoperates within the context of a synthetic continuous double auction (SCDA) composed of buyers, sellers, forward auctions, and composite reverse auctions, as though the CBSA itself was either an item auction or a composite reverse auction, depending upon the perspective of the other object being interacted with. These interactions are described below. Here, the term "forward auction" may mean at least any of the following: an item auction, a continuous double auction, a normalized continuous double auction, or other CBSAs acting as item auctions.

The bid set of a CBSA allows the owner of the CBSA to place bids on multiple candidate target buy items concurrently, thus placing the owners of the respective forward auctions being bid upon into competition with each other for the business of the owner of the CBSA.

The funds acquired from the sale of the target sale item are applied to the purchase of the target buy item, so that the CBSA owner does not have to muster the resources to own both the target sale item and the target buy item at the same time; the CBSA owner moves directly from owning only the target sale item to owning only the target buy item, never owning both of them at the same time. Likewise, the CBSA owner does not have to suffer the inconvenience of owning either item. (In other embodiments, ownership and payment may be arranged independently of the completion of the CBSA, and only the contractual intention with regard to which items are bought and sold, and at what price, will be determined by the execution of the CBSA. Even in these circumstances, the logistics of arranging for payment and transfer of ownership are expected to be made substantially easier by the contractual result of the CBSA, again due to the fact that the CBSA owner does not have to support the responsibilities of owning both the target sale item and the target buy item at the same time.)

Bidding by prospective buyers upon the sale target item occurs concurrently with bidding (via "differential bids"—see below) by the CBSA owner on a plurality of candidate buy target items. Thus, the CBSA owner does not have to complete the sale of his sell target item before bidding on or buying the buy target item, nor does he have to purchase the target buy item before selling the target sale item.

Bids placed by the CBSA owner upon buy target items may be "differential bids". A differential bid is expressed as a monetary amount, which may be either positive or negative, to be added to the anticipated proceeds of selling the sale target item in order to yield the actual amount of the bid. The amount of the anticipated sale target item proceeds at any given moment is determined by the amount of the top bid at that moment, or $0.00 if there is currently no bid. This value for the anticipated proceeds amount is justified because receipt of a bid represents a contractual offer from the bidder to pay the indicated amount if that bid is accepted. When a differential bid is first posted, and each time subsequently that the top bid upon the sale target item changes (including when the top bid is withdrawn, exposing a lower but previously existing new top bid, or the top bid amount implicitly reverts to $0.00 because the only existing bid is withdrawn), a new computed bid amount is propagated to be the effective bid amount for each differential bid placed by the CBSA owner.

From the perspective of prospective buyers of the sale target item, the CBSA functions as a normal forward auction. That is, the prospective buyers may place a bid on the target sale item, withdraw a previously posted bid, or perform a market buy of the target sale item. If such a placed bid becomes the top bid on the target sale item, this causes a new computed actual bid amount to be propagated through each differential bid placed by the CBSA owner upon the corresponding prospective target buy item. (This propagation may be implemented in practice by withdrawing the previous effective bid and posting a new effective bid.) A market buy action performed upon the target sale item causes the differential bid that has been placed upon a target buy item having the lowest ask/bid gap to be effectively raised such that that target buy item is purchased at its current asking price, and the asking price of the target sale item is set accordingly so that the price paid by the bidder on the target sale item meets the current asking price of the target buy item when combined with the differential bid amount specified in the differential bid placed upon said candidate target buy item with that lowest gap amount Said candidate buy target item is then purchased, and the target sale item is then sold, all within the same transaction.

The owner of the CBSA may perform actions relative to the target sale item as if the CBSA were an item auction. That is, the CBSA owner may post an asking price, or perform a market sell action. However, the action of posting an asking price is performed indirectly via the action of posting a differential bid upon a candidate buy target item (see above); the asking price posted for the target sale item is the minimum of the set {current asking price of candidate target buy item minus differential price amount specified in bid for that candidate target buy item}, across the set of differential bids within the contained composite reverse auction. That is, the smallest monetary amount that would enable the CBSA owner to buy one of the candidate target buy items by adding his specified differential amount to that monetary amount is posted as the effective asking price of the target sale item. A market sell action upon the target sale item is actually termed a market buy-sell, since it both causes the target sale item to be sold and causes a candidate target buy item to be purchased. A market buy-sell is affected by combining the current top bid on the target sale item with the differential expressed for each candidate target buy item, to determine the net computed bid that is closest in price to the current asking price of its respective candidate target buy item. That candidate buy target item is said to have the smallest bid/ask gap. The differential amount of the differential bid for the item with the smallest bid/ask gap is then increased such that it meets the current asking price of that target buy item, and the target buy item is then bought at its current asking price, the target sell item is sold at its high bid amount, and the differential bid amount is added to the proceeds of selling the target sale item to provide payment to the seller of the target buy item, all in one transaction.

From the perspective of the sellers of candidate buy target items, the CBSA functions as a composite reverse auction. That is, the owner of the CBSA may place bids upon candidate buy target items, and may perform a market buy action (again, actually a market buy-sell action) that results in the purchase of one of the prospective buy target items at its current asking price. However, the bids that are posted through the CBSA are differential bids. When the seller of a candidate target buy item accepts a differential bid, this causes the CBSA to accept the top bid for the target sale item as well; the proceeds from that sale are then added to the differential amount of the accepted differential bid to yield the funds necessary to pay the seller of the target buy item. If the owner of the CBSA performs a market buy action (again, actually a buy-sell action), then the differential bid having the smallest gap amount is determined, and the differential of that bid is increased such that it matches the current ask amount of the corresponding target buy item; the target sale item is then sold and the target buy item is purchased, all as part of the same transaction.

The owner of the CBSA sees clearly its two components—the contained auction of the target sale item, and the contained bid set for buying the target buy item. Bids placed within the bid set are differential bids, as described above.

The components and mechanisms for implementing various illustrative embodiments of compound buy-sell auctions, and how those compound buy-sell auctions interact within the framework of a synthetic continuous double auction system, are described in detail within this section. Underlying mechanisms such as transactions and the Internet that are well-understood by those of ordinary skill in the art of computer science are not described in detail.

Figure 12B:
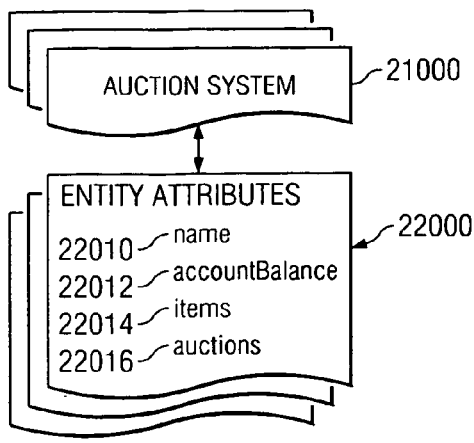
FIG. 12B illustrates additional details of the auction system of FIG. 12A, representing an embodiment of the invention.
Figure 12A:
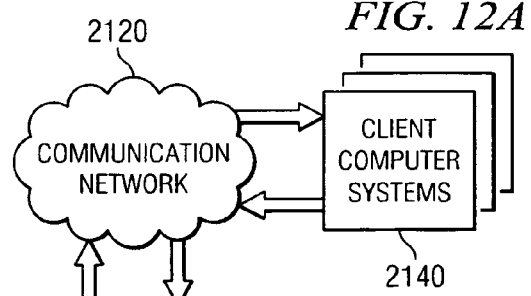
FIG. 12A illustrates a state diagram of an auction system that can be implemented by a computer program, representing an embodiment of the invention.
Figure 12A:
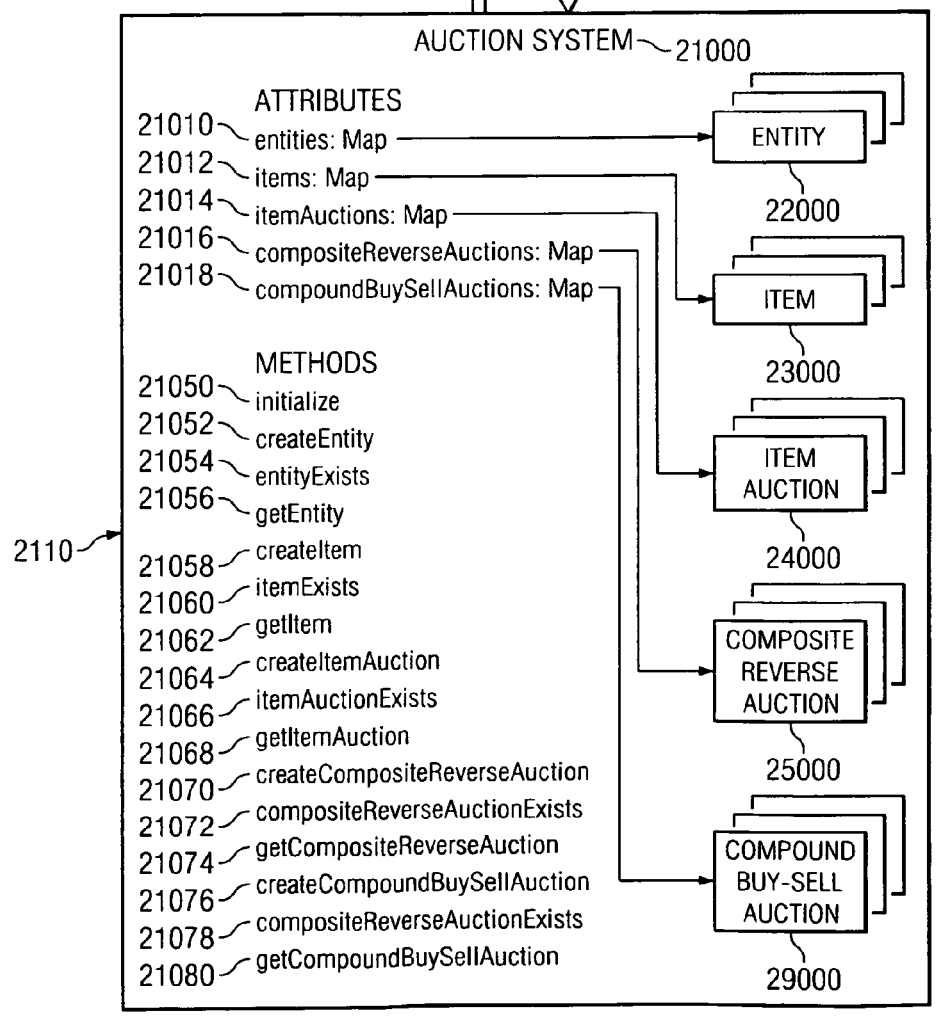

FIG. 12A: Auction System with Communication Network and Client Computer Systems

FIG. 12A shows an auction system 21000 running on a computer system 2110, coupled via a communication network 2120 to a plurality of client computer systems 2140, in accordance with various embodiments. Communication network 120 will typically be the Internet. However, in alternate embodiments, the invention may be practiced with other private and/or public communication networks. Typically, each system 2110/2140 includes one or more processors, memory, non-volatile mass storage, one or more input/output devices (such as keyboard, cursor control, network interface, and so forth). Any one of a number of servers available from a number of vendors may be used as computer system 2110. Any one of a number of desktop, notebook, tablet, and hand-held computers (including special purpose devices, such as mobile phones) available from a number of vendors may be used as client computer system 2140.

The purpose of communication network 2120 is to accept requests to and deliver responses from auction system 21000 and its component objects. Use of such communication networks 2120 and client computer systems 140 to present these requests and responses is well understood within the field of computer programming and will not be described further.

For the illustrated embodiments, auction system 21000 is implemented in an entity-relationship manner, with the entities having attributes and methods. In alternate embodiments, auction system 21000 may be implemented in other manners. In various embodiments, auction system 21000 may have the following attributes:

Attribute 21010 entities is a map establishing a 1-to-1 correspondence between names of entities 22000 within auction system 21000 and the entities 22000 having those names.

Attribute 21012 items is a map establishing a 1-to-1 correspondence between names of items 23000 known within auction system 21000 and the items 23000 having those names.

Attribute 21014 itemAuctions is a map establishing a 1-to-1 correspondence between names of items 23000 known within auction system 21000 and the items 23000 having those names.

Attribute 21016 compositeReverseAuctions is a map establishing a 1-to-1 correspondence between names of composite reverse auctions 25000 within auction system 21000 and the composite reverse auctions 25000 having those names.

Attribute 21018 compoundBuySellAuctions is a map establishing a 1-to-1 correspondence between names of compound buy-sell auctions 29000 within auction system 21000 and the compound buy-sell auctions 29000 having those names.

In various embodiments, auction system 21000 may have the following methods.

Method 21050 initialize. This method prepares auction system 21000 for initial operation, including creating an empty map 21010 entities, an empty map 21012 items, an empty map 21014 itemAuctions, an empty map 21016 compositeReverseAuctions, and an empty map 21018 compoundBuySellAuctions.

Method 21052 createEntity. This method associates type and description information for an external entity with an identifier used to refer to that entity within the auction system 21000. In the context of auction system 21000, an entity is a person, or a corporation, government, or similar organization, capable of owning items 23000 that may be bought or sold using auction system 21000.

Method 21054 entityExists. This method checks whether an entity 22000 identified by an identifier received as a parameter to the method is known to auction system 21000, i.e. is contained within the map 21010 entities Method 21056 getEntity. This method uses a parameter identifier to look up an entity 22000 within map 21010 entities, and a return a reference to the associated programming object of type entity if the mapping exists.

Method 21058 createItem. This method associates type and description information for an external item with an identifier used to refer to that item within the auction system 21000. In the context of auction system 21000, an item is a product or service subject to being bought or sold within auction system 21000 by an entity 22000.

Method 21060 itemExists. This method checks whether an item 23000 identified by an identifier received as a parameter to the method is known to auction system 21000, i.e. is contained within the map 21012 items.

Method 21062 getItem. This method uses an identifying parameter to look up an item 23000 within map 21012 items, and to return a reference to the associated programming object of type item if the mapping exists.

Method 21064 createItemAuction. This method creates a programming object representing an item auction 24000, and uniquely associates it with an identifier received as a parameter to the method, that is, enters it into map 21014 itemAuctions.

Method 21066 itemAuctionExists. This method checks whether an item auction 4000 identified by an identifier received as a parameter to the method is known to auction system 21000, i.e. is contained within the map 21014 itemAuctions.

Method 21068 getItemAuction. This method uses an identifying parameter to look up an item auction 24000 within map 21014 itemAuctions, and to return a reference to the associated programming object of type item auction if the mapping exists.

Method 21070 createCompositeReverseAuction. This method creates a programming object representing a composite reverse auction 25000, and uniquely associates it with an identifier received as a parameter to the method, that is, enters it into map 21016 compositeReverseAuctions.

Method 21072 compositeReverseAuctionExists. This method checks whether a composite reverse auction 25000 identified by an identifier received as a parameter to the method is known to auction system 21000, i.e. is contained within the map 21016 compositeReverseAuctions.

Method 21074 getCompositeReverseAuction. This method uses an identifying parameter to look up a composite reverse auction 25000 within map 21016 compositeReverseAuctions, and to return a reference to the associated programming object of type composite reverse auction if the mapping exists.

Method 21076 createCompoundBuySellAuction. This method creates a programming object representing a compound buy-sell auction 29000, and uniquely associates it with an identifier received as a parameter to the method, that is, enters it into map 21018 compoundBuySellAuctions.

Method 21078 ReverseAuctionExists. This method uses an identifying parameter to look up a compound buy-sell auction 29000 within map 21018 compoundBuySellAuctions, and to return a reference to the associated programming object of type composite reverse auction if the mapping exists.

Method 21080 getcompoundBuySellAuction This method checks whether a compound buy-sell auction 29000 identified by an identifier received as a parameter to the method is known to auction system 21000, i.e. is contained within the map 21018 compoundBuySellAuctions.

FIG. 12B

The programming objects entity 22000 may represent external entities and the monetary resources and items that those entities have made known to auction system 21000. The programming objects may include the ability to transfer funds, or to send communication to initiate and confirm transfer of funds, and to transfer ownership of items, or to send communication to initiate and confirm transfer of ownership. The programming objects may have the following attributes:

Attribute name 22010. Used to identify the entity 22000.

Attribute accountBalance 22012. Indicates the monetary resources that may be used on behalf of the entity 2000 within transactions. This amount is credited when the entity makes a sale, and debited when the entity makes a purchase.

Attribute items 22014. This is a map identifying the set of items that are known to the auction system 1000 to be owned by this entity 2000. Each such item is identified by its name.

Attribute auctions 22018. This is a map identifying by name the set of forward, reverse, and compound buy-sell auctions owned by this entity.

The programming objects item 23000 may represent external products and services such as may be bought and sold through auction system 1000. These programming objects may include such attributes and methods as identifying the entity that currently owns them.

The programming objects item auction 24000 is described below.

The programming objects composite reverse auction 25000 are described below.

The programming objects compound buy-sell auction 29000 are described below.

In alternate embodiments, auction system 21000 may have more or less attributes and/or methods.

FIG. 13: Bid 7000

For the illustrative embodiments, a Bid is a programmatic object identifying the auction that is being bid upon (and thereby the item being bid on), the amount of the bid, the entity placing the bid, the BidSet containing the bid, and the time the bid will expire.

In various embodiments, a Bid may have the following attributes:

27010 bidAmount. This expresses the monetary quantity of the bid.

27012 auction. This refers to the programmatic object representing either an item auction 4000 or a buy-sell auction 9000 on which the bid was placed.

27014 buyer. This refers to the Entity 22000 who placed the bid.

27016 bidSet. This refers to the BidSet 28000 containing the bid.

27018 expiration. This is the time at which the bid will expire. Note that when this point in time is reached, the Bid 27000 object will invoke its own method 7056 withdraw, if the bid has not yet been accepted.

A Bid may have the following methods:

27050 initialize. This method takes as parameters the bidAmount, auction reference, buyer reference, and bidSet references that are then assigned as the corresponding attributes of the object.

27052 accept. This method is called when the bid is accepted by the seller, i.e. the seller has agreed to sell the item at the price represented by the bid. The primary function of this method is to call the bidAccepted method of attribute 27016 bidSet, so that the other bids in that BidSet may be withdrawn from their respective target auctions.

27054 auctionClosed. This method is called when the auction is no longer available, either because it was withdrawn by the seller or because someone else won the auction. The primary responsibility of this method is to call the auctionClosed method of attribute 27016 bidSet, so that the bid may be removed from the BidSet.

27056 withdraw. This method is called to withdraw a bid from an auction. It functions by calling method 24060 withdrawBid of the programming object 27012 auction.

27058 showPeers. This method invokes the showPeers method of 27016 bidSet, so that the competition created by that BidSet can be seen.

In various embodiments, a Bid may have more or less attributes and/or methods.

Figure 14:
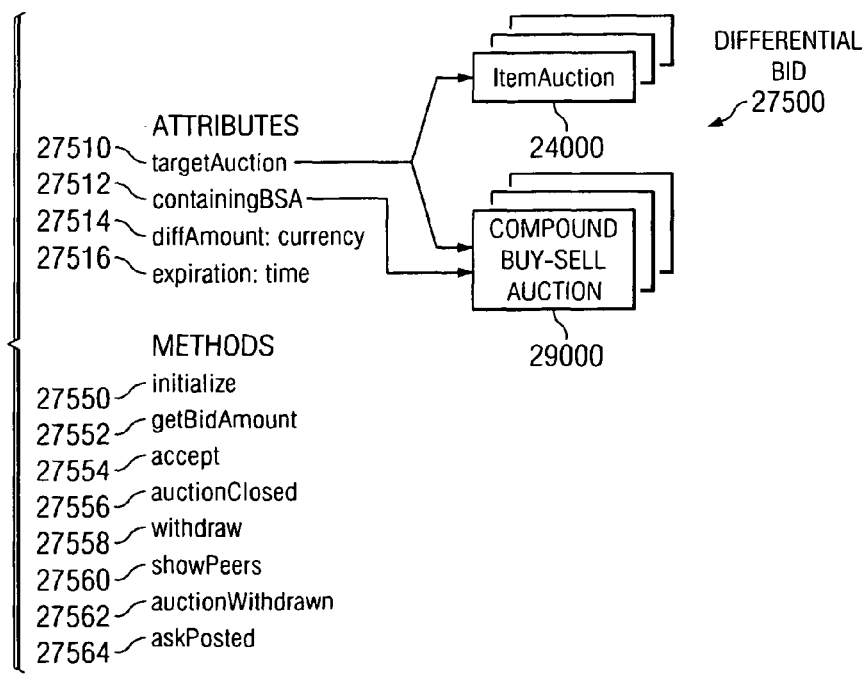
FIG. 14 illustrates a state diagram of a differential bid in the auction system of FIG. 12, representing an embodiment of the invention.

FIG. 14: Differential Bid 27500

For the illustrative embodiments, a differential bid is a programmatic object identifying the containing compound buy-sell auction, the auction that is being bid upon (and thereby the item being bid on), the amount of the differential to be added to the proceeds from the sale of the item being sold by the containing compound buy-sell auction, and the time the bid will expire.

In various embodiments, a differential bid may have the following attributes:

Attribute 27510 targetAuction. This refers to the programmatic object representing the auction on which the bid was placed. The auction may be any of several types of auctions, including as shown here an item auction 24000 or a compound buy-sell auction 9000.

Attribute 27512 containingBSA. This refers to the compound buy-sell auction 9000 through which this differential bid was posted.

Attribute 27514 diffAmount. This specifies the currency amount (either positive or negative) to be added to the proceeds from selling the target sale item in order to pay for the target buy item (the item being sold through the auction pointed at by attribute 7510 targetAuction) if this differential bid is accepted.

Attribute 27516 expiration. This is the time at which the bid will expire. Note that when this point in time is reached, the differential bid 27500 object will invoke its own method 27558 withdraw, if the bid has not yet been accepted.

A differential bid may have the following methods:

27550 initialize. This method takes as parameters the bid amount, auction reference, buyer reference, and bid set reference that are then assigned as the corresponding attributes of the object.

Figure 13:
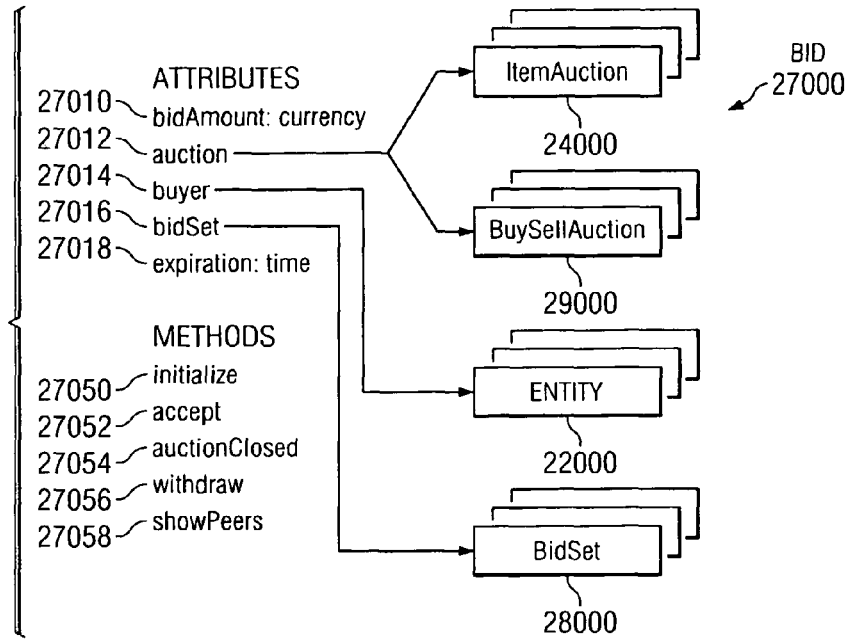
FIG. 13 illustrates a state diagram of a bid in the auction system of FIG. 12A, representing an embodiment of the invention.

27552 getBidAmount. This method calculates and returns the amount represented by the differential bid, as follows. First, method 26052 getTopBid FIG. 9 of attribute 29018 FIG. 16 bidQueueStack is invoked. If a bid 7000 object is returned, the amount represented by attribute 7010 bidAmount FIG. 13 is added to attribute 27514 diffAmount to determine the bid amount, which is returned. If a differential bid 27500 object was returned by method 6052 getTopBid, its method 27552 getBidAmount is invoked and will yield a currency amount, which is then added to attribute 27514 diffAmount to determine the bid amount, which is returned. If null was returned by method 26052 getTopBid, then the currency amount represented by attribute 27514 is returned unmodified as the bid amount.

Figure 15:
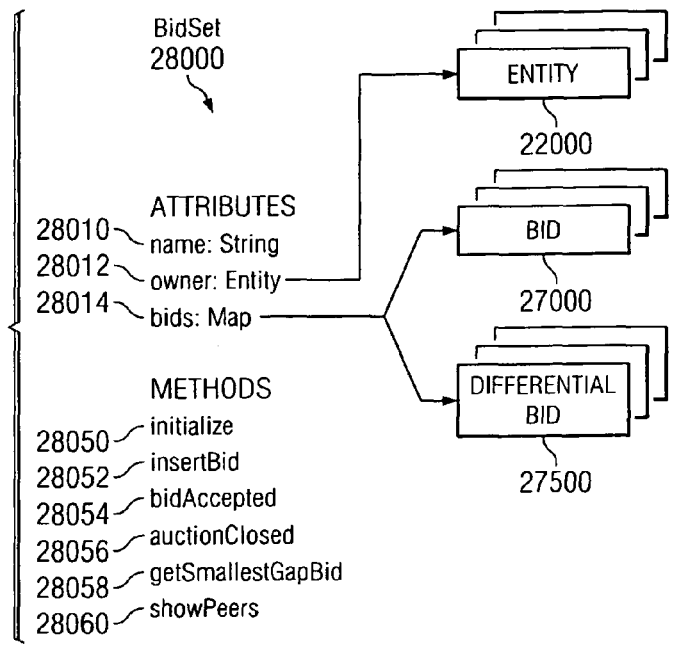
FIG. 15 illustrates a state diagram of a bid set in the auction system of FIG. 12, representing an embodiment of the invention.

27554 accept. This method is called when the bid is accepted by the seller of targetAuction 27510, i.e. the seller has agreed to sell the item at the price represented by this differential bid. The primary function of this method is to call the method 28054 bidAccepted FIG. 15 of attribute 29014 bidSet FIG. 16 of attribute 27512 containingBSA, so that the other bids in that BidSet may be withdrawn from their respective target auctions.

27556 auctionClosed. This method is called when the auction being bid upon is no longer available, either because the auction was withdrawn by the seller or because someone else won the auction. The primary responsibility of this method is to call the method 28056 auctionClosed shown in FIG. 15 of attribute 27016 bidSet shown in FIG. 13 of attribute 27512 containingBSA, so that the bid may be removed from the BidSet.

27558 withdraw. This method is called to withdraw the differential bid from an auction. If the programming object represented by attribute 27012 auctis hown in FIG. 13 is of type item auction 4000 of FIG. 4, method 24060 withdrawBid of that item auction is called. If the programming object represented by attribute 27012 auction is of type compound buy-sell auction 29000 shown in FIG. 16, method 29054 withdrawBid of that compound buy-sell auction is called.

27560 showPeers. This method invokes the method 28060 showPeers of 27016 bidSet of attribute 27512 containingBSA shown in FIG. 15, so that the competition created by that BidSet can be seen.

27562 auctionWithdrawn. Invoked by targetAuction 27510 when it is withdrawn or otherwise completes. This method just calls method 29068 auctionWithdrawn shown in FIG. 16 of attribute 27512 containingBSA.

27564 askPosted. This method posts the offer to sell so that it can be seen.

FIG. 15: Bid Set

In various embodiments, a BidSet 28000 is a programming object representing a set of bids owned by the same Entity 22000, and related by a satisfaction function which causes all remaining bids in the BidSet to be withdrawn when the satisfaction function is satisfied. Typically, the satisfaction function says that only one bid may be accepted, hence the items being bid upon by the owning Entity through this BidSet are exclusive alternatives, i.e. the buyer only wants one of them.

In various embodiments, a BidSet 28000 may have the following attributes:

Attribute 28010 name. This is a string uniquely identifying the BidSet within the auction system 21000.

Attribute 8012 owner. This is a reference to the Entity 22000 owning the BidSet 28000, i.e. the Entity 2000 who has placed the bids contained within the BidSet 8000.

Attribute 28014 bids. This is a set of bids currently contained by the BidSet 28000. These bids may be programmatic objects of either type bid 27000 or differential bid 27500.

In various embodiments, a BidSet 28000 may have the following methods:

Method 28050 initialize. This method accepts a name string and owner object reference as parameters and assigns the 28010 name attribute, 28012 owner attribute, and creates an empty set for the 28014 bids attribute.

Method 28052 insertBid. This method accepts a reference to a programmatic object of type bid 27000 or differential bid 27500, FIG. 14, and adds the reference to the set attribute 28014 bids.

Method 28054 bidAccepted. This method is called when a bid within the set attribute 28014 bids has been accepted, i.e. a sale has been executed on the terms of that bid. The method accepts as a parameter a reference to the bid 27000, shown in FIG. 13, or differential bid 27500, shown in FIG. 14, that was accepted. The method executes by then calling the method 7056 withdraw, shown in FIG. 13 for every bid 7000 within the set attribute 28014, or the method 27558 withdraw, shown in FIG. 14, for every differential bid 7500, shown in FIG. 14 within the set, except for the bid or differential bid that was accepted.

Method 28056 auctionClosed. This method is called when an auction has closed, either because the item was sold or because it was withdrawn, and at least one bid 7000, shown in FIG. 13, tracked within set attribute 28014 was a bid on that auction. The method accepts as a parameter the identity of said bid 27000 or differential bid 27500 shown in FIG. 14, and removes that bid or differential bid from set attribute 8014.

Method 28058 getSmallestGapBid. For each bid 27000, shown in FIG. 13, or differential bid 27500, shown in FIG. 14, within the BidSet, this method calculates the difference between the current asking price of the target auction and the bid price of the bid. This is the gap amount for a bid. The method compares the gap amounts of all the bids and differential bids within the BidSet, and returns the bid or differential bid having the smallest gap amount. If the BidSet is empty, null is returned.

Method 28060 showPeers. This method shows the competition between sellers that the BidSet has created. It presents the target auctions of the contained bids and differential bids as a list sorted by their bid gaps, so that the auction where the buyer's bid and the seller's ask are closest is presented first. The identity of each auction is part of the information presented in the list, so that it may in turn be used to view the bidder-to-bidder competition for that item.

In various embodiments, a BidSet may have more or less attributes and/or methods.

FIG. 4: Item Auction

In various embodiments, an item auction 4000 is a programmatic object representing the auction of a particular item. It may have the following attributes:

Attribute 4010 name. This identifying string allows the item auction 4000 to be located by method 1068 getItemAuction.

Attribute 4012 item. This is a reference to a programmatic object of type item 3000 representing the item being sold through this auction.

Attribute 4014 seller. This is a reference to a programmatic object of type entity 2000 representing the entity currently owning the item 3000 being sold through this auction.

Attribute 4016 bidQueueStack. This is a reference to a programmatic object of type BidQueueStack 6000, representing the various bids and differential bids received on the auction. Programmatic objects BidQueueStack 6000 are described separately below.

Attribute 4018 ask. This attribute represents the price that the seller of the item is currently asking.

In various embodiments, item auction 4000 may have the following methods:

Method 4050 initialize. This method takes as parameters an identifying string name, a reference to a programmatic object item, a reference to a programmatic object seller, and an amount representing the initial asking price for the item. The method assigns these parameters to the attributes 4010 name, 4012 item, 4014 seller, and 4018 ask, respectively. It also creates an initialized but otherwise empty programmatic object of type BidQueueStack, a reference to which is assigned to attribute 4016 bidQueueStack.

Method 4052 postAsk. This method accepts as a parameter a currency amount, which is assigned to attribute 4018 ask. The method 6052 getTopBid of attribute 4016 bidQueueStack is called to retrieve the current top bid, which is then compared to the value of 4018 ask. If the attribute 7010 bidAmount of the current top bid is greater than or equal to the newly established value of attribute 4018 ask, said bid is accepted by calling its method 7052 accept. A sale is thus executed for the amount specified by 4018 ask (or more if the bid was for more). That is, either funds are directly transferred, or communication is initiated to cause transfer of funds in said amount from the buyer identified by said bid to the external entity represented by attribute 4014 seller, and ownership of the external item represented by attribute 4012 item is either directly transferred, or communication is initiated to cause transfer of that ownership to the buyer identified by said bid.

Method 4054 postBid. This method accepts as a parameter a programmatic object of type bid 7000 or differential bid 7500, identifying an entity placing the bid and an amount of the bid. If the bid amount is greater than or equal to the amount represented by attribute 4018 ask, a sale is executed between seller 4014 and the buyer identified by the bid for the amount identified by attribute 4018 ask. This sale execution is accomplished by calling the method 7052 accept of aa bid 7000 object or method 7554 accept of aa differential bid 7500 object. Otherwise, the bid is passed to the method 6050 postBid of attribute 4016 bidQueueStack.

Method 4056 marketSell. This method indicates that seller 4014 wishes to sell to the highest current bidder. The method executes by first calling method 6052 getTopBid of attribute 4016 bidQueueStack. If a non-null result is received (meaning that at least one bid has been received for the item being sold; the result is the highest such bid), then the sale of item is executed between seller 4014 and the buyer identified by the bid for the amount identified by attribute 4018 ask. This execution is performed by calling the method 7052 accept of a Bid 7000 object or method 7554 accept of a differential bid 7500 object.

Method 4058 marketBuy. This method accepts as a parameter a reference to a programmatic object entity 2000 who wants to buy the item 3000 identified by attribute 4012 item, here referred to as the buyer, and causes execution of the sale of item 4012 from seller 4014 to said buyer at the price specified by attribute 4018 ask. This is done by creating a Bid 7000 object for the current asking price, then executing the method 7052 accept of said Bid 7000.

Method 4060 withdrawBid. This method accepts the identity of a bid 7000 or differential bid 7500 as a parameter, and invokes method 6054 of attribute 4016 bidQueueStack of a bid 7000, or method 6054 withdraw of attribute 9018 bidQueueStack of attribute 7512 containingBSA of a bid 7500 to withdraw that bid.

Method 4062 withdraw. This method is invoked to withdraw the item from sale. It in turn invokes the method 6056 withdrawAuction on the attribute 4016 bidQueueStack.

Method 4064 showBids. This method presents the current set of bids on the auction. Bids are presented in a list so that the highest-to-lowest price structure is evident, and when multiple bids are present at the same price, they are presented such that their post-time is evident. In other words, the same structure preserved within the BidQueueStack is evidenced by the order of list returned. The identity of each bid is available, so that the BidSet of which the bid is a member may be retrieved by calling its showPeers method. Note that the bids may be either of type bid 7000 or differential bid 7500.

In various embodiments, item auction 4000 may have more or less attributes and/or methods.

FIG. 5A BidQueueStack

In various embodiments, a BidQueueStack 6000 is a programmatic object representing the set of bids that have been received for the item being sold through an item auction 4000 or compound buy-sell auction 9000, and which have not expired or been withdrawn. Each bid may be either of type bid 7000 or differential bid 7500. Each bid identifies an entity 2000 placing the bid, a currency amount the bidder is willing to pay, and an expiration time for the bid. The bids are organized in two dimensions. First, each bid is placed into a queue containing only other bids at the same price. Bids are ordered within each such queue by the time the bid was received. Second, the queues are arranged into a stack according to the price of the bids contained within each queue, with the queue containing the highest-priced bids at the top.

In various embodiments, programmatic objects BidQueueStack 6000 may support the following methods:

Method 6050 postBid. This method accepts a bid 7000 or a differential bid 7500 as a parameter, and places it at the end of the queue containing other bids at that price point, creating the queue if it doesn't exist.

Method 6052 getTopBid. This method returns the first bid 7000 or differential bid 7500 from the top-most non-empty queue in the stack, if there is one; otherwise it returns null.

Method 6054 withdrawBid. This method accepts the identity of a bid 7000 or differential bid 7500 as a parameter, and removes it from the queue of the BidQueueStack programming object containing it, if any.

Method 6056 withdrawAuction. This method invokes the method 7054 auctionClosed for each bid 7000, and the method 7556 auctionClosed for each differential bid 7500 within the BidQueueStack.

In alternate embodiments, BidQueueStack 6000 may support more or less methods.

FIG. 6: Composite Reverse Auction in various embodiments, a composite reverse auction 5000 is a programmatic object defining the attributes and methods of objects used to represent composite reverse auctions.

A composite reverse auction consists primarily of a set of bids (a BidSet 8000) on different forward auctions, and methods that cause the object to function as a reverse auction, as follows. These forward auctions may be any of the following types: item auctions, continuous double auctions, normalized continuous double auctions, or compound buy-sell auctions.

Each of the forward auctions on which bids are placed allow bids to expire or to be withdrawn. When one bid from the BidSet 8000 of a composite reverse auction 5000 is accepted, the others are automatically withdrawn. This puts the item auctions on which the bids are placed into competition with each other. (Here, the satisfaction function of the BidSet 8000 is that any bid within the BidSet has been accepted; in other embodiments, different satisfaction functions might be used, to indicate that available funds have been exhausted.)

In various embodiments, programmatic objects composite reverse auction 5000 may have the following attributes:

Attribute 5010 name. This attribute gives a convenient way of identifying a particular composite reverse auction 5000 object.

Attribute 5012 owner. This is a reference to the Entity 2000 object representing the entity placing bids through this composite reverse auction 5000 object.

Attribute 5014 bidSet. This is a reference to the BidSet 8000 object holding the bids being placed through this composite reverse auction 5000 object.

In various embodiments, programmatic objects composite reverse auction 5000 may support the following methods:

Method 5050 initialize. Accepts as parameters a string to become the name, and a reference to the Entity 2000 object to become the owner. Creates an empty BidSet 8000 for the attribute 5014 bidSet.

Method 5052 postBid. Accepts as a parameter a Bid 7000. Adds said bid to bidSet 5014. Invokes the method 4054 postBid of the item auction identified by said bid, or the corresponding postBid method of other forward auction types. Note that this invocation may result in the execution of a sale.

Method 5054 marketBuy. This means that the owner 5012 would like to buy the item whose current asking price is closest to the bid on that item in the composite reverse auction's BidSet. Because the buyer has placed bids at different prices on each item in the BidSet, these different prices have normalized the buyer's interest in the items, i.e. any item being bid upon is equally acceptable to the buyer at the price bid.

This method accepts as a parameter a currency amount expressing a limit on the marketBuy operation. The limit is an expression of the maximum amount over the current bid the buyer is willing to pay. The reason that the limit is necessary is that the conditions of the auctions in the composite reverse auction's BidSet may change between the moment that the buyer views them and decides to buy at market, and the moment that his marketBuy request is received by the auction system. For example, the auction that has the smallest bid/ask gap might have been sold to another bidder, so that auction is therefore unavailable. The auction in the composite reverse auction with the next-smallest bid/ask gap might be substantially larger if no limit was imposed; and the buyer bought from that auction instead, the buyer might pay more than he was expecting.

The reason that the limit is expressed as an amount over the current bid, rather than as a total amount, is that bids on different items in the bid set may be for different amounts. Hence a single total would not be effective, whereas a differential can be applied to each bid to determine the actual maximum.

This method invokes method 8058 getSmallestGapBid on its BidSet. If the gap amount of said Bid is greater than the limit received as a parameter, an error is returned. Otherwise, a new Bid that meets the asking price of the target auction of said smallest gap Bid is created and placed on said target auction, resulting in said new Bid being accepted, and a sale therefore executing.

Method 5056 showPeerBids. This method shows the competition between sellers that the composite reverse auction has created. It presents the target auctions as a list sorted by their bid gaps, so that the auction where this buyer's bid and the seller's ask are closest is presented first. The identity of each auction is part of the information presented in the list, so that it may in turn be used to view the bidder-to-bidder competition for that item.

In various embodiments, programmatic objects composite reverse auction 5000 may have more or less attributes and/or methods.

Figure 16:
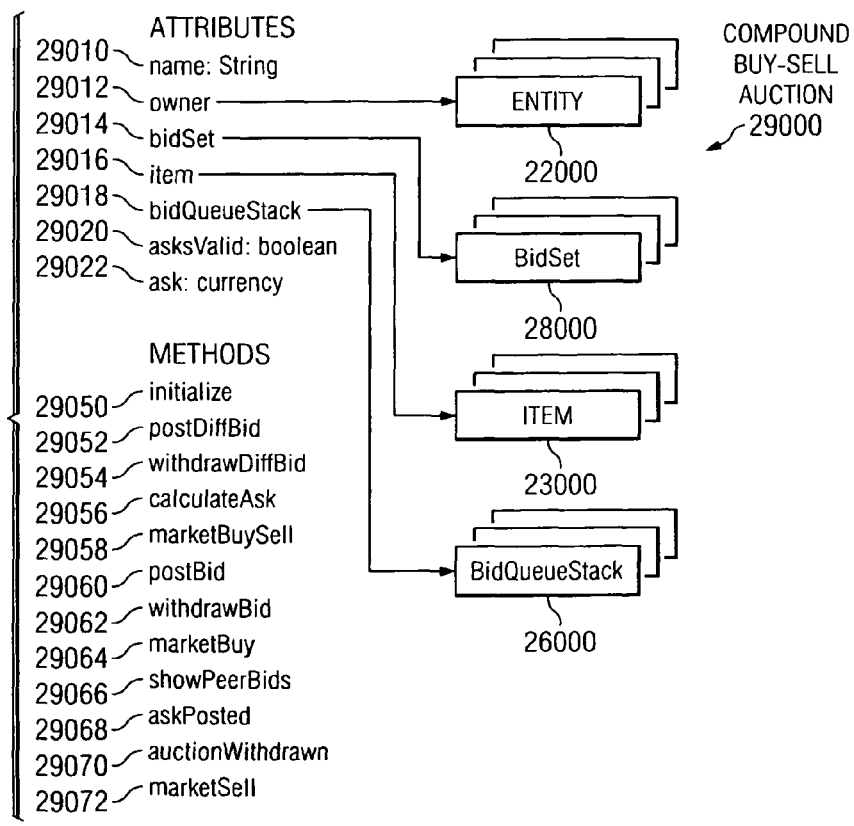
FIG. 16 illustrates a state diagram of a compound buy-sell auction in the auction system of FIG. 12, representing an embodiment of the invention.

FIG. 16: Compound Buy-Sell Auction

In various embodiments, a compound buy-sell auction 29000 is a programmatic object defining the attributes and methods of objects used to represent compound buy-sell auctions. It may have the following attributes:

Attribute 29010 name This attribute gives a convenient way of identifying a particular composite reverse auction 29000 object.

Attribute 29012 owner. This is a reference to the Entity 22000 object representing the entity that is both placing bids through the BidSet 8000, shown in FIG. 15, referenced by attribute 29014 bidSet, and selling the Item 23000 represented by attribute 9016 item.

Attribute 29014 bidSet. This is a reference to the BidSet 28000, shown in FIG. 14, object holding the differential bids being placed through this compound buy-sell auction 29000 object.

Attribute 29016 item. This is a reference to a programmatic object of type item 23000 representing the target sale item being sold through this buy-sell auction 29000 object.

Attribute 29018 bidQueueStack. This is a reference to a programmatic object of type BidQueueStack 26000, representing the various bids received on the target sale item being sold through this compound buy-sell auction.

Attribute 29020 askIsValid. Indicates true when the current asking price has been computed, which happens when 29014 bidSet isn't empty. It indicates false when there is no bid on a prospective buy target item. It indicates this because the asking price for the target sale item must be derived from the bids on the target buy item.

Attribute 29022 ask. This is the current asking price for the target sale item (attribute 9016 item). Note that this attribute is computed rather than being set directly (see below). 29022 ask represents the smallest price that a prospective buyer could pay for the target sale item, at the same time enabling the compound buy-sell auction owner to purchase one of the items he has bid on using the proceeds from that sale, plus the differential amount he has specified.

In various embodiments, programmatic objects compound buy-sell auction 29000 may support the following methods:

Method 29050 initialize. This method accepts as parameters an identifying string name, a reference to the Entity 2000 object to become attribute 29012 owner, and a reference to a programmatic object Item 23000 to become attribute 29016 item. It creates an empty BidSet 28000, shown in FIG. 15, to become the attribute 29014 bidSet. It creates an initialized but otherwise empty programmatic object of type BidQueueStack 6000, shown in FIG. 5, a reference to which is assigned to attribute 29018 bidQueueStack. Sets 9020 askIsValid to false.

Method 29052 postDiffBid. This method is called by the owner of the compound buy-sell auction in order to place a bid on a target buy item being sold through another auction. It relates to the "buy" part of "buy-sell".

Accepts as parameters the following:

A reference to a programmatic forward auction object. This is the auction upon which the differential bid will be placed. Note that this may be any type of forward auction upon which a bid may be placed, such as an item auction, a continuous double auction, a normalized continuous double auction, or another compound buy-sell auction.

A currency differential amount. This amount may be either positive or negative; a negative value indicates that the owner of the compound buy-sell auction expects to sell the target sale item for more than he has to pay for the prospective target buy item upon which this bid is being placed; a positive amount means that the owner of the compound buy-sell auction expects to have to contribute additional funds, on top of those received from sale of the target sale item, in order to buy the prospective target buy item which is being bid upon.

3; An Expiration Time.

Creates a differential bid using: the parameter auction object as the attribute 27510 targetAuction, shown in FIG. 14, This compound buy-sell auction as the attribute 27512 containingBSA. The parameter currency differential amount as the attribute 27514 diffAmount. The parameter expiration time as the attribute 27516 expiration. Method 29056 calculateAsk is invoked to set attribute 29022 ask, and 29020 askIsValid is set to true. Adds the created differential bid to bidSet 29014. Invokes the method postBid of the forward auction identified by attribute 27510 targetAuction of said differential bid, shown in FIG. 14. Note that this invocation may result in the bid being accepted if the differential bid has a valid effective bid price exceeding the current asking price of the target buy item. In this case, the target sale item is sold, the differential amount is added to the proceeds of the sale, and is used to pay for the purchase of the target buy item. Thus completing the compound buy-sell auction.

Method 29054 withdrawDiffBid. This method accepts the identity of a differential bid 27500 as a parameter, and invokes method 26054 withdrawBid of attribute 29018 bidQueueStack, passing that bid's identity as a parameter, in order to withdraw the bid.

Method 29056 calculateAsk. Determines the least amount of money that must be asked for the target sale item in order to buy a candidate target buy item. If 29014 bidSet is empty, it sets sets 29020 askIsValid to false. Otherwise, for each differential bid in 9014 bidSet, subtracts differential amount (attribute 27514 diffAmount) from the current asking price of 27510 targetAuction, yielding the necessary ask amount for that targetAuction. The smallest such necessary ask amount amongst the set of differential bids in 29014 bidSet becomes the new value for 29022 ask, and 29020 askIsValid is set to true.

Method 29058 marketBuySell. This method accepts as a parameter a monetary limit amount. If the attribute 29018 bidQueueStack is empty, an error is returned that no bid exists for sale of the target sale item. If the attribute 29014 bidSet is empty, an error is returned that no bid has been placed on a candidate target buy item. Otherwise, the method executes acceptance of the highest bid placed on the target sell item, and in the same transaction executes acceptance of the asking price of the candidate target buy item upon which a differential bid exists in 29014 bidSet that has the smallest gap between the effective bid amount of the differential bid and the current asking price of the candidate target buy item. If there are two such differential bids with the same smallest gap, the item which has been available at its current price the longest is selected to be the target buy item. However, if the gap is larger than the amount expressed by the limit parameter, an error is returned that the market buy-sell operation could not be executed within the specified limits.

Method 29060 postBid. Called by (or on behalf of) a prospective buyer of the target sale item. Accepts as a parameter a bid 27000, shown in FIG. 13, or differential bid 27500 object, shown in FIG. 14, whose auction 27012 or targetAuction 27510 attribute respectively is this buy-sell auction, and is hence a bid upon the target sell item of this buy-sell auction. If the amount of the bid is equal to or greater than the current effective asking price of the target sell item, then the bid is accepted, and the top contender in bidSet 29014 is purchased using the proceeds of the sale, adding in the differential amount necessary to pay the current asking price of that top contender bid. (The top contender bid in bidSet 29014 is the one with the smallest gap between the effective bid amount of the differential bid placed on it within bidSet 29014 and the current asking price of the respective candidate target buy item.)

Method 29062 withdrawBid. Accepts as a parameter the identity of a bid, either a bid 27000 object, as shown in FIG. 2, or differential bid 7500 object as shown in FIG. 14. If the identified bid is not within 29018 bidQueueStack, an error is returned. Otherwise, the bid is removed from 29018 bidQueueStack. If the bid being removed was the top bid within 29018 bidQueueStack, then the bid amount of the next-highest remaining bid, or $0.00 if the 29018 bidQueueStack is now empty, must be used to re-calculate the effective bid price of each differential bid 7500 in bidSet 29014. As each is recalculated, the previous effective bid is withdrawn, and the new bid posted to the respective targetAuction 7510 of each differential bid.

Method 29064 marketBuy. This method is called by or on behalf of an entity desiring to buy the target sale item. It accepts as a parameter a currency amount to act as a limit. If bidSet 29014 is empty, it returns an error that marketBuy cannot be executed because the effective asking price of the target sale item cannot be determined. Otherwise, if the effective asking price of the target sale item (attribute 29022 ask) is greater than the limit parameter, an error is returned that a market buy cannot be performed within the specified limit price. Otherwise, the top contender within bidSet 9014 (the one with the smallest gap between the current effective bid and the current asking price) is purchased by performing a marketBuy action upon it; funds from accepting this 29062 marketBuy request are used to pay for the target buy item, in combination with the differential amount of the corresponding differential bid.

Method 29066 showPeerBids. This method shows the competition between buyers that the item auction aspect of the buy-sell auction has created. It lists the outstanding bids on 29016 item in order from highest to lowest. For each bid, the number of other bids in the same bid set is also shown. (This reveals potential shill bidders, since they will typically not bid on other competitive items.) The identity of each bid is also provided, so that the method 27058 showPeers of a bid 27000, as illustrated shown in FIG. 13 or 27560 showPeers of a differential bid 27500, as shown in FIG. 14 may be invoked, to let the prospective buyer further evaluate his competition.

Method 29068 askPosted. This method accepts as a parameter the identity of a differential bid, and a currency amount. The identified differential bid is a member of 29014 bidSet, and the currency amount is the new asking price on the targetAuction 27510 of that differential bid, as shown in FIG. 14. The reason this method is being called is that the new asking price of the targetAuction 27510 may result in a new effective asking price for the target sale item. Method 29056 calculateAsk is called to perform this re-determination.

Method 29070 auctionWithdrawn. This method accepts as a parameter the identity of a differential bid, the targetAuction 27510, FIG. 14, which has been withdrawn. The identified differential bid is a member of 29014 bidSet. The reason this method is being called is that the withdrawal of targetAuction 27510 may result in a new effective asking price for the target sale item. Method 29056 calculateAsk is called to perform this re-determination.

Method 29072 marketSell. Called when the owner of a targetAuction 27510, as shown in FIG. 14, has executed a marketSell operation on that auction, and one of the bids in 29014 bidSet of this compound buy-sell auction is the top bid on that auction. That is, one of the bids in 29014 bidSet has won the auction upon which it was placed. It accepts as a parameter the identity of a differential bid 27500, which must be a member of 29014 bidSet The top bid in 29018 bidQueueStack is accepted; the proceeds from this sale are added to differential amount, attribute 27514 diffAmount, of the identified differential bid; and the resulting funds are used to pay for the purchase of the item of the targetAuction 27510 of the identified differential bid.

In various embodiments, programmatic objects compound buy-sell auction 29000 may have more or less attributes and/ or methods.

Figure 17:
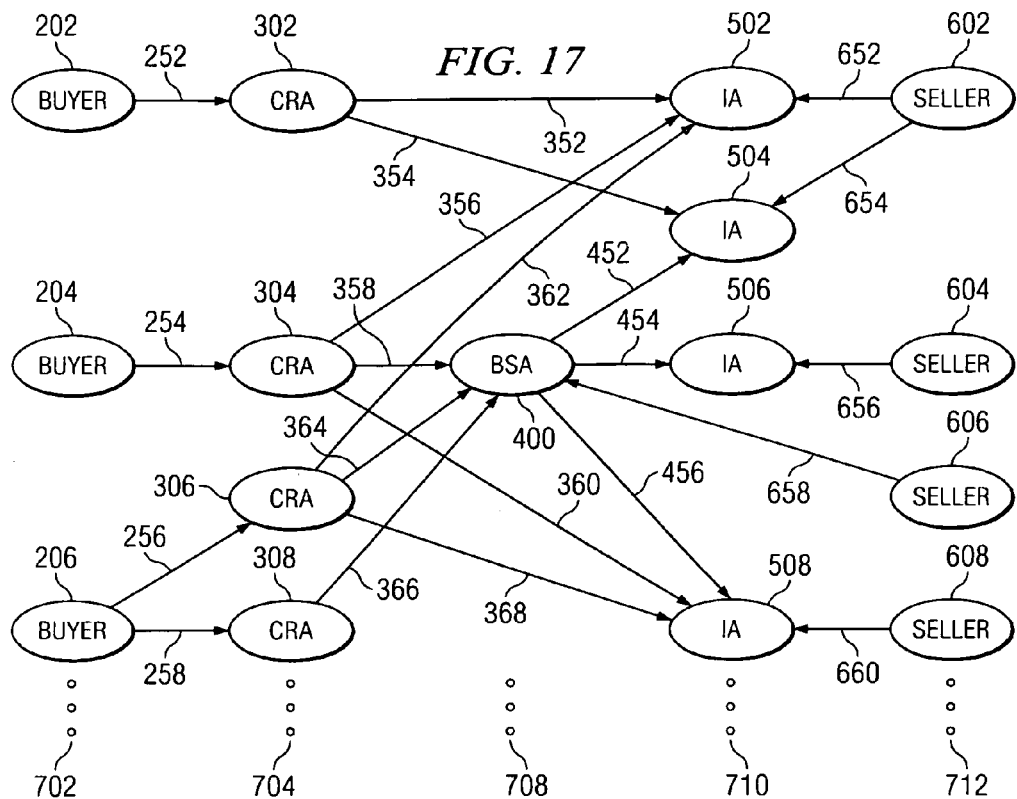
FIG. 17 illustrates a state diagram of a synthetic continuous double auction (SCDA) in the auction system of FIG. 12, representing an embodiment of the invention.

FIG. 17: Synthetic Continuous Double Auction with Compound Buy-Sell Auctions In various embodiments, a synthetic continuous double auction 10000 (SCDA) is a network of forward auctions (item auctions, continuous double auctions, and normalized continuous double auctions), composite reverse auctions, and compound buy-sell auctions. A compound buy-sell auction acts both as a forward auction and as a composite reverse auction. Forward auctions establish competition between the buyers owning the composite reverse auctions for the items being sold through the forward auctions. Composite reverse auctions establish competition between the sellers owning the item auctions for the business of the buyers owning the composite reverse auctions. It is this two-way competition that makes an SCDA (synthetic continuous double auction) a double auction.

Compound buy-sell auctions act as a combination of an item auction and a composite reverse auction. Compound buy-sell auctions thus take the role of item auctions in that they let the owner of the compound buy-sell auction sell an item, and put the plurality of bidders who bid on that item in competition with each other to buy it. Compound buy-sell auctions also take the role of a composite reverse auction in that they allow their owners to place bids on multiple item auctions (some of which may in turn be compound buy-sell auctions themselves), thus putting the sellers of those items in competition with each other for the business of the owner of the compound buy-sell auction.

Because the network comprising the SCDA (synthetic continuous double auction) is reduced, but not eliminated, each time a sale is executed, or an item or bid is withdrawn, an SCDA is continuous. That is, from the perspective of the various buyers, when one item they are bidding on disappears because it has been sold or withdrawn, the other items they are bidding upon or may bid upon remain, hence the SCDA continues. Likewise, withdrawal of a bid from an item auction, either because the buyer purchased a competing item, or because the bid expired or was withdrawn manually, does not affect the other bids that have been placed on that item auction; they remain valid, and more bids may be received as well, hence the item auction continues.

An SCDA (synthetic continuous double auction) is referred to as synthetic because it results from the combination of multiple forward auctions, composite reverse auctions, and compound buy-sell auctions, connected together by the actions of buyers and sellers (bids and asks, respectively).

To be more exact, an auction system 21000 combining a plurality of elements of type entity 22000, item 23000, item auction 24000 (and other forward auction types), composite reverse auction 25000, and compound buy-sell auction 29000 will contain a plurality of synthetic continuous double auctions (SCDA), where an SCDA is the transitive closure of forward auctions and composite reverse auctions connected by arcs representing bids.

FIG. 17 shows an exemplary configuration of a synthetic continuous double auction. Elements are as follows:

Three instances of Entity 22000 are shown in the role of buyers, labeled "Buyer". These are buyers 202, buyer 204, and buyer 206.

Four instances of Entity 2000 are shown in the role of sellers, labeled "Seller". These are seller 602, seller 604, seller 606, and seller 608.

Four instances of ItemAuction 4000 are shown, labeled IA 502, IA 504, IA 506, and IA 508.

Four instances of CompositeReverseAuction 25000 are shown, labeled CRA 302, CRA 304, CRA 306, and CRA 308.

One instance of compound buy-sell auction 29000 is shown, labeled BSA 400.

Arc 652 and arc 654 indicate that Seller 602 has two instances of ItemAuction 4000, here labeled IA 502 and IA 504.

Arc 656 indicates that Seller 604 has a single ItemAuction 24000, here labeled IA 506.

Arc 658 indicates that Seller 606 has a single compound buy-sell auction 29000, here labeled BSA 400.

Arc 660 indicates that Seller 608 has a single ItemAuction 24000, here labeled IA 508.

Arc 252 indicates that buyer 202 has a single instance of CompositeReverseAuction 25000, here labeled CRA 302, in its map attribute 22018 auctions.

Arcs 352 and 354 indicate that CRA 302 has bids placed on two instances of ItemAuction 24000, labeled IA 502 and IA 504, respectively.

Arc 254 indicates that buyer 204 has a single instance of CompositeReverseAuction 25000, here labeled CRA 304, in its map attribute 22018 auctions.

Arcs 356 and 360 indicate that CRA 304 has bids placed on two instances of ItemAuction 24000, labeled IA 502 and IA 508, respectively.

Arc 358 indicates that CRA 304 has a bid placed on one instance of compound buy-sell auction 29000, labeled BSA 400.

Arcs 452, 454, and 456 indicate that BSA 400 contains 3 instances of differential bid 24500 in its attribute 29014 bidSet, representing bids upon item auction 4000 instances IA 504, IA 506, and IA 508.

Arcs 256 and 258 indicates that buyer 206 has two instances of CompositeReverseAuction 25000, here labeled CRA 306 and CRA 308.

Arcs 362 and 368 indicate that CRA 306 has bids placed on two instances of ItemAuction 24000, labeled IA 502 and IA 508, respectively.

Arc 364 indicates that CRA 306 has a bid placed on one instance of compound buy-sell auction 9000, labeled BSA 400.

Arc 366 indicates that CRA 308 has a bid placed on one instance of compound buy-sell auction 29000, labeled BSA 400.

Ellipsis 702 indicates that there may be additional instances of Entity 22000 acting in the role of buyer, not shown.

Ellipsis 704 indicates that there may be additional instances of CompositeReverseAuction 25000, not shown.

Ellipsis 708 indicates that there may be additional instances of compound buy-sell auction 29000, not shown.

Ellipsis 710 indicates that there may be additional instances of ItemAuction 24000, not shown.

Ellipsis 712 indicates that there may be additional instances of Entity 22000 acting in the role of seller, not shown.

Referring to FIG. 24, a flow chart of a portion of a compound buy-sell auction is depicted. A client entity computer system 2410 is coupled to a communication system 2420, and process tasks, queries, etc. can be passed between the client entity computer system 2410 and the communication system 2420. The communication system 2420 is coupled to an auction system database 2430, and process tasks, queries, etc. can be passed between the communication system 2420 and the auction system database 2430.

Still referring to FIG. 24, this compound buy-sell auction has contingent bidding on a plurality of heterogeneous item auctions. A composite reverse auction resident at the auction system database 2430 is defined by a bid set including a first contingent bid on a first of the plurality of heterogeneous item auctions and a second contingent bid on a second of the plurality of heterogeneous item auctions. The bid set originates at the client entity computer system 2410 and is sent to the auction system database 2430 via the communication system 2420. The bid set and composite reverse auction defined thereby cause the process to advance to block 2440. The bid set includes one or more contingent bids. If an item auction corresponding to one (or more) of the contingent bids in the bid set exists, then the process advances to block 2450. If an item corresponding to one (or more) of the contingent bids in the bid set exists, then the process advances to block 2460. If the item associated with the existing item auction has not been withdrawn, the process advances to block 2465. In this particular embodiment one or more of the buyer, seller and/or auction house deems that the price of the buy item must exceed the price of the sell item, and if this is so, then the process advances to block 2470. If the terms of the buyer meet the terms of the seller, the process advances to block 2480. The composite reverse auction is ended when i) the first contingent bid from the bid set is accepted as a winning bid and substantially simultaneously ii) the second contingent bid from the bid set is withdrawn as a remaining bid at block 2480. The process then advances to block 2490 where the transacted item is withdrawn. It is important to note again that the bid set is visible to a) at least one first seller associated with the first of the plurality of heterogeneous item auctions, b) at least one second seller associated with the second of the plurality of heterogeneous item auctions, and c) buyers bidding on the first of the plurality of heterogeneous item auctions or the second of the plurality of heterogeneous item auctions.

Example 3

There is a remaining problem sometimes affecting entities buying items through auction mechanisms. This problem is that the same entity needs or desires to purchase multiple related items from possibly distinct sellers; and the buyer does not want to buy any of the items unless he can buy all of them on suitable terms. In such situations, there can be significant problems with buying any item prior to buying the other or others. For example, if items A and B are to be purchased, and item A is purchased prior to buying item B, then it may become the case that item B is then found to be unavailable, or unavailable at a suitable price. The buyer is then left holding item A, which is undesirable without item B, and which might not be easily resold to recoup his purchase price and transaction costs. The converse is of course true if item B is purchased before item A, as well as for any order permutation of purchase orders when more than 2 related items must be purchased.

In particular domains such as travel arrangements, these issues have been partially addressed by consolidating agents who either have ownership, or at least sale authority, for all the related items necessary to create suitable packages. An example of this is buying travel packages through travel agencies, where a single purchase yields airfare and accommodations at a single purchase. This existing approach is limited, however, in several respects. First, it does not allow prospective buyers to define their own packages to be composed of items being sold by different sellers, where those sellers are acting independently of each other, and where each seller is not necessarily even aware that the item they are selling is to be included in a package desired by a prospective buyer. Second, even when such consolidated packages are offered, they typically do not compete against other packages appropriate to individual buyers via the mechanism of a reverse auction. The implicit market competition between separately available packages that do not compete directly against each other for the business of a buyer is much weaker, and therefore of less benefit to the buyer. Indirectly, this implicit rather than explicit market competition is also of less benefit to sellers, because it does not assist sellers in competing effectively and efficiently.

Embodiments of the invention facilitate computer implemented compound buy-buy auctions, allowing a simple technique for a prospective buyer to aggregate several purchases into an all-or-nothing unit; and bid on them or perform a market buy operation upon them as a whole. In various embodiments, the invention is practical within a synthetic continuous double auction (SCDA).

Embodiments of the invention facilitate compound buy-buy auctions (CBBAs); giving an entity the ability to define a package auction, where upon creation the package auction it is defined to contain multiple items already for sale through forward auctions, which may include item auctions, continuous double auctions, normalized continuous double auctions, etc, each owned by possibly independent sellers. The CBBA owner then bids on or may perform a market buy operation upon that CBBA as though it were a single item auction. Furthermore, bids upon CBBAs may be placed through a composite reverse auction, such that the set of independent sellers owning the items being bid upon through the CBBA end up competing against the sellers of other items in that composite reverse auction, including other such packages. This happens even though the owners of the items so packaged do not need to be aware that their item is being bid upon through a CBBA or through a composite reverse auction. Each seller simply sees bids placed upon their items, accepts those bids at their discretion, posts and adjusts asking prices with regard to those items, or performs market sell operations to sell the items at the current high bid.

A CBBA has one or more of the following characteristics:

A CBBA is defined to contain a target set of forward auctions. The goal of the CBBA is to win all of the auctions in this target set at a single combined price. For example: the target set of auctions contained by a CBBA might consist of a particular round-trip airfare from Portland to Hawaii, and the rental cost of a particular condominium on Hawaii for the duration of stay.

Each bid placed upon the CBBA therefore represents the price to be paid to win all of the auctions, i.e. a winning bid amount for the CBBA equals the sum of the winning bids on the individual items. For example, if the airfare sells for $1000, and the rental week for $2000, then the price paid for the example CBBA would be $3000.

The CBBA presents an asking price which is the sum of the current asking prices of the component target auctions. In the above example, if (prior to sale) the asking price of the airfare was $1000, and the asking price of the rental week was $2000, the asking price presented by the CBBA would be $3000.

When a bid is placed upon a CBBA, this causes bids to be placed upon each component target auction priced such that if any seller accepts the bid on his component auction, the asking prices of all the other auctions within the CBBA are also met, and all of the items may be purchased as part of the same transaction wherein that single seller accepts the bid. Continuing the example above, if a bid of $2500 was placed upon the CBBA, this would result in a bid of $500 being placed upon the airfare (current asking price $1000), and a bid of $1500 being placed on the rental week (current asking price $2000). So, the bid placed upon this CBBA is $500 less than the total needed to buy all of its items at their current asking price, but this full $500 deficit is reflected in full in each bid placed upon a component item. This also has the following effects:

If the asking price of one item in the target set is lowered by $N, the effective bid on all the other items in the target set is raised by $N. For example, if the condominium seller was to lower his asking price by $100 from $2000 to $1900 in the example as explained above, this would result in the bid on the airfare automatically becoming $600 (without action by either the CBBA owner or the airfare seller), whereas the bid on the airfare would remain $1500. This is because lowering the asking price of any item lowers the gap between the current offer on the CBBA and the sum of the current asking prices. Because the bid presented upon each item reflects the full gap between the present CBBA bid and the sum of the current asking prices on the target items, when that gap narrows, the effective bid on the other items go up by the amount by which the gap narrowed.

Likewise, if the asking price of one item in the target set is raised by $N, the effective bid on all the other items in the target set is lowered by $N. In our example, if the airfare seller raised his price to $1100, the bid on the airfare would remain $500, but the bid on the condominium would be lowered to $1400, resulting in a $600 bid/ask gap for each item.

If the bid on the CBBA is raised or lowered by $N, the amount of the bid placed on each of the component items is raised or lowered by $N. Again, this is because the bid on each item reflects the full gap between the CBBA bid amount and the sum of the current asking prices on the target items, so raising or lowering the CBBA bid reduces or increases that gap.

The purchase of all target buy items is completed in a single transaction, so that either all such purchase actions are completed successfully, or none are performed at all. In the example above, either the tickets for the specified air travel and the rental agreement for the specified condominium for the specified week are both purchased, or neither the airfare nor the rental are purchased.

The owner of a CBBA treats it as an item auction, from the buyer's perspective. That is, he may either place a bid upon the CBBA, or perform a market buy operation. The latter results in paying the current asking price for each item in the target set.

A bid on a CBBA may be placed within a composite reverse auction. The other bids within such a composite reverse auction may be placed on other CBBAs, or on any forward auction. As with any composite reverse auction, a market buy operation may be performed upon a composite reverse auction containing a bid upon a CBBA.

The components and mechanisms for implementing various illustrative embodiments of compound buy-buy auctions, and how those compound buy-buy auctions interact within the framework of a synthetic continuous double auction system, are described in detail within this section. Underlying mechanisms such as transactions and the Internet that are well-understood by those of ordinary skill in the art of computer science are not described in detail.

Figure 18B:
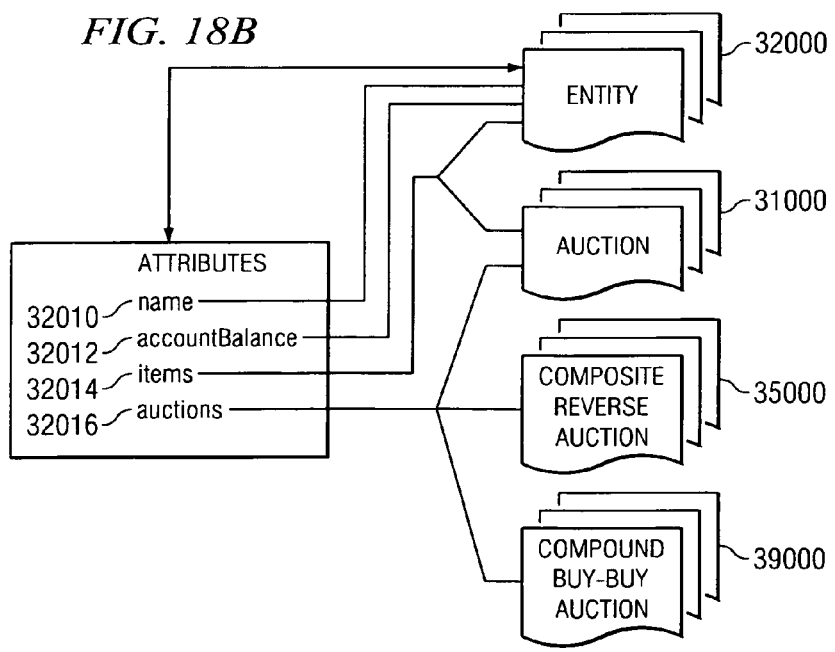
FIG. 18B illustrates additional details of the auction system of FIG. 18A, representing an embodiment of the invention.
Figure 18A:
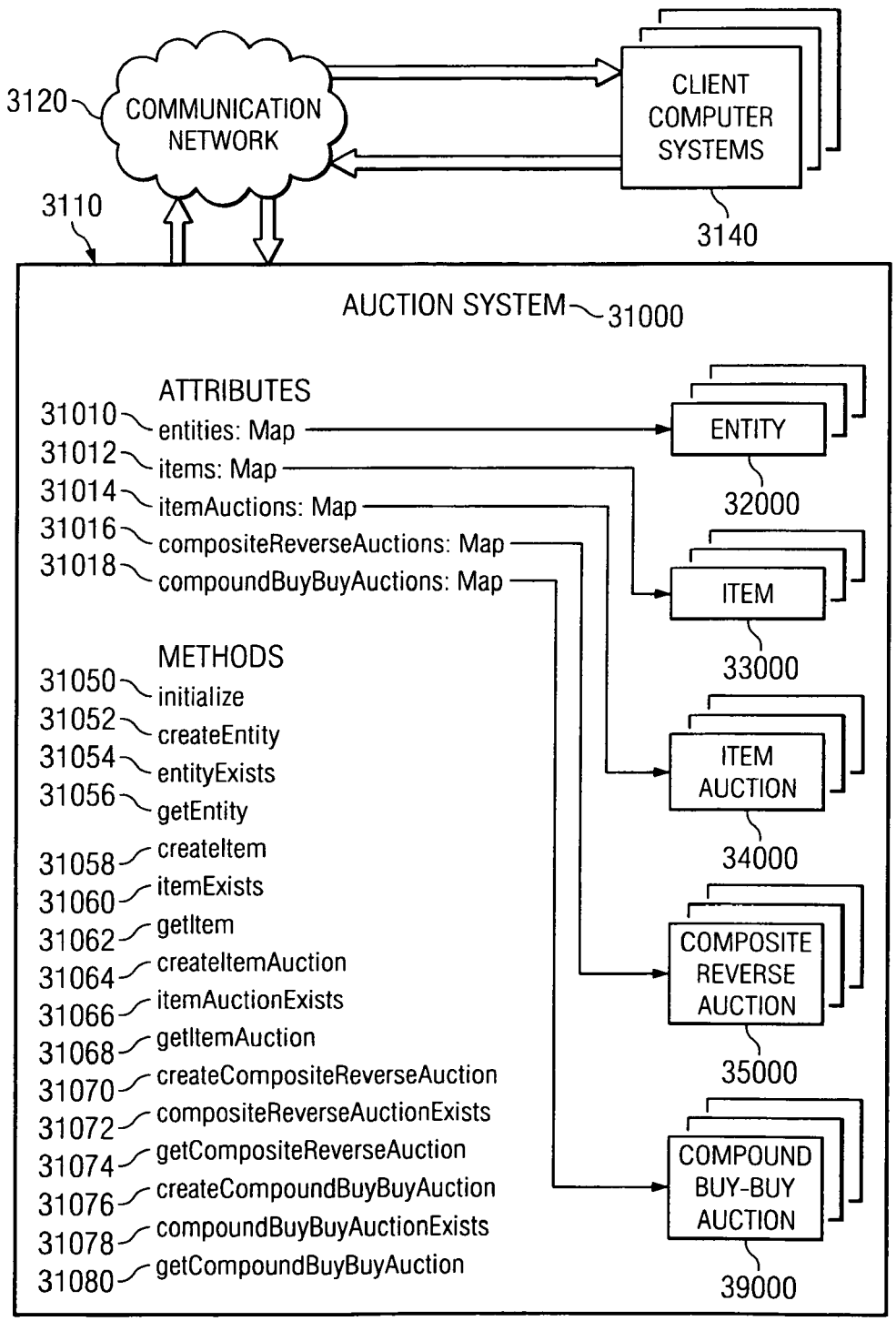
FIG. 18A illustrates a state diagram of an auction system that can be implemented by a computer program, representing an embodiment of the invention.

FIG. 18A: Auction System with Communication Network and Client Computer Systems

FIG. 18A shows an auction system 31000 running on a computer system 3110, coupled via a communication network 3120 to a plurality of client computer systems 3140, in accordance with various embodiments. Communication network 120 will typically be the Internet. However, in alternate embodiments, the invention may be practiced with other private and/or public communication networks. Typically, each system 3110/3140 includes one or more processors, memory, non-volatile mass storage, one or more input/output devices (such as keyboard, cursor control, network interface, and so forth). Any one of a number of servers available from a number of vendors may be used as computer system 3110. Any one of a number of desktop, notebook, tablet, and hand-held computers (including special purpose devices, such as mobile phones) available from a number of vendors may be used as client computer system 3140.

The purpose of communication network 3120 is to accept requests to and deliver responses from auction system 1000 and its component objects. Use of such communication networks 120 and client computer systems 140 to present these requests and responses is well understood within the field of computer programming and will not be described further.

For the illustrated embodiments, auction system 31000 is implemented in an entity-relationship manner, with the entities having attributes and methods. In alternate embodiments, auction system 31000 may be implemented in other manners. In various embodiments, auction system 31000 may have the following attributes:

Attribute 31010 entities is a map establishing a 1-to-1 correspondence between names of entities 32000 within auction system 31000 and the entities 32000 having those names.

Attribute 31012 items is a map establishing a 1-to-1 correspondence between names of items 23000 known within auction system 31000 and the items 33000 having those names.

Attribute 31014 itemAuctions is a map establishing a 1-to-1 correspondence between names of items 33000 known within auction system 31000 and the items 33000 having those names.

Attribute 31016 compositeReverseAuctions is a map establishing a 1-to-1 correspondence between names of composite reverse auctions 35000 within auction system 31000 and the composite reverse auctions 35000 having those names.

Attribute 31018 compoundBuyBuyAuctions is a map establishing a 1-to-1 correspondence between names of compound buy-buy auctions 39000 within auction system 31000 and the compound buy-buy auctions 39000 having those names.

In various embodiments, auction system 31000 may have the following methods.

Method 31050 initialize. This method prepares auction system 31000 for initial operation, including creating an empty map 31010 entities, an empty map 31012 items, an empty map 31014 itemAuctions, an empty map 31016 compositeReverseAuctions, and an empty map 31018 compoundBuyBuyAuctions.

Method 31052 createEntity. This method associates type and description information for an external entity with an identifier used to refer to that entity within the auction system 31000. In the context of auction system 31000, an entity is a person, or a corporation, government, or similar organization, capable of owning items 33000 that may be bought or sold using auction system 31000.

Method 31054 entityExists. This method checks whether an entity 32000 identified by an identifier received as a parameter to the method is known to auction system 31000, i.e. is contained within the map 31010 entities. Method 21056 getEntity. This method uses a parameter identifier to look up an entity 32000 within map 31010 entities, and return a reference to the associated programming object of type entity if the mapping exists.

Method 31058 createItem. This method associates type and description information for an external item with an identifier used to refer to that item within the auction system 31000. In the context of auction system 21000, an item is a product or service subject to being bought or sold within auction system 31000 by an entity 32000.

Method 31060 itemExists. This method checks whether an item 33000 identified by an identifier received as a parameter to the method is known to auction system 31000, i.e. is contained within the map 31012 items.

Method 31062 getItem. This method uses an identifying parameter to look up an item 33000 within map 31012 items, and to return a reference to the associated programming object of type item if the mapping exists.

Method 31064 createItemAuction. This method creates a programming object representing an item auction 34000, and uniquely associates it with an identifier received as a parameter to the method, that is, enters it into map 31014 itemAuctions.

Method 31066 itemAuctionExists. This method checks whether an item auction 34000 identified by an identifier received as a parameter to the method is known to auction system 31000, i.e. is contained within the map 31014 itemAuctions.

Method 31068 getItemAuction. This method uses an identifying parameter to look up an item auction 34000 within map 31014 itemAuctions, and to return a reference to the associated programming object of type item auction if the mapping exists.

Method 31070 createCompositeReverseAuction. This method creates a programming object representing a composite reverse auction 35000, and uniquely associates it with an identifier received as a parameter to the method, that is, enters it into map 31016 compositeReverseAuctions.

Method 31072 compositeReverseAuctionExists. This method checks whether a composite reverse auction 35000 identified by an identifier received as a parameter to the method is known to auction system 31000, i.e. is contained within the map 31016 compositeReverseAuctions.

Method 31074 getCompositeReverseAuction. This method uses an identifying parameter to look up a composite reverse auction 35000 within map 31016 compositeReverseAuctions, and to return a reference to the associated programming object of type composite reverse auction if the mapping exists.

Method 31076 createCompoundBuyBuyAuction. This method creates a programming object representing a compound buy-buy auction 39000, and uniquely associates it with an identifier received as a parameter to the method. That is, it enters it into map 31018 compoundBuyBuyAuctions.

Method 31078 compoundBuyBuyAuctionExists. This method checks whether a compound buy-buy auction 39000 identified by an identifier received as a parameter to the method is known to auction system 31000, i.e. is contained within the map 31018 compoundBuyBuyAuctions.

Method 31080 getCompoundBuyBuyAuction. This method uses an identifying parameter to look up a compound buy-buy auction 39000 within map 31018 compoundBuyBuyAuctions, and to return a reference to the associated programming object of type compound buy-buy auction if the mapping exists.

Referring to FIG. 18B, the programming objects entity 32000 may represent external entities and the monetary resources and items that those entities have made known to auction system 31000. The programming objects may include the ability to transfer funds, or to send communication to initiate and confirm transfer of funds, and to transfer ownership of items, or to send communication in order to initiate and confirm transfer of ownership. The programming objects may have the following attributes:

Attribute name 32010. Used to identify the entity 2000.

Attribute accountBalance 32012. This attribute indicates the monetary resources that may be used on behalf of the entity 32000 within transactions. This amount is credited when the entity makes a sale, and debited when the entity makes a purchase.

Attribute items 32014. This is a map identifying the set of items that are known to the auction system 31000 to be owned by this entity 2000. Each such item is identified by its name.

Attribute auctions 32018. This is a map identifying by name the set of forward, reverse, and compound buy-buy auctions owned by this entity.

The programming objects item 33000 may represent external products and services such as those that may be bought and sold through auction system 31000. These programming objects may include such attributes and methods as identifying the entity that currently owns them.

The programming objects item auction 34000 are described below.

The programming objects composite reverse auction 35000 are described below.

The programming objects compound buy-buy auction 39000 are described below.

In alternate embodiments, auction system 31000 may have more or less attributes and/or methods.

FIG. 19: Bid 37000

For the illustrative embodiments, a Bid is a programmatic object identifying the auction that is being bid upon, the item being bid on, the amount of the bid, the entity placing the bid, the BidSet containing the bid, and the time the bid will expire.

In various embodiments, a Bid may have the following attributes:

37010 bidAmount. This expresses the monetary quantity of the bid.

37012 auction. This refers to the programmatic object representing either an item auction 4000 or a buy-buy auction 9000 on which the bid was placed.

37014 buyer. This refers to the Entity 32000 who placed the bid.

37016 bidSet. This refers to the BidSet 38000 containing the bid.

37018 expiration. This is the time at which the bid will expire. Note that when this point in time is reached, the Bid 37000 object will invoke its own method 7056 withdraw, if the bid has not yet been accepted.

A Bid may have the following methods:

37050 initialize. This method takes as parameters the bidAmount, auction reference, buyer reference, and bidSet reference that are then assigned as the corresponding attributes of the object.

7052 accept. This method is called when the bid is accepted by the seller, i.e. the seller has agreed to sell the item at the price represented by the bid. The primary function of this method is to call the bidAccepted method of attribute 7016 bidSet, so that the other bids in that BidSet may be withdrawn from their respective target auctions.

7054 auctionClosed. This method is called when the auction is no longer available, either because it was withdrawn by the seller or because someone else won the auction. The primary responsibility of this method is to call the auctionClosed method of attribute 7016 bidSet, so that the bid may be removed from the BidSet.

7056 withdraw. This method is called to withdraw a bid from an auction. It functions by calling method 4060 withdrawBid of the programming object 37012 auction.

37058 showPeers. This method invokes the showPeers method of 37016 bidSet, so that the competition created by that BidSet can be seen.

In various embodiments, a Bid may have more or less attributes and/or methods.

FIG. 3: Bid Set

In various embodiments, a BidSet 8000 is a programming object representing a set of bids owned by the same Entity 2000, and related by a satisfaction function which causes all remaining bids in the BidSet to be withdrawn when the satisfaction function is satisfied. Typically, the satisfaction function says that only one bid may be accepted, hence the items being bid upon by the owning Entity through this BidSet are exclusive alternatives, i.e. the buyer only wants one of them.

In various embodiments, a BidSet 8000 may have the following attributes:

Attribute 8010 name. This is a string uniquely identifying the BidSet within the auction system 1000.

Attribute 8012 owner. This is a reference to the Entity 2000 owning the BidSet 8000, i.e. the Entity 2000 who has placed the bids contained within the BidSet 8000.

Attribute 8014 bids. This is a set of bids currently contained by the BidSet 8000.

In various embodiments, a BidSet 8000 may have the following methods:

Method 8050 initialize. This method accepts a name string and owner object reference as parameters and assigns the 8010 name attribute, 8012 owner attribute, and creates an empty set for the 8014 bids attribute.

Method 8052 insertBid. This method accepts a reference to a programmatic object of type bid 7000 and adds the reference to the set attribute 8014 bids.

Method 8054 bidAccepted. This method is called when a bid within the set attribute 8014 bids has been accepted, i.e. a sale has been executed on the terms of that bid. The method accepts as a parameter a reference to the bid 7000 that was accepted. The method executes by then calling the method 7056 withdraw for every bid 7000 within the set attribute 8014, except for the bid that was accepted.

Method 8056 auctionClosed. This method is called when an auction has closed, either because the item was sold or because it was withdrawn, and at least one bid 7000 tracked within set attribute 8014 that was a bid on that auction. The method accepts as a parameter the identity of said bid 7000, and removes that bid from set attribute 8014.

Method 8058 getSmallestGapBid. For each bid 7000 within the BidSet, this method calculates the difference between the current asking price of the target auction and the bid price of the bid. This is the gap amount for a bid. The method compares the gap amounts of all the bids and differential bids within the BidSet, and returns the bid having the smallest gap amount. If the BidSet is empty, null is returned.

Method 8060 showPeers. This method shows the competition between sellers that this BidSet has created. It presents the target auctions of the contained bids as a list sorted by their bid gaps, so that the auction where the buyer's bid and the seller's ask are closest is presented first. The identity of each auction is part of the information presented in the list, so that it may in turn be used to view the bidder-to-bidder competition for that item.

In various embodiments, a BidSet may have more or less attributes and/or methods.

FIG. 4: Item Auction

In various embodiments, an item auction 4000 is a programmatic object representing the auction of a particular item. It may have the following attributes:

Attribute 4010 name. This identifying string allows the item auction 4000 to be located by method 1068 getItemAuction.

Attribute 4012 item. This is a reference to a programmatic object of type item 3000 representing the item being sold through this auction.

Attribute 4014 seller. This is a reference to a programmatic object of type entity 2000 representing the entity currently owning the item 3000 being sold through this auction.

Attribute 4016 bidQueueStack. This is a reference to a programmatic object of type BidQueueStack 6000, representing the various bids received on the auction. Programmatic objects BidQueueStack 6000 are described separately below.

Attribute 4018 ask. This attribute represents the price that the seller of the item is currently asking.

In various embodiments, item auction 4000 may have the following methods:

Method 4050 initialize. This method takes as parameters an identifying string name, a reference to a programmatic object item, a reference to a programmatic object seller, and an amount representing the initial asking price for the item. The method assigns these parameters to the attributes 4010 name, 4012 item, 4014 seller, and 4018 ask, respectively. It also creates an initialized but otherwise empty programmatic object of type BidQueueStack, a reference to which is assigned to attribute 4016 bidQueueStack.

Method 4052 postAsk. This method accepts as a parameter a currency amount, which is assigned to attribute 4018 ask. The method 6052 getTopBid, FIG. 5B, of attribute 4016 bidQueueStack is called to retrieve the current top bid, which is then compared to the value of 4018 ask. If the attribute 7010 bidAmount of the current top bid is greater than or equal to the newly established value of attribute 4018 ask, said bid is accepted by calling its method 7052 accept. A sale is thus executed for the amount specified by 4018 ask (or more if the bid was for more). That is, either funds are directly transferred, or communication is initiated to cause transfer of funds in said amount from the buyer identified by said bid to the external entity represented by attribute 4014 seller, and ownership of the external item represented by attribute 4012 item is either directly transferred, or communication is initiated to cause transfer of that ownership to the buyer identified by said bid.

Method 4054 postBid. This method accepts as a parameter a programmatic object of type bid 7000. identifying an entity placing the bid and an amount of the bid. If the bid amount is greater than or equal to the amount represented by attribute 4018 ask, a sale is executed between seller 4014 and the buyer identified by the bid for the amount identified by attribute 4018 ask. This sale execution is accomplished by calling the method 7052 accept of a bid 7000 object. Otherwise, the bid is passed to the method 6050 postBid of attribute 4016 bidQueueStack.

Method 4056 marketSell. This method indicates that seller 4014 wishes to sell to the highest current bidder. The method executes by first calling method 6052 getTopBid, FIG. 5B, of attribute 4016 bidQueueStack. If a non-null result is received (meaning that at least one bid has been received for the item being sold; the result is the highest such bid), then the sale of item is executed between seller 4014 and the buyer identified by the bid for the amount identified by attribute 4018 ask. This execution is performed by calling the method 7052 accept of a Bid 7000 object.

Method 4058 marketBuy. This method accepts as a parameter a reference to a programmatic object entity 2000 who wants to buy the item 3000 identified by attribute 4012 item, here referred to as the buyer, and causes execution of the sale of item 4012 from seller 4014 to said buyer at the price specified by attribute 4018 ask. This is done by creating a Bid 7000 object for the current asking price, then executing the method 7052 accept of said Bid 7000.

Method 4060 withdrawBid. This method accepts the identity of a bid 7000 as a parameter, and invokes method 6054, FIG. 5B of attribute 4016 bidQueueStack of the bid 7000 to withdraw that bid.

Method 4062 withdraw. This method is invoked to withdraw the item from sale. It in turn invokes the method 6056, FIG. 5B, withdrawAuction on the attribute 4016 bidQueueStack.

Method 4064 showBids. This method presents the current set of bids on the auction. Bids are presented in a list so that the highest-to-lowest price structure is evident, and when multiple bids are present at the same price, they are presented such that their post-time is evident. In other words, the same structure preserved within the BidQueueStack is evidenced by the order of list returned. The identity of each bid is available, so that the BidSet of which the bid is a member may be retrieved by calling its showPeers method. Note that the bids may be either of type bid 7000 or differential bid 7500.

In various embodiments, item auction 4000 may have more or less attributes and/or methods.

FIG. 5A: BidQueueStack

In various embodiments, a BidQueueStack 6000 is a programmatic object representing the set of bids that have been received for the item being sold through an item auction 4000 or compound buy-buy auction 9000 FIG. 18, and which have not expired or been withdrawn. Each bid may be either of type bid 7000, identifying an entity 2000 placing the bid, a currency amount the bidder is willing to pay, and an expiration time for the bid. The bids are organized in two dimensions. First, each bid is placed into a queue containing only other bids at the same price. Bids are ordered within each such queue by the time the bid was received. Second, the queues are arranged into a stack according to the price of the bids contained within each queue, with the queue containing the highest-priced bids at the top.

FIG. 5B

In various embodiments, programmatic objects BidQueueStack 6000 may support the following methods:

Method 6050 postBid. This method accepts a bid 7000 as a parameter, and places it at the end of the queue containing other bids at that price point, creating the queue if it doesn't exist.

Method 6052 getTopBid. This method returns the first bid 7000 from the top-most non-empty queue in the stack, if there is one; otherwise it returns null.

Method 6054 withdrawBid. This method accepts the identity of a bid 7000 as a parameter, and removes it from the queue of the BidQueueStack programming object containing it, if any.

Method 6056 withdrawAuction. This method invokes the method 7054 auctionClosed for each bid 7000 within the BidQueueStack.

In alternate embodiments, BidQueueStack 6000 may support more or less methods.

FIG. 6: Composite Reverse Auction

In various embodiments, a composite reverse auction 5000 is a programmatic object defining the attributes and methods of objects used to represent composite reverse auctions.

A composite reverse auction consists primarily of a set of bids (a BidSet 8000) on different forward auctions and compound buy-buy auctions, and methods that cause the object to function as a reverse auction, as described below. These forward auctions may be any of at least the following types: item auctions, continuous double auctions, or normalized continuous double auctions.

Each of the forward auctions on which bids are placed allow bids to expire or to be withdrawn. When one bid from the BidSet 8000 of a composite reverse auction 5000 is accepted, the others are automatically withdrawn. This puts the forward auctions (including the auctions being bid on indirectly through a compound buy-buy auction that is bid on directly from the composite reverse auction) on which the bids are placed into competition with each other. (Here, the satisfaction function of the BidSet 8000 is that any bid within the BidSet has been accepted; in other embodiments, different satisfaction functions might be used, such as those that indicate available funds have been exhausted.)

In various embodiments, programmatic objects composite reverse auction 5000 may have the following attributes:

Attribute 5010 name. This attribute gives a convenient way of identifying a particular composite reverse auction 5000 object.

Attribute 5012 owner. This is a reference to the Entity 2000 object representing the entity placing bids through this composite reverse auction 5000 object.

Attribute 5014 bidSet. This is a reference to the BidSet 8000 object holding the bids being placed through this composite reverse auction 5000 object.

In various embodiments, programmatic objects composite reverse auction 5000 may support at least the following methods:

Method 5050 initialize. This method accepts as parameters a string to become the name, and a reference to the Entity 2000 object to become the owner. It also creates an empty BidSet 8000 for the attribute 5014 bidSet.

Method 5052 postBid. This method accepts as a parameter a Bid 7000. It adds said bid to bidSet 5014. It also Invokes the method 4054 postBid of the item auction identified by said bid, or the corresponding postBid method of other forward auction types. Note that this invocation may result in the execution of a sale.

Method 5054 marketBuy. This means that the owner 5012 would like to buy the item whose current asking price is closest to the bid on that item in the composite reverse auction's BidSet. Because the buyer has placed bids at different prices on each item in the BidSet, these different prices have normalized the buyer's interest in the items, i.e. any item being bid upon is equally acceptable to the buyer at the price bid.

This method accepts as a parameter a currency amount expressing a limit on the marketBuy operation. The limit is an expression of the maximum amount over the current bid the buyer is willing to pay. The reason that the limit is necessary is that the conditions of the auctions in the composite reverse auction's BidSet may change between the moment that the buyer views them and decides to buy at market, and the moment that his marketBuy request is received by the auction system. For example, the auction that has the smallest bid/ask gap might have been sold to another bidder, so that auction is therefore unavailable. The auction in the composite reverse auction with the next-smallest bid/ask gap might be substantially larger; if no limit was imposed and that auction bought from instead, the buyer might pay more than he was expecting.

The reason that the limit is expressed as an amount over the current bid, rather than as a total amount, is that bids on different items in the bid set may be for different amounts. Hence a single total would not be effective, whereas a differential can be applied to each bid to determine the actual maximum.

This method invokes method 8058 getSmallestGapBid on its BidSet. If the gap amount of said Bid is greater than the limit received as a parameter, an error is returned. Otherwise, a new Bid that meets the asking price of the target auction of said smallest gap Bid is created and placed on said target auction, resulting in said new Bid being accepted, and a sale therefore executing.

Method 5056 showPeerBids. This method shows the competition between sellers that the composite reverse auction has created. It presents the target auctions as a list sorted by their bid gaps, so that the auction where this buyer's bid and the seller's ask are closest is presented first. The identity of each auction is part of the information presented in the list, so that it may in turn be used to view the bidder-to-bidder competition for that item.

In various embodiments, programmatic objects composite reverse auction 5000 may have more or less attributes and/or methods.

Figure 20:
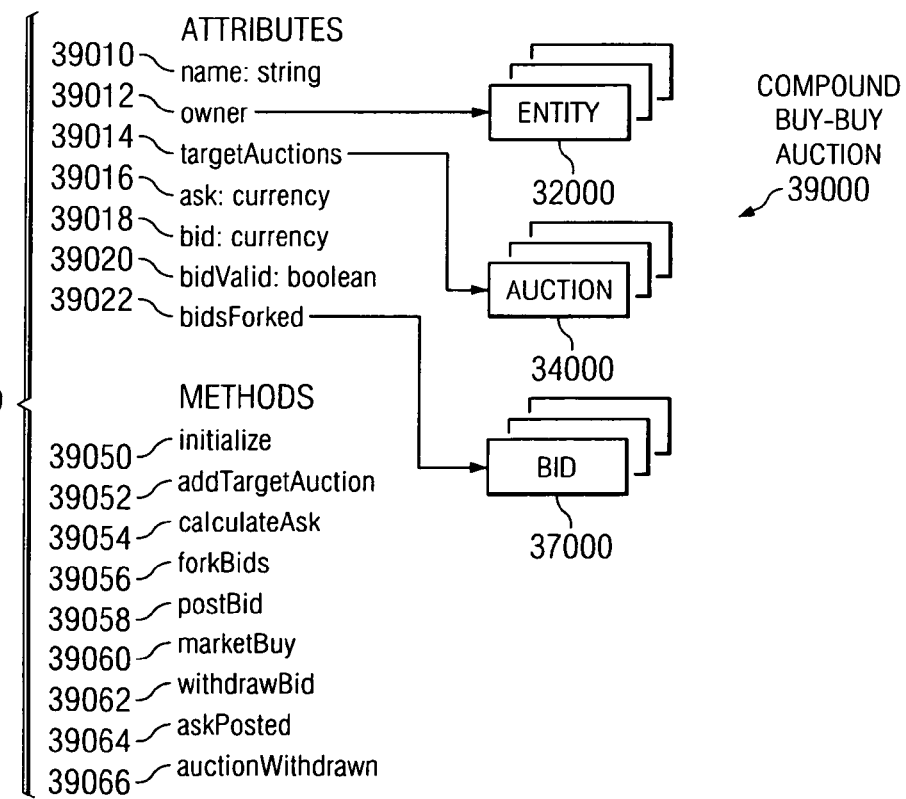
FIG. 20 illustrates a state diagram of a compound buy-buy auction in the auction system of FIG. 18, representing an embodiment of the invention.

FIG. 20: Compound Buy-Buy Auction 39000

In various embodiments, a compound buy-buy auction 39000 is a programmatic object defining the attributes and methods of objects used to represent compound buy-buy auctions.

The general order in which the methods of a compound buy-buy auction are invoked are:

Method 39050 initialize is invoked to create the buy-buy auction.

Method 39052 addTargetAuction is called two or more times to establish which auctions are in the target set.

Method 39058 postBid is invoked to place a bid for the set of target auctions. This may result in success (purchase of all items), or not.

It may have the following attributes:

Attribute 39010 name. This attribute gives a convenient way of identifying a particular composite reverse auction 39000 object.

Attribute 39012 owner. This is a reference to the Entity 32000 object representing the entity that is using this compound buy-buy auction to buy a set of items.

Attribute 39014 targetAuctions. This represents the target set of auctions 34000 That is; the purpose of this compound buy-buy auction is to enable buying the items being sold through all of the auctions in this target set in a single transaction.

Attribute 39016 ask. This is the current asking price for this buy-buy auction. Note that this attribute is computed rather than being set directly (see below). 39016 ask represents the sum of the current asking prices of the target auctions.

Attribute 39018 bid. If 39020 bidValid is true, represents the monetary amount of the bid that has been placed to buy all items through the auctions in 39014 targetAuctions; otherwise undefined.

Attribute 39020 bidValid. It is true if method 9056 postBid has been invoked to post a bid on this buy-buy auction; otherwise it is false.

Attribute 39022 bidsForked. The set of bids 37000 that have been generated and posted to the auctions identified in 39014 targetAuctions.

In various embodiments, programmatic objects compound buy-buy auction 39000 may support at least the following methods:

Method 39050 initialize. This method accepts as parameters an identifying string name, and a reference to the Entity 32000 object to become attribute 39012 owner. It creates an empty set 39014 targetAuctions. It also creates an empty set 39022 bidsForked.

Method 39052 addTargetAuction. Accepts as a parameter the identity of a forward auction that owner 39012 would like to add to 39014 targetAuctions, i.e. he would like to include the item being sold through that auction in the set that this buy-buy auction will purchase if successful. Within a transaction, this method adds the auction to 39014 targetAuctions, and then invokes method 39054 calculateAsk.

Method 39054 calculateAsk. Within a transaction, determines the least amount of money that must be paid to buy all of the items in the target auction set 39014 targetAuctions at their current asking prices, and sets attribute 39016 ask to be this amount.

Method 39056 forkBids. If attribute bidValid 39020 is false, returns an error. Otherwise performs the following within a single transaction. First, determines the difference between attribute 39016 ask and attribute 39018 bid; this difference is the bid/ask gap for this buy-buy auction. For each auction in the target set 39014 targetAuctions, creates a bid for the amount of the current asking price for that auction, minus the bid/ask gap just calculated for this buy-buy auction, and posts that bid, then places it in 39022 bidsForked. Note that if the calculated bid/ask gap is zero, and then each of the posted bids will be accepted—all within the current transaction.

Method 39058 postBid. Accepts as a parameter a currency amount, which represents the total amount that the entity 32000 identified by attribute 39012 owner is willing to pay for the entire set of items being sold through the target set of auctions. Within a transaction, sets 39020 bidValid to true, sets 39018 bid to the parameter currency amount, and invokes method 39056 forkBids.

Method 39060 marketBuy. Accepts as a parameter, a currency amount, to act as a limit to the amount that will be paid.

Within a transaction, does the following. Invokes 9054 calculateAsk. If 9016 ask is then equal to or less than the limit parameter, method 9058 postBid is invoked, passing as a parameter an amount equal to 39016 ask. This will result in the successful purchase of all items in the target set.

Method 39062 withdrawBid. Within a transaction, performs the following. Invokes method 37056 withdraw, shown in FIG. 19, for every bid in 39022 bidsForked. Sets attribute 39020 bidValid to false.

Figure 19:
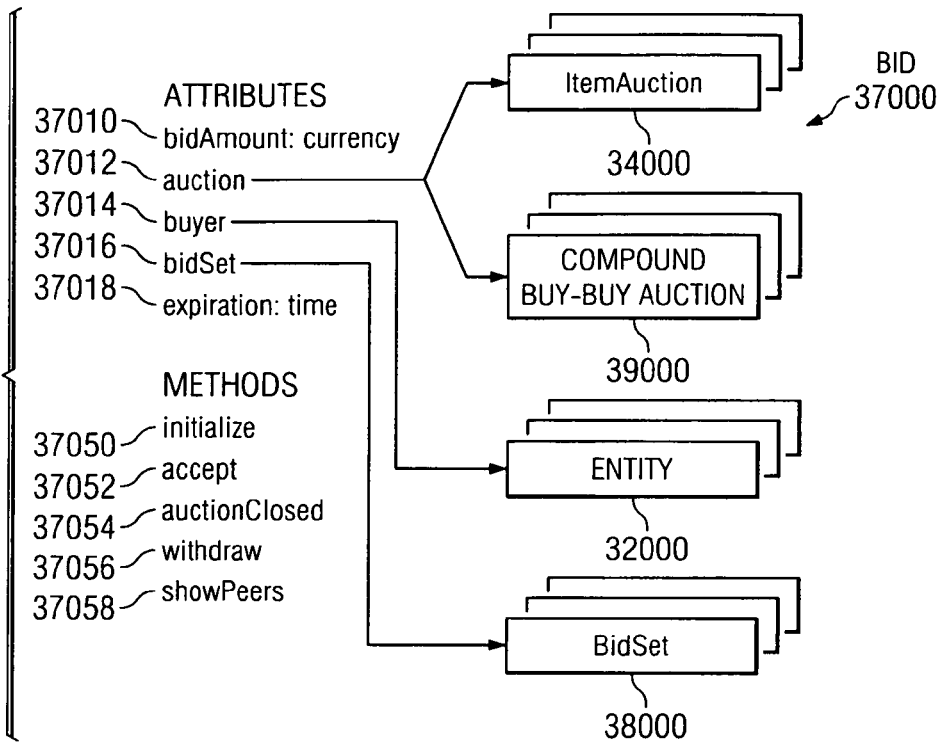
FIG. 19 illustrates a state diagram of a bid in the auction system of FIG. 18, representing an embodiment of the invention.

Method 39064 askPosted. This method accepts as a parameter the identity of a bid 37000, as shown in FIG. 19, and a currency amount. The currency amount is the new asking price on the targetAuction 7012 of that bid. The reason this method is being called is that the new asking price of the auction 7012 may result in a new asking price 9016 ask. Performs the following within a single transaction. Method 39054 calculateAsk is called, followed by calling method 39056 forkBids. Note that this may result in the compound buy-buy auction succeeding, i.e. buying all of its target items.

Method 39066 auctionWithdrawn. This method accepts as a parameter the identity of a bid 37000, as shown in FIG. 19, the auction identified by the bid's auction 37012 attribute has been withdrawn. Because the set of target auctions is now incomplete, this compound buy-buy auction cannot function properly unless owner 39012 adds in an alternative auction and places a new bid. Method 39066 auctionWithdrawn therefore performs the following, all within a single transaction. It sets 39020 bidValid to false. And calls method 37056 withdraw for each bid 37000 in 39022 bidsForked.

In various embodiments, programmatic objects compound buy-buy auction 39000 may have more or less attributes and/or methods.

Figure 21:
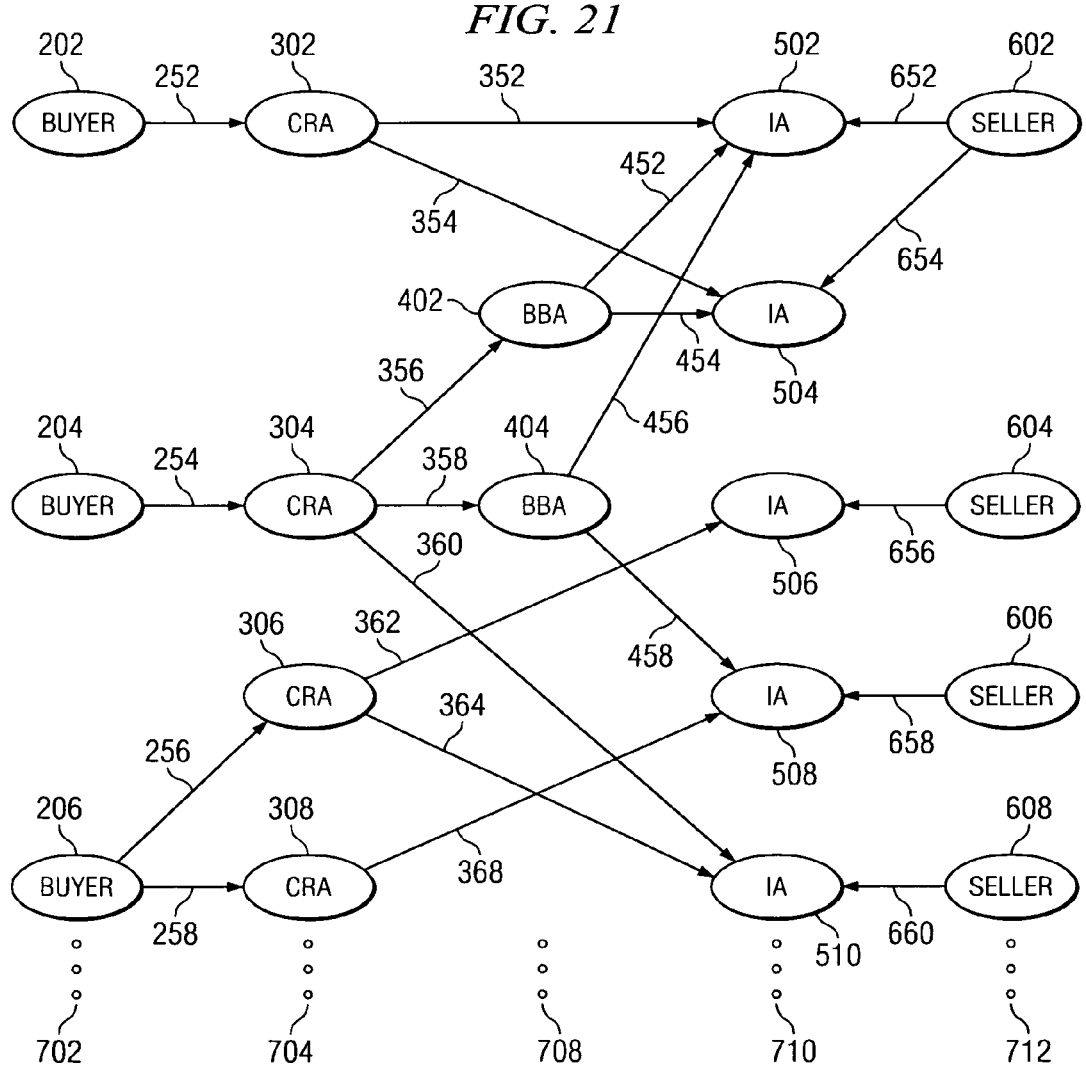
FIG. 21 illustrates a state diagram of a synthetic continuous double auction (SCDA) in the auction system of FIG. 18, representing an embodiment of the invention.

FIG. 21: Synthetic Continuous Double Auction with Compound Buy-Buy Auctions

In various embodiments, a synthetic continuous double auction 310000 (SCDA) is a network of forward auctions (item auctions, continuous double auctions, and normalized continuous double auctions), composite reverse auctions, and compound buy-buy auctions. Forward auctions establish competition between the buyers owning the composite reverse auctions for the items being sold through the forward auctions. Composite reverse auctions establish competition between the sellers owning the item auctions for the business of the buyers owning the composite reverse auctions. It is this two-way competition that makes an SCDA a double auction.

Because the network comprising the SCDA (synthetic continuous double auction) is reduced, but not eliminated, each time a sale is executed, or an item or bid is withdrawn, an SCDA is continuous. That is, from the perspective of the various buyers, when one item they are bidding on disappears because it has been sold or withdrawn, the other items they are bidding upon or may bid upon remain, hence the SCDA continues. Likewise, withdrawal of a bid from an item auction, either because the buyer purchased a competing item, or because the bid expired or was withdrawn manually, does not affect the other bids that have been placed on that item auction; they remain valid, and more bids may be received as well, hence the item auction continues.

An SCDA (synthetic continuous double auction) is referred to as synthetic because it results from the combination of multiple forward auctions, composite reverse auctions, and compound buy-buy auctions, connected together by the actions of buyers and sellers (bids and asks, respectively).

Within the network of an SCDA (synthetic continuous double auction), a compound buy-buy auction acts as a simple technique for a prospective buyer to aggregate several purchases into an all-or-nothing unit, and bid on them or perform a market buy operation upon them as a whole.

To be more exact, an auction system 1000 combining a plurality of elements of type entity 2000, item 3000, item auction 4000 (and other forward auction types), composite reverse auction 5000, and compound buy-buy auction 39000 will contain a plurality of synthetic continuous double auctions (SCDA), where an SCDA is the transitive closure of forward auctions and composite reverse auctions connected by arcs representing bids. Compound buy-buy auctions 39000 extend the transitive closure of bids, i.e. a bid placed upon a CBBA extends the transitive closure through the bids that it in turn generates, as represented by its attribute 39022 bidsForked.

FIG. 21 shows an exemplary configuration of a synthetic continuous double auction. Elements are as follows:

Three instances of Entity 2000 are shown in the role of buyers, labeled "Buyer". These are buyers 202, buyer 204, and buyer 3206.

Four instances of Entity 2000 are shown in the role of sellers, labeled "Seller". These are seller 602, seller 604, seller 606, and seller 608.

Five instances of ItemAuction 4000 are shown, labeled IA 502, IA 504, IA 506, and IA 508 and IA 510.

Four instances of CompositeReverseAuction 5000 are shown, labeled CRA 302, CRA 304, CRA 306, and CRA 308.

Two instances of compound buy-buy auction 39000 are shown, labeled BBA 402 and BBA 404.

Arc 652 and arc 654 indicate that Seller 602 has two instances of ItemAuction 4000, here labeled IA 502 and IA 504.

Arc 656 indicates that Seller 604 has a single ItemAuction 4000, here labeled IA 506.

Arc 658 indicates that Seller 606 has a single compound ItemAuction 4000, here labeled IA 508.

Arc 660 indicates that Seller 608 has a single ItemAuction 4000, here labeled IA 510.

Arc 252 indicates that buyer 202 has a single instance of CompositeReverseAuction 5000, here labeled CRA 302, in its map attribute 2018 auctions.

Arcs 352 and 354 indicate that CRA 302 has bids placed on two instances of ItemAuction 4000, labeled IA 502 and IA 504, respectively.

Arc 254 indicates that buyer 204 has a single instance of CompositeReverseAuction 5000, here labeled CRA 304, in its map attribute 2018 auctions.

Arcs 356 and 358 indicate that CRA 304 has bids placed on two instances of compound buy-buy auction 39000, here labeled BBA 402 and BBA 404.

Arc 360 indicates that CRA 304 has a bid placed on one instance of ItemAuction 4000, labeled IA 510.

Arcs 452 and 454 indicate that compound buy-buy auction BBA 402 contains two instances of ItemAuction 4000 in its target set 39014 targetAuctions, which are labeled IA 502 and IA 504, respectively.

Arcs 456 and 458 indicate that compound buy-buy auction BBA 404 contains two instances of ItemAuction 4000 in its target set 39014 targetAuctions, which are labeled IA 502 and IA 508, respectively.

Arcs 256 and 258 indicate that buyer 206 has two instances of CompositeReverseAuction 5000, here labeled CRA 306 and CRA 308.

Arcs 362 and 364 indicate that CRA 306 has bids placed on two instances of ItemAuction 4000, labeled IA 506 and IA 510, respectively.

Arc 368 indicates that CRA 308 has a bid placed on one instance of ItemAuction 4000, labeled IA 508.

Ellipsis 702 indicates that there may be additional instances of Entity 2000 acting in the role of buyer, not shown.

Ellipsis 704 indicates that there may be additional instances of CompositeReverseAuction 5000, not shown.

Ellipsis 708 indicates that there may be additional instances of compound buy-buy auction 39000, not shown.

Ellipsis 710 indicates that there may be additional instances of ItemAuction 4000, not shown.

Ellipsis 712 indicates that there may be additional instances of Entity 2000 acting in the role of seller, not shown.

Referring to FIG. 25, a flow chart of a portion of a compound buy-buy auction is depicted. A client entity computer system 2510 is coupled to a communication system 2520, and process tasks, queries, etc. can be passed between the client entity computer system 2510 and the communication system 2520. The communication system 2520 is coupled to an auction system database 2530, and process tasks, queries, etc. can be passed between the communication system 2520 and the auction system database 2530.

Still referring to FIG. 25, this compound buy-buy auction has contingent bidding on a plurality of heterogeneous item auctions. A composite reverse auction resident at the auction system database 2530 is defined by a bid set including a first contingent bid on a first of the plurality of heterogeneous item auctions and a second contingent bid on a second of the plurality of heterogeneous item auctions. The bid set originates at the client entity computer system 2510 and is sent to the auction system database 2530 via the communication system 2520. The bid set and composite reverse auction defined thereby cause the process to advance to block 2540. The bid set includes one or more contingent bids. If an item auction corresponding to one (or more) of the contingent bids in the bid set exists, then the process advances to block 2550. If an item corresponding to one (or more) of the contingent bids in the bid set exists, then the process advances to block 2560. If the item associated with the existing item auction has not been withdrawn, the process advances to block 2565. In this particular embodiment the buyer deems that the total price of the buy items should be minimized, and if this is so, then the process advances to block 2570. If the terms of the buyer meet the terms of the seller, the process advances to block 2580. The composite reverse auction is ended when i) the first contingent bid from the bid set is accepted as a winning bid and substantially simultaneously ii) the second contingent bid from the bid set is withdrawn as a remaining bid at block 2580. The process then advances to block 2590 where the transacted item is withdrawn. Once again, it is important to note that the bid set is visible to a) at least one first seller associated with the first of the plurality of heterogeneous item auctions, b) at least one second seller associated with the second of the plurality of heterogeneous item auctions, and c) buyers bidding on the first of the plurality of heterogeneous item auctions or the second of the plurality of heterogeneous item auctions.

DEFINITIONS

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive "or" and not an exclusive "or". Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set, or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub) method, (sub) process and/or (sub) routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

CONCLUSION

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences.

It can be appreciated by those of ordinary skill in the art to which embodiments of the invention pertain that various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. An apparatus, comprising a computer network including at least one auction server, at least one seller client and at least one buyer client, wherein the at least one auction server, the at least one seller client and the at least one buyer client are executing on a computer system a synthetic continuous double auction having contingent bidding on a plurality of heterogeneous item auctions, wherein the synthetic continuous double auction includes a composite reverse auction, defined to include a bid set including a first contingent bid on a first of the plurality of heterogeneous item auctions and a second contingent bid on a second of the plurality of heterogeneous item auctions, is ended when i) the first contingent bid from the bid set is recognized as a winning bid and substantially simultaneously ii) the second contingent bid from the bid set is withdrawn as a remaining bid, and wherein the bid set is visible to a) at least one first seller associated with the first of the plurality of heterogeneous item auctions, b) at least one second seller associated with the second of the plurality of heterogeneous item auctions, and c) other buyers bidding on the first of the plurality of heterogeneous item auctions or the second of the plurality of heterogeneous item auctions.

* * * * *